United States Patent
Hasegawa

(10) Patent No.: US 8,274,670 B2
(45) Date of Patent: Sep. 25, 2012

(54) INFORMATION PROCESSING APPARATUS PRINT CONTROL METHOD, AND STORAGE MEDIUM

(75) Inventor: Jun Hasegawa, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 958 days.

(21) Appl. No.: 12/331,645

(22) Filed: Dec. 10, 2008

(65) Prior Publication Data

US 2009/0147308 A1   Jun. 11, 2009

(30) Foreign Application Priority Data

Dec. 11, 2007   (JP) ................. 2007-320071

(51) Int. Cl.
 G06F 3/12 (2006.01)
 G06F 17/00 (2006.01)
 H04N 1/40 (2006.01)
(52) U.S. Cl. ...... 358/1.13; 358/1.15; 358/444; 358/448; 715/234; 715/239; 715/250; 715/269
(58) Field of Classification Search ............. 358/1.15, 358/1.13, 508, 523, 403, 404, 448; 717/114, 717/121; 707/609, 706, 711, 726, 769, 809, 707/825, 830; 714/234, 239, 250, 769
See application file for complete search history.

(56) References Cited

U.S. PATENT DOCUMENTS

| | | | |
|---|---|---|---|
| 2003/0056177 A1* | 3/2003 | Nara et al. | 715/525 |
| 2007/0216944 A1* | 9/2007 | Furuya | 358/1.15 |
| 2008/0024802 A1* | 1/2008 | Kato | 358/1.9 |
| 2008/0151294 A1* | 6/2008 | Natori et al. | 358/1.15 |

FOREIGN PATENT DOCUMENTS

| | | |
|---|---|---|
| JP | 2005-238713 | 9/2005 |
| JP | 2005-260332 | 9/2005 |

OTHER PUBLICATIONS

ECMA TC46, XML Paper Specification, Sep. 2007, Microsoft, Working Draft 1.0.1, all pages.*
Office Open XML part 2: Open Packaging Conventions, Dec. 2006.
XML Paper Specifications: XPS Specification and Reference guide, Sep. 2007.

* cited by examiner

*Primary Examiner* — Benny Q Tieu
*Assistant Examiner* — Ngon Nguyen
(74) *Attorney, Agent, or Firm* — Fitzpatrick, Cella, Harper & Scinto

(57) ABSTRACT

An information processing apparatus which is capable of generating XPS data having a data sequence suited to print settings for non-normal-order printing, from XPS data generated as a print spool file for normal-order printing. In the information processing apparatus, a layout filter receives an XPS document from a filter pipeline manager, and acquires print setting information indicative of print settings from the XPS document. Then, the layout filter determines a data sequence for printing based on the acquired print setting information. Then, the layout filter changes layout information described in the received XPS document according to the determined data sequence, and rearranges data files in the XPS document in a sequence determined based on the changed layout information, to thereby generate an XPS document.

9 Claims, 41 Drawing Sheets

FIG.9

/_rels.rels/[0].piece ~851
```
<?xml verslon="1.0" encoding="utf-8">
<Relationships···>
  <Relationships··· Target="/FixedDocumentSequence.fdseq"/>
```

/_rels.rels/[1].piece ~852
```
</Relationships···>
```

/FixedDocumentSequence.fdseq/[0].piece ~858
```
<?xml version="1.0" encoding="utf-8">
<FixedDocumentSequence xmlns="http://schemans.microsoft.com/xps/2005/06">
  <DocumentReference Source="Documents/1/FixedDocument.fdoc"/>
```

/FixedDocumentSequence.fdseq/[1].piece
```
  <DocumentReference Source="Documents/2/FixedDocument.fdoc"/>
```
~859

/FixedDocumentSequence.fdseq/[2].piece
```
<FixedDocumentSequence>
```
~860

/Documents/1/FixedDocument.fdoc/[0].piece
```
<?xml version="1.0" encoding="utf-8">
<FixedDocument xmlns="http://schemans.microsoft.com/xps/2005/06">
  <PageContext Source="Pages/1.fpage/>
```
~853

/Documents/1/FixedDocument.fdoc/[1].piece
```
  <PageContext Source="Pages/2.fpage/>
```
~854

/Documents/1/FixedDocument.fdoc/[2].piece
```
<FixedDocument>
```
~855

/Documents/1/Page/1.fpage
```
...
  <ImageBrush ImageSource="/Resources/Images/1.jpg···/>
  <Glyphs Fill="#ff000000" FontUri="/Resources/Fonts/1.ttf···/>
...
```

/Documents/1/Page/2.fpage
```
...
  <ImageBrush ImageSource="/Resources/Images/2.jpg···/>
...
```

/Documents/2/FixedDocument.fdoc/[0].piece
```
<?xml version="1.0" encoding="utf-8">
<FixedDocument xmlns="http://schemans.microsoft.com/xps/2005/06">
  <PageContext Source="Pages/1.fpage/>
```
~856

/Documents/2/FixedDocument.fdoc/[1].piece
```
</FixedDocument>
```
~857

/Documents/2/Page/1.fpage
```
...
  <ImageBrush ImageSource="/Resources/Images/2.jpg···/>
...
```

/Resources/Image/1.jpg
```
...
```

/Resources/Fonts/1.ttf
```
...
```

/Resources/Image/2.jpg
```
...
```

FIG.25

| | | |
|---|---|---|
| 501 | REVERSE ORDER FLAG | ON |
| 502 | BOOKBINDING PRINTING FLAG | OFF |
| | VARIABLE M | 2 |
| | VARIABLE N | 5 |
| | VARIABLE I | 0 |
| | VARIABLE J | 0 |
| | VARIABLE K | 0 |
| | VARIABLE H | 0 |
| | VARIABLE T | 0 |

FIG.28

| | | |
|---|---|---|
| 551 — | REVERSE-ORDER | ON |
| 552 — | BOOKBINDING | OFF |
| | COPY COUNT | 3 |
| | ... | ... |
| | COLOR SETTINGS | COLOR |

INFORMATION PROCESSING APPARATUS PRINT CONTROL METHOD, AND STORAGE MEDIUM

BACKGROUND OF THE INVENTION

1. Field of the Invention

The present invention relates to an information processing apparatus, a print control method, and a storage medium, and more particularly to an information processing apparatus used in a system including an information processing apparatus, such as a personal computer, and a printing apparatus, such as a printer, a print control method executed by the image processing apparatus, and a storage medium storing a program for implementing the print control method.

2. Description of the Related Art

An information processing apparatus, such as a personal computer, is equipped with an operating system (OS) implemented by software for providing basic functions including input/output functions, such as keyboard input and image output, which are commonly utilized by many kinds of application software (hereinafter simply referred to as "applications"), and managing the overall operation of the information processing apparatus. Examples of the operating system include Microsoft Windows (registered trademark) XP, Microsoft Windows (registered trademark) 2000, and Microsoft Windows (registered trademark) Vista.

There are various document file formats which enable the user to browse various kinds of documents using such an information processing apparatus. One of them is a document file format called XML Paper Specification (XPS). In Windows (registered trademark) Vista, the XPS is used not only as a document file format, but also as a print spool file format, and further, it can be used as a PDL (Page Description Language) format. Hereafter, data in the XPS format will be referred to as XPS data, and a file containing XPS data as an XPS file.

By the way, in a case where printing is performed in a system including an information processing apparatus and a printing apparatus, such as a printer, when receiving a print execution instruction from a user, an application in the information processing apparatus issues a print command according to an OS on which the application operates and a printing system provided by the OS. For example, an application operating on an OS, such as Windows (registered trademark) XP or 2000, issues a print command according to the form of a printing system called a GDI (Graphics Device Interface) print path provided by the OS.

On the other hand, in Windows (registered trademark) Vista, a printing system called an XPS print path is provided anew in addition to the GDI print path. The GDI print path and the XPS print path will be described in detail hereinafter.

Now, a description will be given of the format of the XPS data.

The XPS data is archive data formed by compressing a plurality of files in the ZIP compression format and archiving the compressed files in one file. Files to be archived include XML (Extensible Markup Language) files, JPEG (Joint Photographic Experts Group) files, PNG (Portable Network Graphics) files, TIFF (Tagged Image File Format) files, HD Photo files, and font files.

In an XML file, various kinds of information items defining the page layout of an XPS document are described in the XML format. It should be noted that the XML file is divided into a plurality of XML files associated with the respective information items to be described. In the case of the XPS, one XPS document is considered to be divided into several bundles. More specifically, the single XPS document is comprised of one document or a plurality of documents, and one document is comprised of one page or a plurality of pages. Each of JPEG, PNG, TIFF, and HD Photo is a format for expressing images. Files in these formats are generically referred to as image files. XPS data includes a number of image files and a number of font files required for forming one XPS document. Each of the files included in the XPS data will be referred to as part data. In short, one XPS data item (data of one XPS document) includes a plurality of part data items. FIG. 4 shows an example of construction of XPS data.

Each part data item included in the XPS data contains a reference tag to another part data item. All the part data items in the XPS data are integrated by the reference tags as related parts into one piece of document information. The XPS data includes not only image files 808 and 809 and a font file 807, but also a plurality of part data items described below by way of example, and the part data items have the following reference tags.

a) _rels/.rels 801: a part data item as a starting point of a document data item (data of one XPS document). This part data item has a reference tag to FixedDocumentSequence (hereinafter abbreviated as "FDS") referred to hereinafter.

b) FDS 810: a part data item describing layout information on one document data item. This part data item has a reference tag to FixedDocument (hereinafter abbreviated as "FD") described hereinafter. It should be noted that one document data item can include a plurality of documents. In other words, an FDS can have a plurality of reference tags to respective FDs.

c) FD 804 (806): a part data item describing layout information on a document. This part data item has a reference tag to FixedPage (hereinafter abbreviated as "FP") referred to hereinafter. It should be noted that one document can include a plurality of pages. In other words, an FD can have a plurality of reference tags to respective FPs.

d) FP 802 (803, 805): a part data item describing one piece of page information. This part data item has reference tags to the image files 808 and 809 and the font file 807, as required. For example, when one page includes an image to be formed thereon, the FD 802 (803, 805) has a reference tag to an image file of the image.

FIG. 5 is a reference diagram of a logical structure of reference relations between part data items of the XPS data in FIG. 4. FIG. 6 is a reference diagram useful in explaining the reference relations between the part data items based on XML file descriptions of the respective part data items.

As shown in FIG. 5, the part data _rels/.rels 801 refers to the part data FDS 810, the FDS 810 refers to the part data items FD 804 and 806, the FD 804 refers to the part data items FP 802 and 803, the FD 806 refers to the FP 805, the FP 802 refers to the image file 808 and the font file 807, the FP 803 refers to the image file 809, and the FP 805 refers to the image file 809.

Next, data compressed in the ZIP compression format (hereinafter expressed as "ZIP-compressed") forming a component of XPS data will be described with reference to FIG. 7.

FIG. 7 is a reference diagram of an example of data compressed in the ZIP compression format, forming a component of XPS data.

The ZIP-compressed data includes data sections called Local File Header 601 and file data 602, respectively. As shown in FIG. 7, the Local File Header 601 unexceptionally exists immediately before the file data 602, and the pair of the Local File Header 601 and the file data 602 forms information on one file of expanded data. In other words, the ZIP-compressed data can be expanded into one file of the expanded data based on the pair of the Local File Header 601 and the file data 602. The pair of the Local File Header 601 and the file data 602 will be hereinafter referred to as the file data section. When the expanded data includes a plurality of files, the ZIP-compressed data includes plurality of file data sections.

ZIP compression is capable of compressing data while maintaining a directory structure of uncompressed i.e. expanded data. However, even if a file exists in a hierarchically upper layer of the directory structure of the uncompressed i.e. expanded data, a file data section as a component of the file in compressed data is not always positioned in the leading portion of the data. In other words, there is no relationship between a hierarchical position in the directory structure of uncompressed or expanded data and the position of a file data section in the compressed data of the same.

In Windows (registered trademark) Vista, the XPS format can be used not only as a document file format or a print spool file, but also as a PDL format, as mentioned hereinbefore. In a case where the XPS format is used as a PDL format, ZIP-compressed data is transmitted from an information processing apparatus to a printing apparatus via a network, for example. It should be noted that, in general, sent data is not collectively sent to a printing apparatus, but it is divided into several parts and then sent to the printing apparatus. The printing apparatus receives the data and analyzes the received data (XPS data) for printing. It should be noted that in most cases, the printing apparatus is capable of performing data reception and data analysis processing for analyzing already-received XPS data, in parallel.

As one of the functions of Windows (registered trademark) Vista, there exists an application called Microsoft XPS Document Writer (MXDW). This application is used for generating an XPS file. When an XPS file is generated by the MXDW, normally, data in a file data section having information of the part data _rels/.rels, data in a file data section having information of the FDS part data, data in file data sections having information of the respective FD part data items, and data in file data sections having information of the respective FP part data items are arranged in the sequence of FPs 802, 803, 805→FDs 804 and 806→FDS 810→_rels/.rels 801, as shown in FIG. 8. Hereafter, this sequence will be referred to as the data sequence.

In the case of using the XPS as the PDL format, XPS data is divided into several parts and sent to a printing apparatus as described hereinbefore. In this case, the XPS data having the file data sections arranged in the data sequence is sent to the printing apparatus by transmitting all the file data sections having information of the respective FP, FD, and FDS part data items after the start of the transmission, and then transmitting the file data section having information of the part data _rels/.rels. The part data _rels/.rels is the starting point of the XPS document as described hereinbefore, and hence the printing apparatus cannot start XPS data analysis until the file data section having information on the part data _rels/.rels is received. This makes it impossible for the printing apparatus to perform XPS data reception and XPS data analysis in parallel, which lowers print throughput as a whole.

Further, even if the file data section having information of the part data _rels/.rels is disposed in the leading portion of the XPS data, when the data sequence is set such that the file data section having information of the FDS part data to be referred to next is disposed e.g. in the trailing end of the XPS data, the printing apparatus has to suspend the XPS data analysis until the file data section having information of the FDS part data is received, which also lowers print throughput as a whole.

By the way, the XPS includes a specification called interleave, based on which a part data item is divided into a plurality of part data items.

XPS data conforming to this specification will be referred to as "interleaved data", and to convert general XPS data into data conforming to the interleave specification will be expressed as "to interleave". For example, the XPS data shown in FIG. 6 can be interleaved into interleaved data shown in FIG. 9. In the interleaved data in FIG. 9, each part data item is divided where a reference tag to next part data exists. FIG. 10 shows an example of construction of interleaved XPS data.

In the XPS data shown in FIG. 10, the part data _rels/.rels is divided into two part data items 851 and 852, the FDS part data is divided into three part data items 858, 859, and 860, and a first FD part data item is divided into three part data items 853, 854, and 855, and second FD part data into two part data items 856 and 857.

By rearranging the part data items divided as shown in FIG. 9 in a data sequence in which each reference destination data item is disposed immediately after an associated reference tag as shown in FIG. 11, it is possible to solve the problem of lowered print throughput. This is because the printing apparatus sequentially receives file data sections having information of respective part data items to be analyzed, in order, and therefore each of the file data sections can be analyzed immediately after reception of the same.

For example, in FIG. 11, first, a file data section having information on the first part data item 851 of the _rels/.rels part data items 851, 852 divided in two is received. At this time point, the printing apparatus is first required to analyze the part data item. This reception of the file data section having the information of the first part data item 851 enables the printing apparatus to immediately start analysis of the part data required to be analyzed first. Then, a file data section having information of the first part data item 858 of the FDS part data divided into three is received. This reception of the file data section having the information on the first part data item 858 enables the printing apparatus to immediately start analysis of the part data required to be analyzed at this time point.

Then, a file data section having information of the first part data item 853, which describes layout information on a first document, of the FD part data divided into three is received. This reception of the file data section having the information on the first part data item 853 enables the printing apparatus to immediately start analysis of the part data required to be analyzed at this time point.

Then, a file data section having information on the FP part data item 861 describing page information on a first page of the first document is received. This reception of the file data section having the information on the FP part data item 861 enables the printing apparatus to immediately start analysis of the part data required to be analyzed at this time point. This makes it possible to print the first page of the first document.

Then, a file data section having information on the second part data item 854, which describes layout information on the first document, of the FD part data divided into three is received. This reception of the file data section having the information on the second part data item 854 enables the printing apparatus to immediately start analysis of the part data required to be analyzed at this time point.

Then, a file data section having information of an FP part data item 862 describing page information on a second page of the first document is received. This reception of the file data section having the information on the FP part data item 862 enables the printing apparatus to immediately start analysis of the part data required to be analyzed at this time point. This makes it possible to print the second page of the first document. As described above, the part data items can each be analyzed immediately after reception of the associated file data section, which makes it possible to solve the problem of lowered print throughput.

It should be noted that in Windows (registered trademark) Vista, the XPS can be used not only as a document file format, but also as a print spool file format. In general, in a case where the XPS print path is used, a printing system provided by the OS automatically generates a print spool file in the XPS file format. XPS data generated at this time has a data sequence shown in FIG. 11, for example.

However, there also exists a technique in which other XPS data than XPS data generated by a printing system provided by an OS when the above-mentioned XPS print path is used is directly output as a print spool file, and when this technique is employed, XPS data does not always have the data sequence shown in FIG. 11.

In the above-described conventional printing method, a print spool file generated in the XPS file format by the printing system provided by the OS when the XPS print path is used has a data sequence which makes it possible to solve the problem of lowered print throughput, when normal-order printing is performed.

However, in the case of reverse-order printing or bookbinding printing, the problem of lowered print throughput cannot be solved by the data sequence of XPS data generated by the printing system. For example, in normal-order printing based on the XPS data shown in FIG. 11, a printing apparatus is required to carry out printing in the order of the first page of the first document, the second page of the first document, a third page of the first document, a first page of a second document, and a second page of the second document.

On the other hand, in reverse-order printing, the printing apparatus is required to carry out printing in the order of the second page of the second document, the first page of the second document, the third page of the first document, the second page of the first document, and the first page of the first document. For this reason, after having received and analyzed the file data section having the information of the first part data item of the _rels/.rels part data items divided in two, the printing apparatus has to suspend XPS data analysis until the file data section having the information on the second part data item of the FDS part data divided into three is received.

In short, since the XPS data generated by the printing system does not have a data sequence suitable for data analysis in reverse-order printing, suspension of XPS data analysis inevitably occurs, which results in lowered print throughput. Similarly, since the XPS data generated by the printing system does not have a data sequence suitable for data analysis in bookbinding printing, the suspension of XPS data analysis inevitably occurs, which results in lowered print throughput.

SUMMARY OF THE INVENTION

The present invention provides an information processing apparatus which is capable of generating XPS data having a data sequence suited to print settings, which are configured for non-normal-order printing, from XPS data generated as a print spool file when an XPS print path is used, to thereby speed up print processing carried out by a printing apparatus, a print control method executed by the information processing apparatus, and a storage medium storing a program for implementing the print control method.

In a first aspect of the present invention, there is provided an information processing apparatus comprising an input unit adapted to input archive data formed by archiving a page layout data file describing layout information on document data, print target data files each describing information on pages to be printed, and a resource file, a print setting information-acquiring unit adapted to acquire print setting information indicative of print settings, a data sequence-determining unit adapted to determine a data sequence according to which a printing apparatus prints the print target data files, based on the acquired print setting information, and a print data-generating unit adapted to change the layout information in the page layout data file input by the input unit, according to the data sequence determined by the data sequence-determining unit, and rearrange the print target data files in a sequence determined based on the changed layout information, to thereby generate archive data.

In a second aspect of the present invention, there is provided a print control method executed by an information processing apparatus that controls a printing apparatus, comprising inputting archive data formed by archiving a page layout data file describing layout information on document data, print target data files each describing information on pages to be printed, and a resource file, acquiring print setting information indicative of print settings, determining a data sequence according to which the printing apparatus prints the print target data files, based on the acquired print setting information, and changing the layout information in the page layout data file input by the inputting, according to the data sequence determined by the determining the data sequence, and rearranging the print target data files in a sequence determined based on the changed layout information, to thereby generate archive data.

In a third aspect of the present invention, there is provided a storage medium storing a program for causing a computer to execute a print control method for controlling a printing apparatus, wherein the print control method comprises inputting archive data formed by archiving a page layout data file describing layout information on document data, print target data files each describing information on pages to be printed, and a resource file, acquiring print setting information indicative of print settings, determining a data sequence according to which the printing apparatus prints the print target data files, based on the acquired print setting information, and changing the layout information in the page layout data file input by the inputting, according to the data sequence determined by the determining the data sequence, and rearranging the print target data files in a sequence determined based on the changed layout information, to thereby generate archive data.

According to the present invention, even when print settings are configured for non-normal-order printing, it is possible to generate XPS data having a data sequence suited to the print settings, based on XPS data generated as a print spool file for normal-order printing, to thereby speed up print processing carried out by a printing apparatus.

The features and advantages of the invention will become more apparent from the following detailed description taken in conjunction with the accompanying drawings.

BRIEF DESCRIPTION OF THE DRAWINGS

FIG. 9 is a reference diagram of an example of interleaved part data.

FIG. 25 is a diagram of layout filter information stored in a memory area secured in a RAM by the layout filter.

FIG. 28 is a reference diagram of print setting information contained in a print ticket.

DETAILED DESCRIPTION OF THE EMBODIMENTS

The present invention will now be described in detail below with reference to the accompanying drawings showing embodiments thereof.

Figure 1:
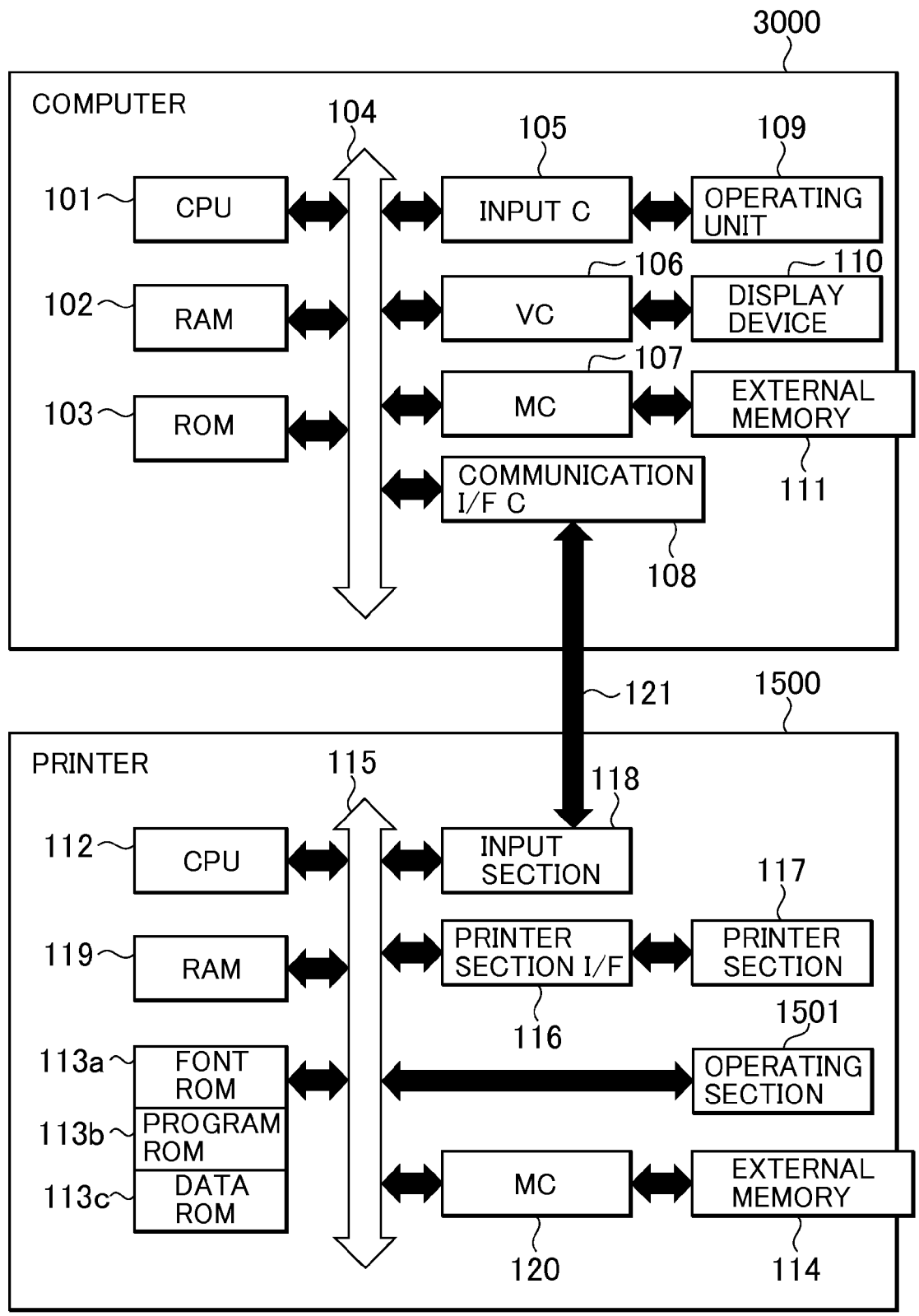
FIG. 1 is a block diagram of the configuration of a printing system including an information processing apparatus according to a first embodiment of the present invention.

FIG. 1 is a block diagram of the configuration of a printing system including an information processing apparatus according to a first embodiment of the present invention.

As shown in FIG. 1, the printing system in the embodiments of the present invention includes a computer 3000 as an information processing apparatus, and a printer 1500 as a printing apparatus, and the computer 3000 and the printer 1500 are interconnected via a network 121.

The computer 3000 is comprised of a CPU 101, a RAM 102, a ROM 103, an input controller (input C) 105, a video controller (VC) 106, a memory controller (MC) 107, a communication interface controller (communication I/F C) 108, an operating unit 109, a display device 110, and an external memory 111. The CPU 101, the RAM 102, the ROM 103, the input controller 105, the video controller 106, the memory controller 107, and the communication interface controller 108 are interconnected via a system bus 104.

The CPU 101 realizes various operations by loading programs required for execution of respective processes, described hereinafter, into the RAM 102 and executing the respective programs. Further, the CPU 101 enables display on the display device 110 e.g. by rasterizing outline fonts into a display information area in the RAM 102. Furthermore, the CPU 101 enables the user to give instructions e.g. using a mouse cursor, not shown, on the display device 110.

The RAM 102 functions as a main memory, a work area, and so forth for the CPU 101. The ROM 103 or the external memory 111 stores a BIOS (Basic Input/Output System) and an operating system program (hereinafter referred to as "the OS") as control programs to be executed by the CPU 101, and the various programs required for execution of the respective processes, described hereinafter. It is assumed, for example, that the OS employed in the present embodiment is Windows (registered trademark) Vista (Microsoft Corporation), but this is not limitative.

The input controller 105 controls input from the operating unit 109 including a pointing device, such as a mouse, and a keyboard. The video controller 106 controls display on the display device 110 implemented e.g. by a CRT display. It should be noted that the display device 110 is not limited to the CRT display, but it may be implemented by a liquid crystal display.

The memory controller 107 controls access to the external memory 111. The external memory 111 stores a boot program, browser software, various applications, font data, user files, edit files, various kinds of data, and so forth. The external memory 111 is implemented e.g. by a hard disk (HD), a floppy (registered trademark) disk (FD), or a compact flash (registered trademark) memory connected to a PCMCIA card slot via an adaptor. The communication interface controller 108 controls connection/communication with an external apparatus to be realized via a network or the like. For example, the communication interface controller 108 enables the computer 3000 to exchange data with the printer 1500 via the network 121 e.g. through Internet communication using TCP/IP. It should be noted that the network 121 may be a LAN (Local Area Network) or the Internet, or alternatively a local one using cable connection or the like.

The printer 1500 is comprised of a CPU 112, a RAM 119, a font ROM 113a, a program ROM 113b, a data ROM 113c, an input section 118, a printer section interface (printer section I/F) 116, a printer section (printer engine) 117, an operating section 1501, a memory controller (MC) 120, and an external memory 114. The CPU 112, the RAM 119, the ROMs 113a to 113c, the input section 118, the printer section I/F 116, the operating section 1501, and the MC 120 are interconnected via a system bus 115.

The CPU 112 outputs an image signal as output information to the printer section 117 via the printer section I/F 116, based on a control program and the like stored in the program ROM 113b or the external memory 114. The program ROM 113b stores the control program and other programs to be executed by the CPU 112. The font ROM 113a stores font data and the like for use in generating the output information. The data ROM 113c stores information to be used on the computer 3000 and the like, when the printer 1500 has no external memory 114, such as a hard disk.

The CPU 112 is capable of performing processing for communication with the computer 3000 via the input section 118 to notify the computer 3000 of information and the like within the printer 1500. The RAM 119 is the main memory of the CPU 112, and functions as a work area or the like for the CPU 112. Further, the RAM 119 is configured such that memory capacity thereof can be increased by using an optional RAM connected to an expansion port, not shown. It should be noted that the RAM 119 is also used as an output information loading area, an environment data storage area, an NVRAM, etc.

The memory controller 120 controls access to the external memory 114. The external memory 114 is optionally connected to the printer 1500 to store font data, an emulation program, form data, and so forth. The external memory 114 is implemented e.g. by a hard disk (HD) or an IC card.

The operating section 1501 is an operation panel provided with switches, LEDs, and so forth for use in operation by the user. It should be noted that the printer 1500 may be provided with one or more external memories 114. Further, the printer 1500 may be configured to enable connection of a plurality of external memories storing an optional font card storing fonts other than printer-internal fonts and a program for interpreting printer control languages of different language systems, in addition to an internal font. Furthermore, the printer 1500 may be provided with an NVRAM (not shown) for storing printer mode setting information configured via the operating section 1501.

Although in the present embodiment, it is assumed that a page description language (hereinafter referred to as "PDL") supported by the printer 1500 is the XPS, this is not limitative, but a may be a PLD having a similar format.

A printer control program (hereinafter referred to as "the printer driver") for realizing the present invention is stored in the external memory 111. The printer driver is loaded into the RAM 102, as required, to be executed by the CPU 101. Definition files and various information tables used by the printer driver are stored in the external memory 111.

The above-described configuration of the printing system is only an example, and therefore it is to be understood that the configuration of the printing system can be modified in various manners according to uses and purposes. For example, insofar as the functions of the present invention are realized, the present invention may be applied to a single apparatus or to a system comprised of a plurality of apparatuses interconnected via a network, such as a LAN or a WAN (Wide Area Network).

Figure 2:
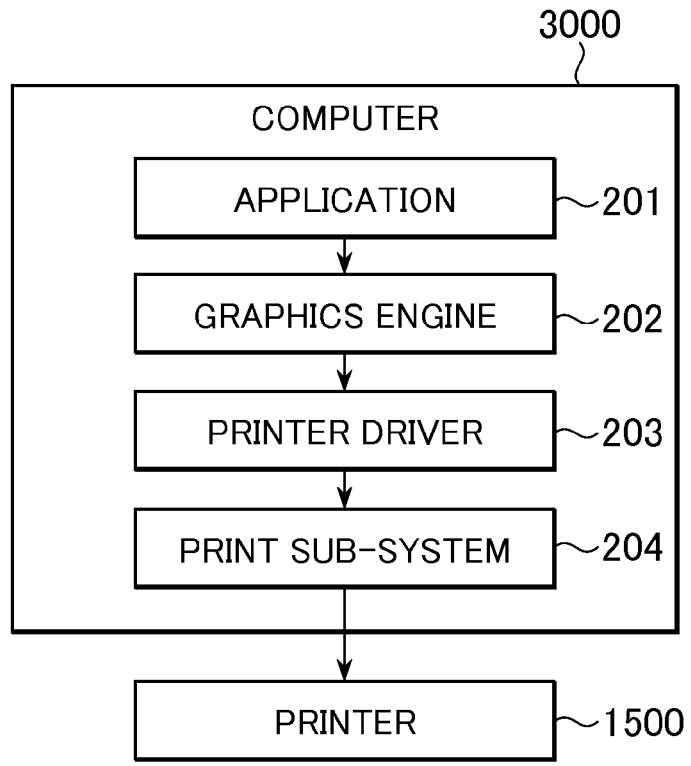
FIG. 2 is a block diagram of the configuration of software which operates during print control processing executed by the computer appearing in FIG. 1.

FIG. 2 is a block diagram of software which operates during print control processing executed by the computer 3000 appearing in FIG. 1.

As shown in FIG. 2, the computer 3000 is provided with an application program (hereinafter simply referred to as "the application") 201, a graphics engine 202, a printer driver 203, and a print sub-system 204. These are program modules each stored as a file in the external memory 111. Each of the modules is executed by being loaded into the RAM 102 by the OS or a module using the module.

Figure 3:
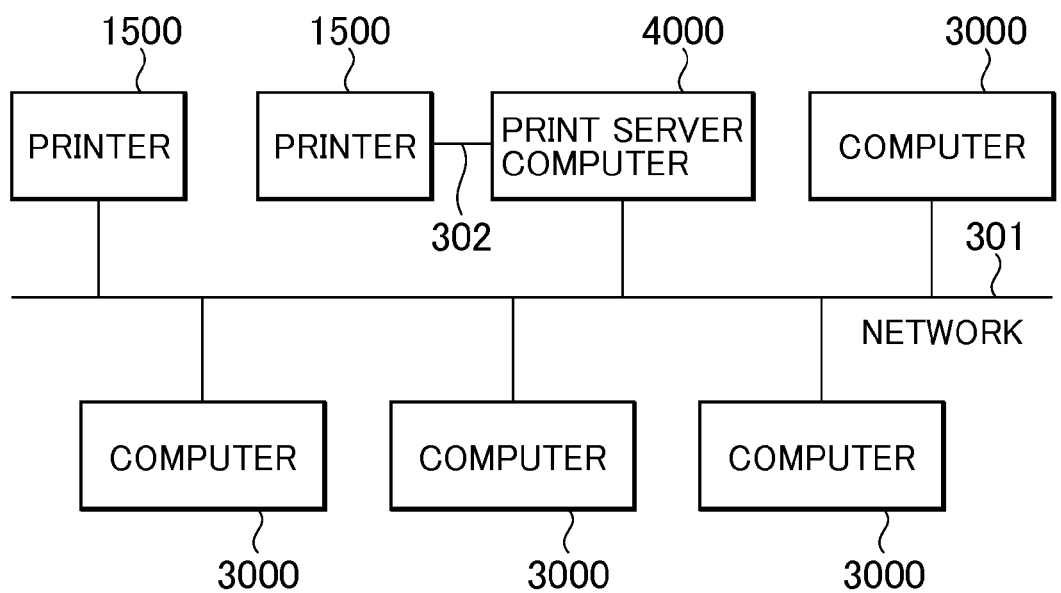
FIG. 3 is a block diagram showing an example of the printing system using the computer and a printer appearing in FIG. 1.
Figure 4:
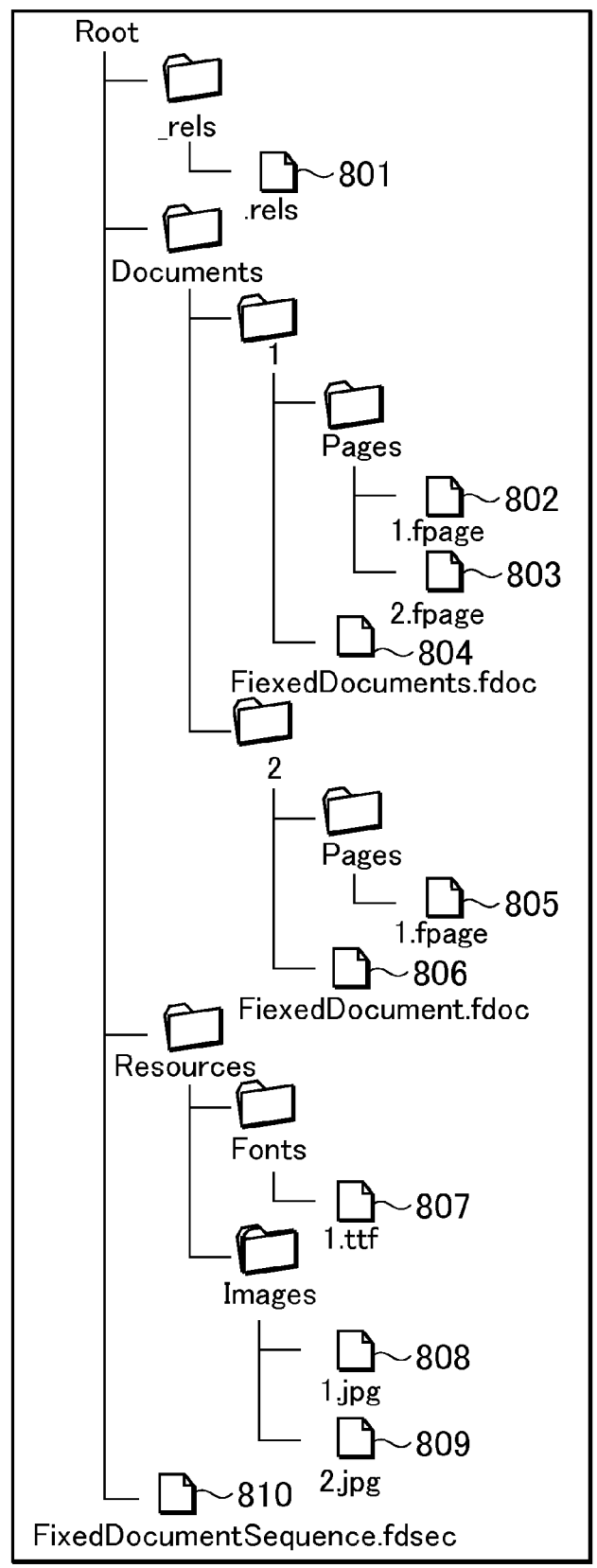
FIG. 4 is a reference diagram of the structure of XPS data.
Figure 5:
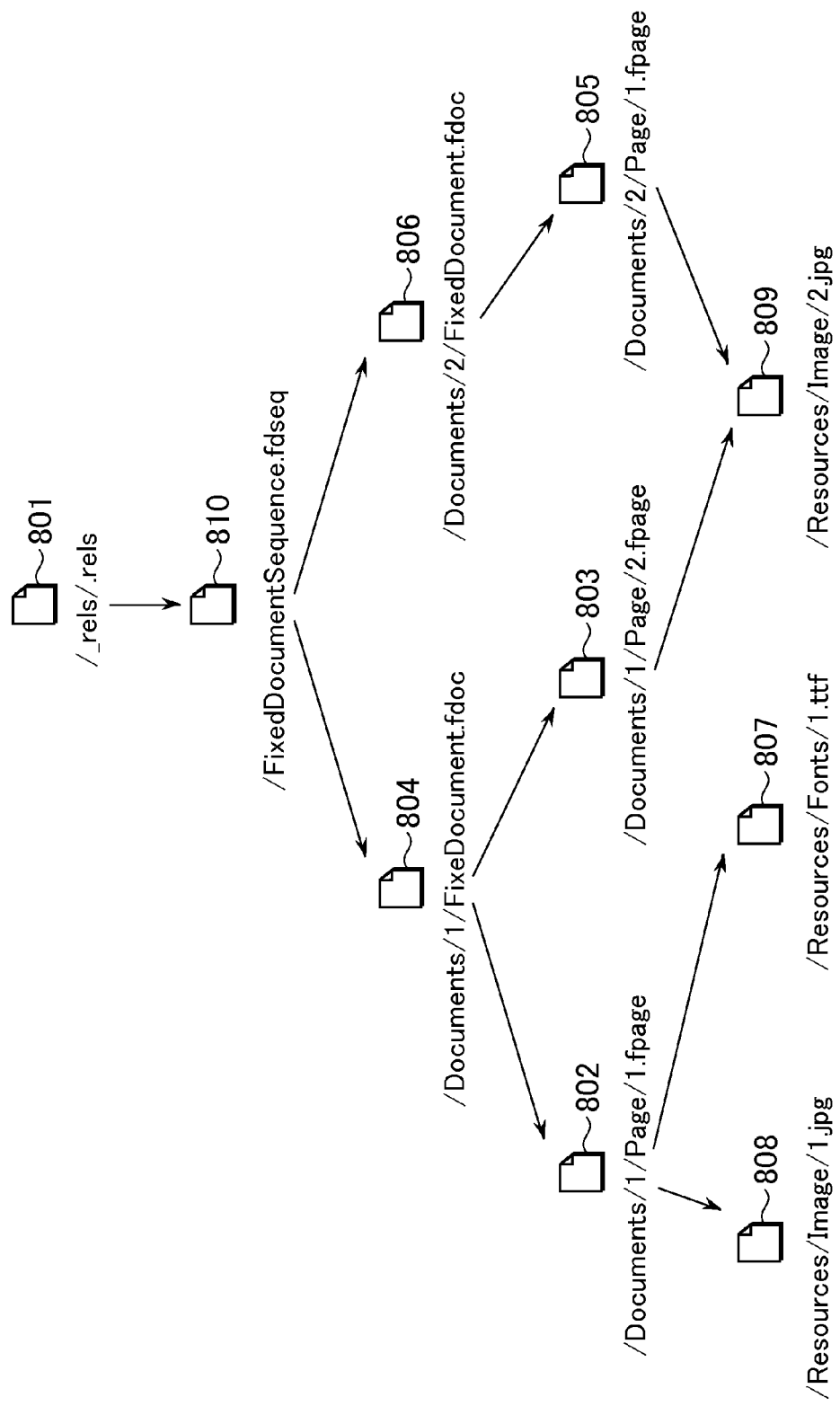
FIG. 5 is a reference diagram of a logical structure of reference relations between part data items of the XPS data in FIG. 4.
Figure 6:
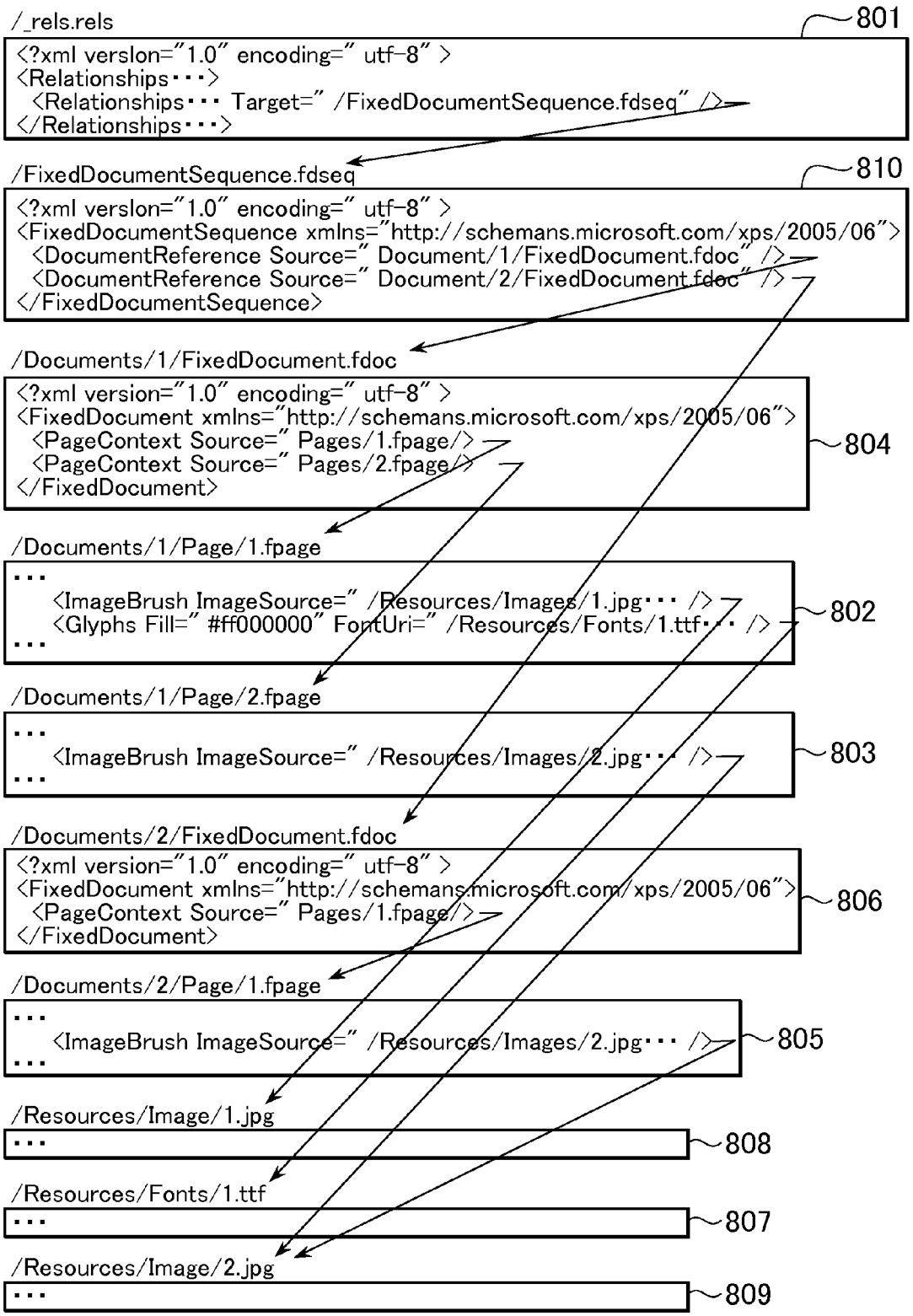
FIG. 6 is a reference diagram showing an example useful in explaining the reference relations between the part data items based on descriptions of XML files of the respective part data items.
Figure 7:
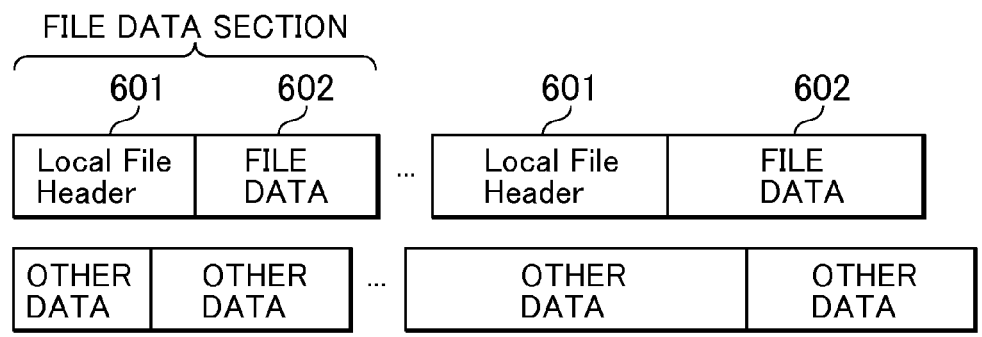
FIG. 7 is a reference diagram useful in explaining the structure of ZIP-compressed data as a component of XPS data.
Figure 8:
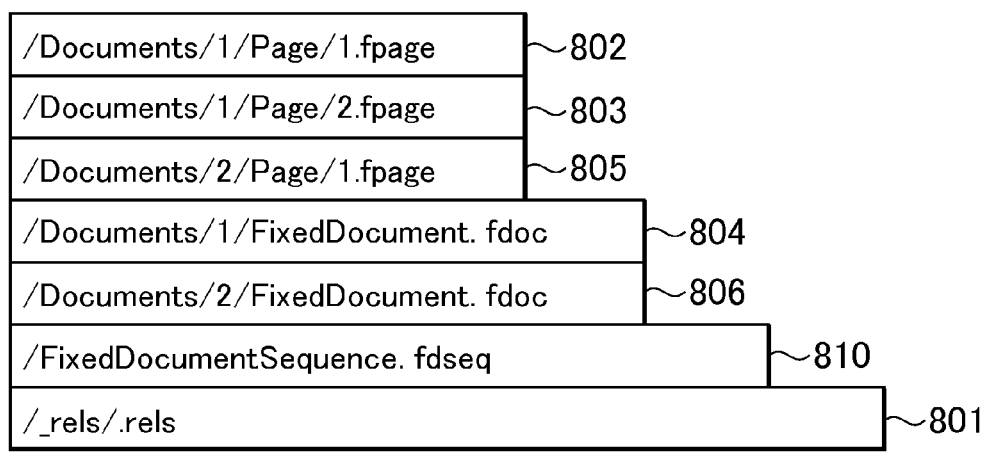
FIG. 8 is a reference diagram useful in explaining a data sequence of an XPS file normally generated by an MXDW.
Figure 10:
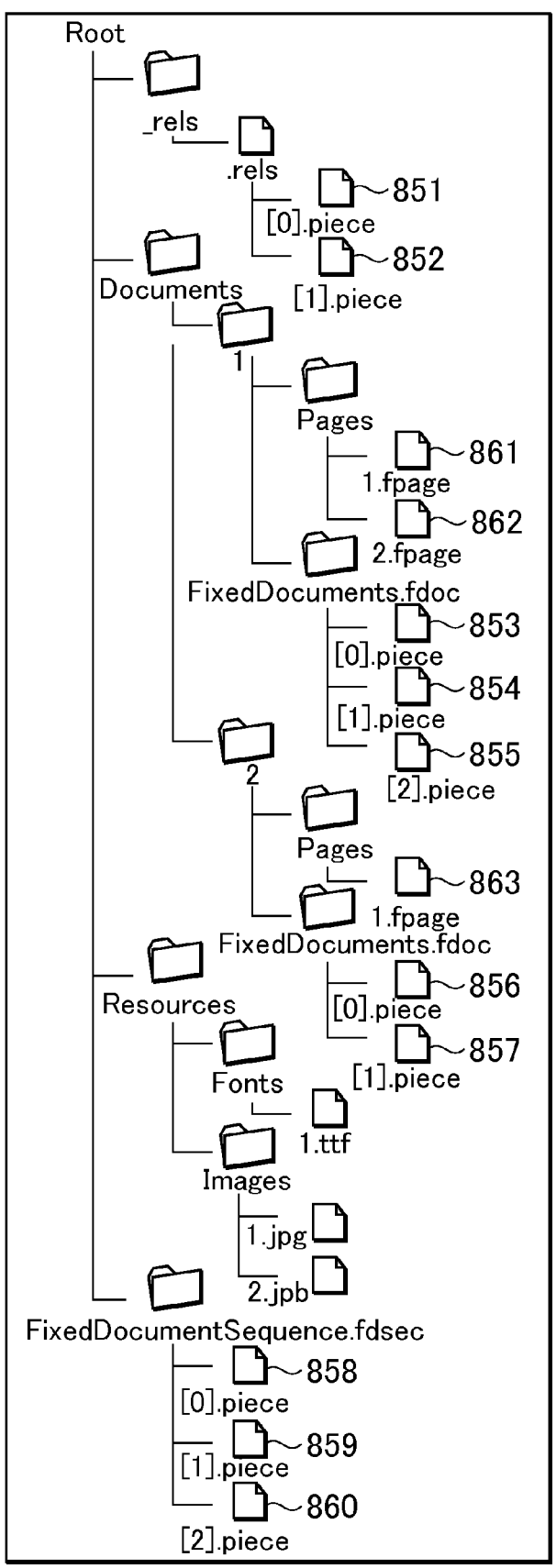
FIG. 10 is a reference diagram useful in explaining the structure of interleaved XPS data.
Figure 11:
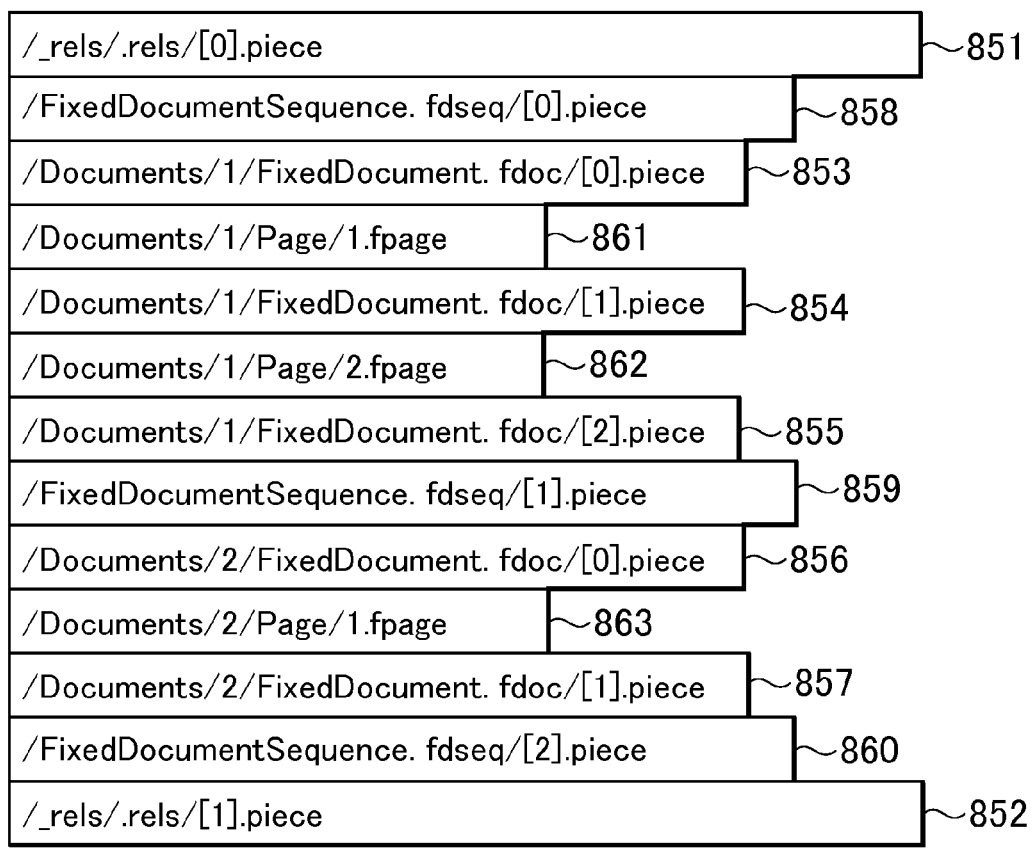
FIG. 11 is a reference diagram useful in explaining a data sequence of a print spool file generated by a printing system of Windows (registered trademark) Vista according to an XPS print path.

The application 201 and the printer driver 203 can be added from the external memory 111 or from an external apparatus connected to the computer 3000 via a network 301 appearing in FIG. 3 into another external memory 111, such as a hard disk (HD). The application 201 stored in the external memory 111 is loaded into the RAM 102 and executed by the CPU 101. In a case where printing of the printer 1500 is instructed from the application 201, printout (image formation) is executed by making use of the graphics engine 202 which is also loaded into the RAM 102 and executed by the CPU 101.

The graphics engine 202 starts the printer-specific printer driver 203. Thus, the printer driver 203 is loaded into the RAM 102 from the external memory 111 and executed by the CPU 101. The graphics engine 202 uses the printer driver 203 to convert a print command or a drawing command output from the application 201 into a PDL printer control command.

The printer control command obtained by conversion by the printer driver 203 is output through the print sub-system 204 to the printer 1500 via the network 121. The print sub-system 204 is started by the OS and is loaded by the CPU 101 into the RAM 102 from the external memory 111 for execution. The print sub-system 204 performs scheduling of a print job, controls connection between the computer 3000 and the printer 1500, and manages the status of the printer 1500.

It should be noted that the printer driver 203 has not only the function of converting a print command or a drawing command output from the application 201 into a printer control command and instructing the printer 1500 to reflect the printer control command in printout, but also a function of configuring settings for controlling the functions of the printer driver 203 and the printer 1500 (this function will be hereinafter referred to as "the user interface (UI)"), a function of storing the settings, a function of providing information on the functions of the printer driver 203 and the printer 1500 to the application 201 and the OS, a function of generating a printer control command when the printer 1500 has a function set via the UI, and a function of realizing a function set via the UI when the printer driver 203 is to perform the function by itself.

FIG. 3 is a block diagram of the printing system utilizing the computer 3000 and the printer 1500 appearing in FIG. 1.

As shown in FIG. 3, the printing system is comprised of a plurality of computers 3000 as client computers, a plurality of printers 1500, and a print server computer 4000. The computers 3000, the printers 1500, and the print server computer 4000 are interconnected via the network 301. It is assumed that the communication interface controller 108 in each of the computers 3000 has a function of a network interface card (NIC).

The printer 1500 may be connected to the print server computer 4000 via a local interface 302, such as Centronics or USB (Universal Serial Bus), and be further connected to the network 301 via the print server computer 4000, or alternatively be connected directly to the network 301. It is assumed that the input section 118 in the printer 1500 connected directly to the network 301 has the function of a network interface card (NIC).

In the case of transmitting a print job to a printer 1500 connected to the network 301 via the print server computer 4000, first of all, the computer 3000 sends the print job to the print server computer 4000 via the print sub-system 204. Then, the print server computer 4000 transfers the print job from the computer 3000 to the printer 1500 via a print sub-system, not shown, on the print server computer 4000.

On the other hand, in the case of transmitting a print job to a printer 1500 connected directly to the network 301, the computer 3000 sends the print job directly to the printer 1500 via the print sub-system 204.

Next, the computer 3000 which operates according to a GDI print path will be described with reference to FIG. 12.

Figure 12:
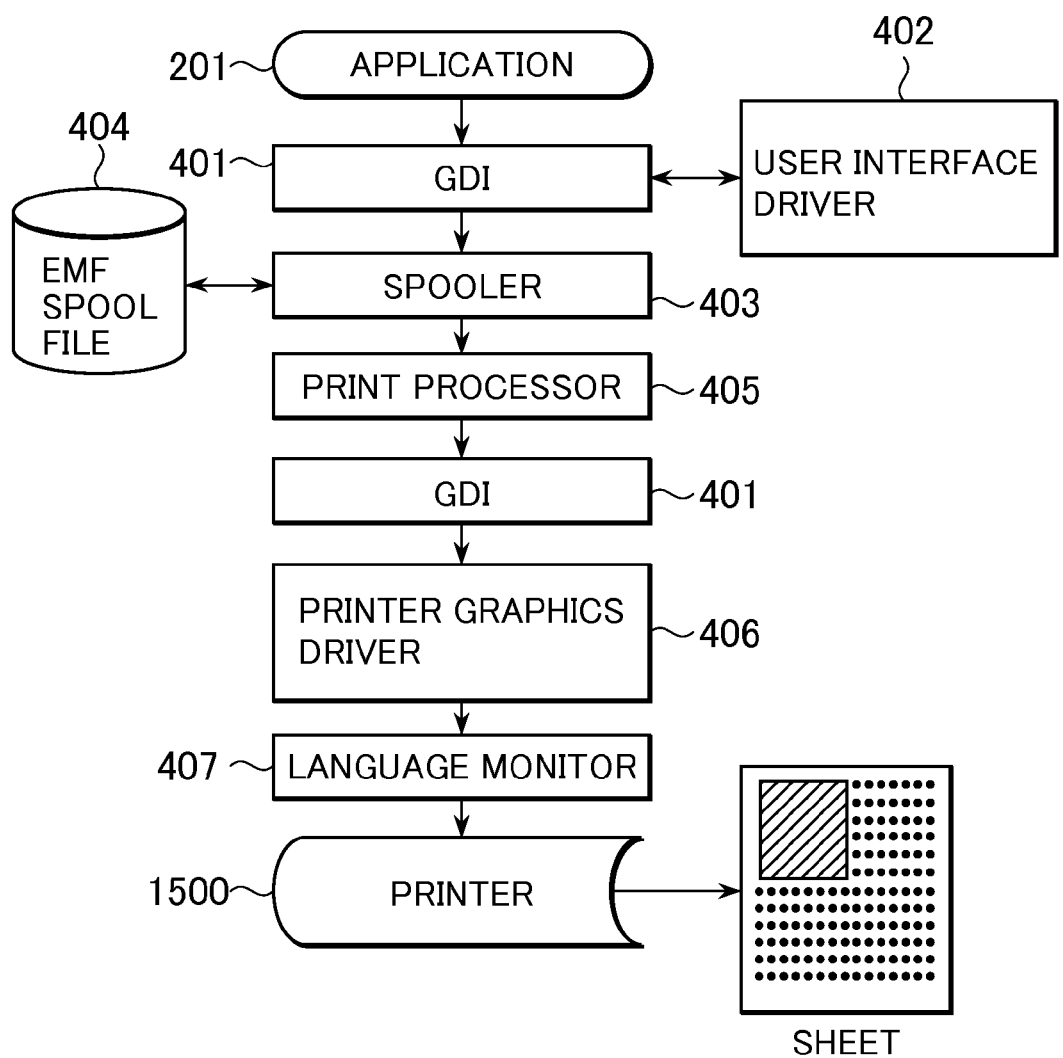
FIG. 12 is a diagram useful in explaining the configuration of functional blocks which operate according to a GDI print path during execution of print control processing by the computer.

FIG. 12 is a diagram useful in explaining the configuration of functional blocks which operate according to the GDI print path during execution of print control processing by the computer 3000.

As shown in FIG. 12, the functional blocks of the computer 3000 which operate according to the GDI print path is comprised of the application 201, a GDI 401, a user interface driver 402, a spooler 403, an EMF spool file 404, a print processor 405, a printer graphics driver 406, and a language monitor 407.

First, a description will be given of the print control function of each functional block shown in FIG. 12.

The application 201 sets print conditions for the printer 1500 via the GDI 401. Specifically, the application 201 sets the size of sheets to be used for printing, whether or not to perform reverse-order printing, whether or not to perform bookbinding printing in which printing is performed in a manner adapted to bookbinding of a printout, and other print conditions, for example. Further, the application 201 issues a drawing command for forming an image of a document, a photographic image or the like to the printer 1500, thereby instructing the printer 1500 to execute printing. In the following description given with reference to FIG. 12, document data, image data, and a drawing command sent to the spooler 403 via the GDI 401 when the drawing command is issued will be generically referred to as "print data".

Figure 26:
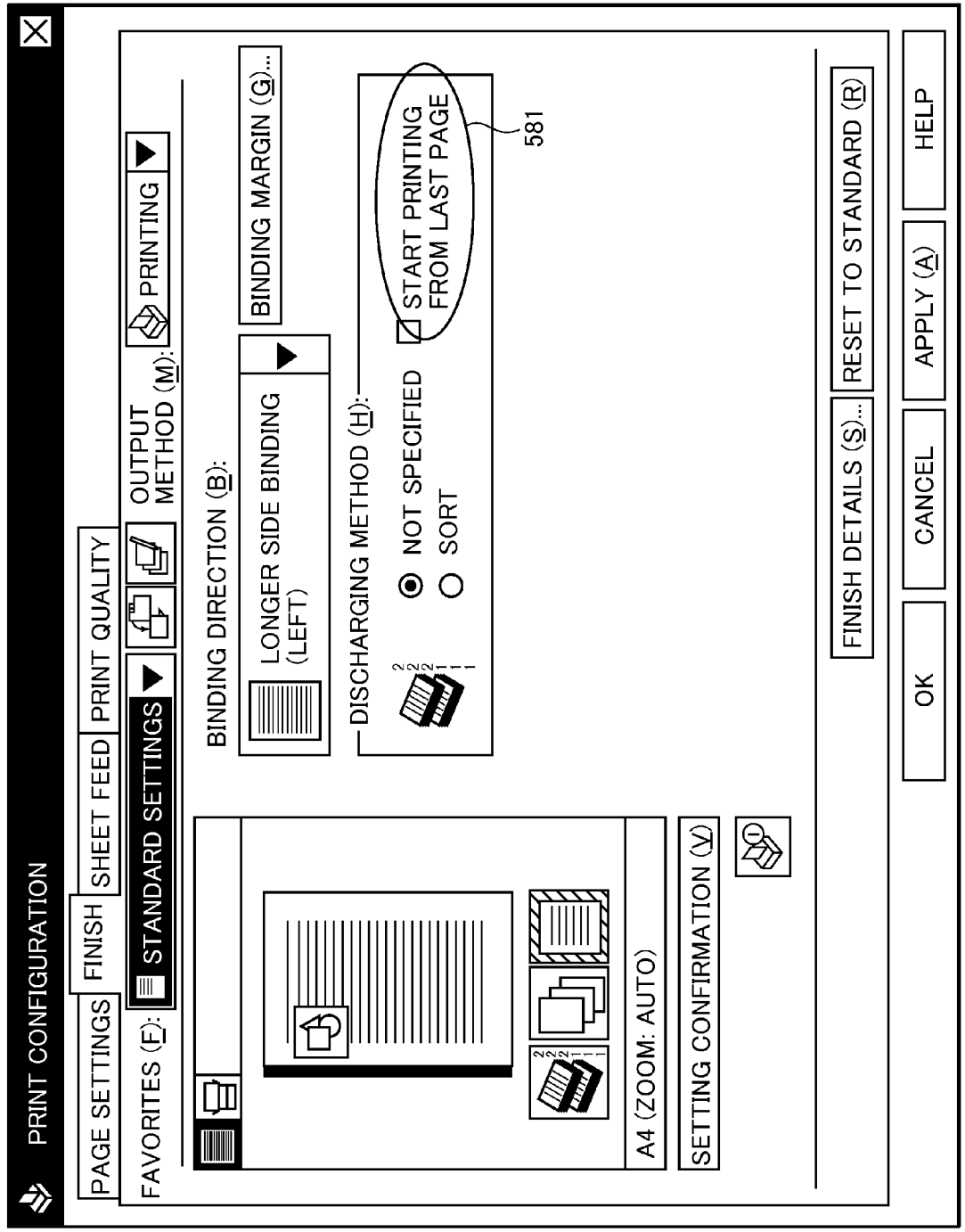
FIG. 26 is a view showing an example of a print configuration screen having settings for reverse-order printing added therein.
Figure 27:
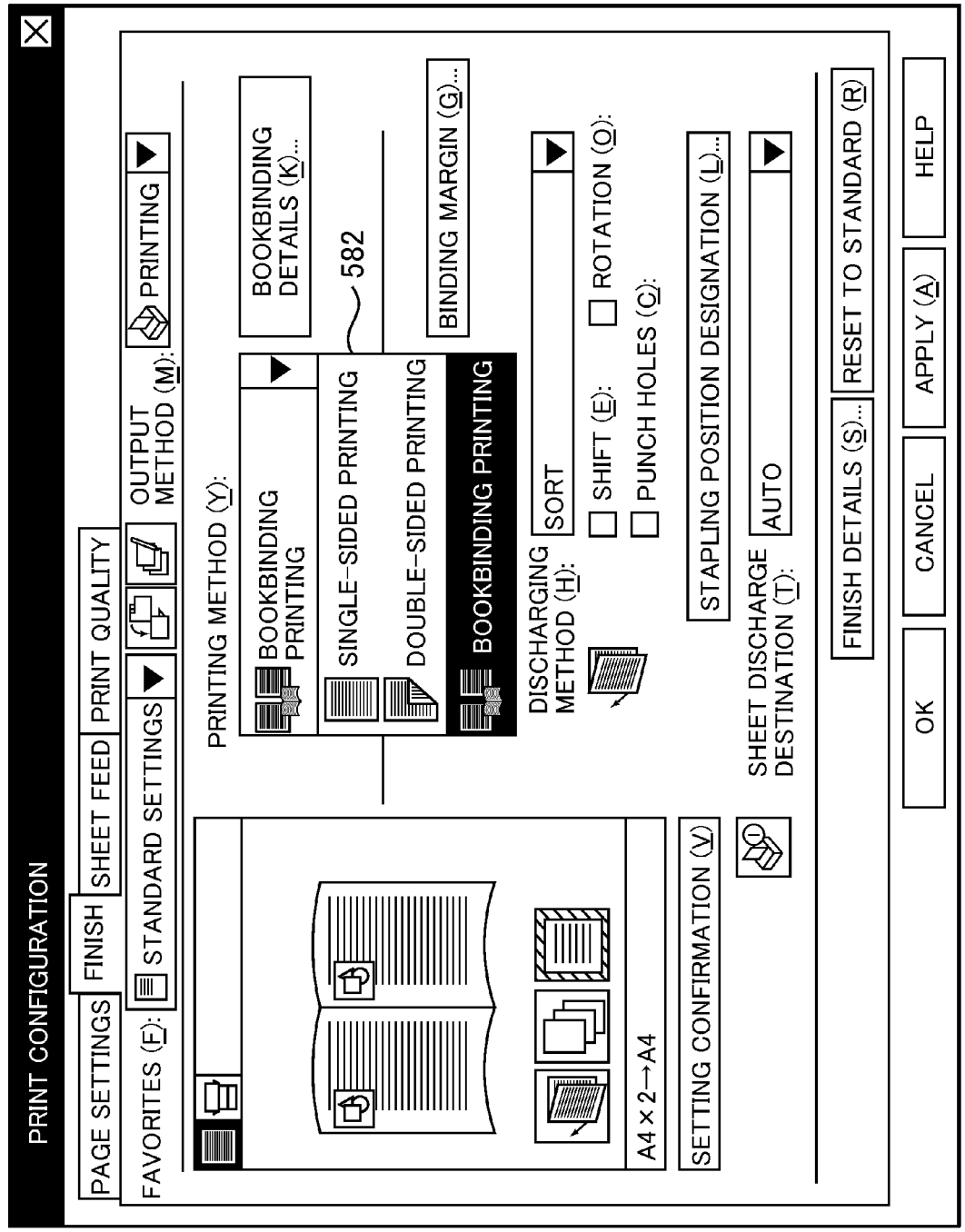
FIG. 27 is a view showing an example of the print configuration screen having settings for bookbinding printing added therein.

The user interface driver 402 changes the print conditions sent via the GDI 401 to ones suitable for the printer 1500 and finally determines these as final print conditions. Further, the user interface driver 402 notifies the spooler 403 of the finally determined print conditions via the GDI 401. The user interface driver 402 provides user interface for configuring various print settings. For example, the user interface driver 402 provides a check box 581 on a print configuration screen shown in FIG. 26 so that the user can select whether or not to perform reverse-order printing, and provides a combo box 582 appearing in FIG. 27 so that the user can select whether or not to perform bookbinding printing. The user interface driver 402 finally determines the final print conditions based on the information set by the user.

The spooler 403 stores the print data and the print conditions sent via the GDI 401, in the EMF spool file 404. The print processor 405 processes the print data stored in the EMF spool file 404, on a page-by-page basis. The printer graphics driver 406 converts the print data into PDL data that can be printed out by the printer 1500. The language monitor 407 bidirectionally communicates with the printer 1500 and acquires information on the printer 1500. The information on the printer 1500 is displayed on the display device 110. Further, the language monitor 407 supplies the PDL data generated by the printer graphics driver 406 to the printer 1500. It should be noted that the language monitor 407 can employ a different transmission method according to the memory capacity of the printer 1500 or the configuration of an engine controller of the printer 1500.

Next, a description will be given of a sequence of operations of the print control functions in the GDI print path.

First, in response to an operation instruction from the user, the application 201 sets print conditions and gives an instruction for execution of printing of a desired document or a desired photographic image. Upon reception of the instruction for print execution from the application 201, the GDI 401 notifies the user interface driver 402 of the settings of the print conditions of the printer 1500 and a print start event.

When notified of the settings of the print conditions, the user interface driver 402 refers to the settings of the print conditions and determines whether or not the settings are such that the printer 1500 can perform printout according thereto. If it is determined that the settings are not such that the printer 1500 can perform printout according thereto, the user interface driver 402 partly changes the settings of the print conditions such that the printer 1500 can perform printout according thereto, to thereby finally determines the print conditions.

Thereafter, the application 201 issues a drawing command for the document or the image data via the GDI 401. The spooler 403 receives the print data generated in response to the drawing command issued from the application 201 and the print conditions finally determined by the user interface driver 402, and then stores the received print data and print conditions in the EMF spool file 404.

The print processor 405 acquires the settings of the print conditions and the print data from the EMF spool file 404. Further, the print processor 405 supplies the settings of the print conditions and the print data, on a page-by-page basis, to the printer graphics driver 406 via the GDI 401.

The GDI 401 converts the drawing command contained in the print data into a graphics drawing command in the course of supply of the print data from the print processor 405 to the printer graphics driver 406. The printer graphics driver 406 generates PDL data interpretable by the printer 1500 from the print data supplied from the print processor 405, based on the graphics drawing command generated by the GDI 401 and the settings of the print conditions notified from the same. The language monitor 407 transfers the PDL data supplied from the printer graphics driver 406 via an interface for use in transmission of PDL data from the computer 3000 to the printer 1500. The printer 1500 interprets the PDL data supplied from the language monitor 407 and prints out print image data on sheets.

Next, a description will be given of the computer 3000 which operates according to an XPS print path.

Figure 13:
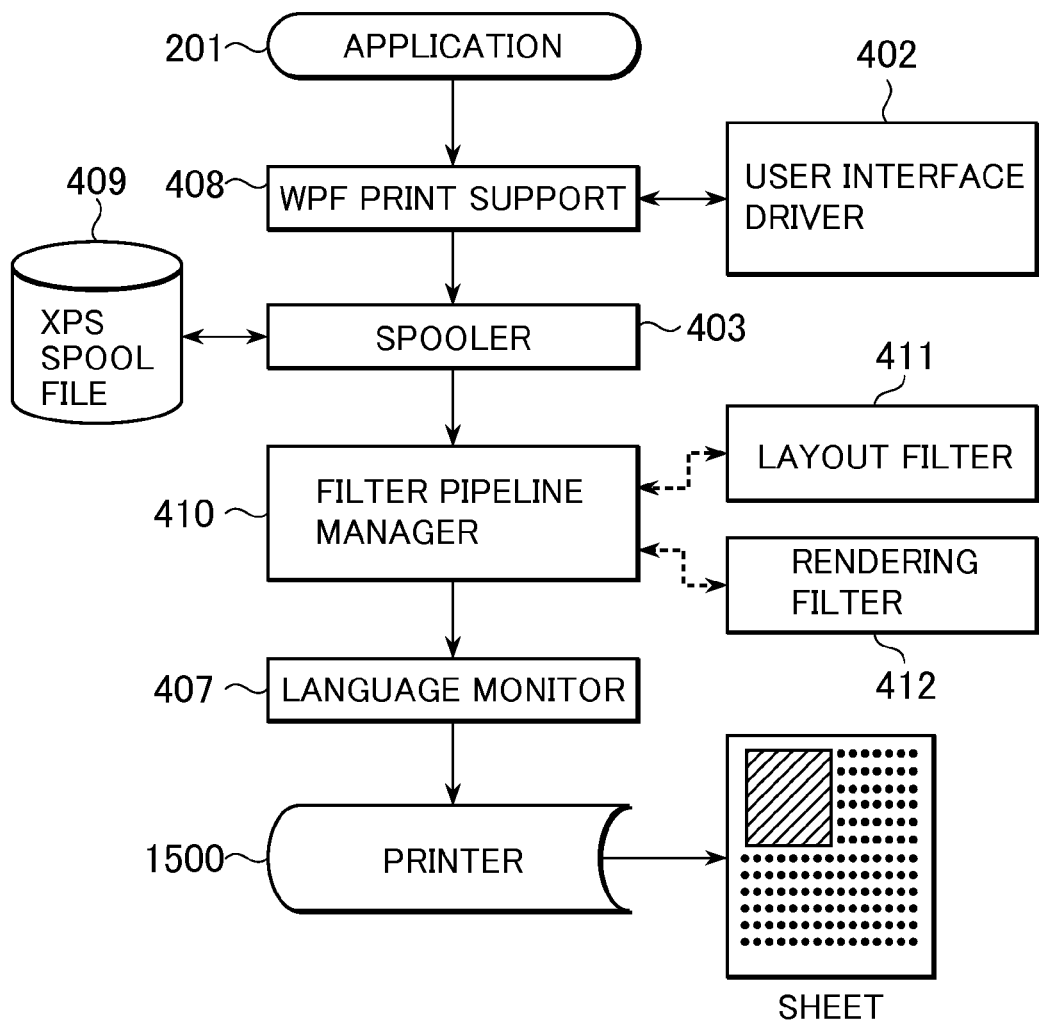
FIG. 13 is a diagram useful in explaining the configuration of functional blocks which operate according to the XPS print path during the print control processing executed by the computer.

FIG. 13 is a diagram useful in explaining the configuration of functional blocks which operate according to the XPS print path during the print control processing executed by the computer 3000.

As shown in FIG. 13, the functional blocks of the computer 3000 which operates according to the XPS print path is comprised of the application 201, a Windows (registered trademark) Presentation Foundation (hereinafter abbreviated as "the WPF") print support 408, the user interface driver 402, the spooler 403, an XPS spool file 409, a filter pipeline manager 410, a layout filter 411, a rendering filter 412, and the language monitor 407.

First, a description will be given of the print control functions of functional blocks shown in FIG. 13.

The application 201 generates an XPS document via the WPF print support 408. Further, the application 201 sets a document or documents and photographic images contained in the XPS document (hereinafter generically referred to as "documents contained in the XPS document" as deemed appropriate), print conditions, and a drawing command, in the XPS document. Hereafter, the documents contained in the XPS document, and the drawing command will be generically referred to "print data". Further, the application 201 instructs execution of printing via the WPF print support 408.

The WPF print support 408 lays out the XPS document in response to the instruction from the application 201. Further, the WPF print support 408 extracts the settings of the print conditions from the XPS document, and sends the settings to the user interface driver 402. The WPF print support 408 sets the settings of the print conditions finally determined by the user interface driver 402, in the XPS document. Then, the WPF print support 408 sends the XPS document to the spooler 403.

The user interface driver 402 changes the print conditions notified by the WPF print support 408 to ones suitable for the printer 1500 and finally determines these as final print conditions. Further, the user interface driver 402 notifies the WPF print support 408 of the finally determined print conditions. Similarly to the above-described case of the GDI print path, the user interface driver 402 provides user interface for configuring various print settings. For example, the user interface driver 402 provides the check box 581 on the print configuration screen shown in FIG. 26 so that the user can select whether or not to perform reverse-order printing, and provides the combo box 582 appearing in FIG. 27 so that the user can select whether or not to perform bookbinding printing. The user interface driver 402 finally determines the final print conditions based on the information set by the user.

The spooler 403 stores the XPS document sent from the WPF print support 408 in the XPS spool file 409. The filter pipeline manager 410 converts the XPS document stored in the XPS spool file 409 into PDL data that can be printed out by the printer 1500, via the layout filter 411 and the rendering filter 412, and supplies the PDL data to the printer 1500.

The layout filter 411 edits the print data in the XPS document and the page layout of the XPS document. The rendering filter 412 converts the print data in the XPS document, which has been edited by the layout filter 411, into PDL data that can be printed out by the printer 1500.

The language monitor 407 bidirectionally communicates with the printer 1500 and acquires information on the printer 1500. The information on the printer 1500 is displayed on the display device 110. Further, the language monitor 407 supplies the PDL data sent from the filter pipeline manager 410 to the printer 1500. It should be noted that the language monitor 407 can employ a different transmission method according to the memory capacity of the printer 1500 or the configuration of the engine controller of the printer 1500.

Next, a description will be given of a sequence of operations of the print control functions in the XPS print path.

First, the application 201 reads a document, such as a desired document and photographic image, according to an operation instruction from the user. It should be noted that the desired document includes an XPS document generated in advance. Then, the application 201 generates an XPS document according to an operation instruction from the user, and sets the documents contained in the XPS document, such as documents and photographic images, print conditions, and a drawing command, in the XPS document. It should be noted that when the XPS document generated in advance is read, it is not required to generate a new XPS document, but the application 201 only has to edit print conditions and a drawing command contained in the read XPS document according to an operation instruction from the user.

In the XPS print path, the print conditions are configured using an XML file described according to the form of a pre-defined XML schemer. The form of the XML schemer pre-defined for print configuration will be referred to as "the print schemer", and an XML file in which the printing conditions are described according to the form of the print schemer will be referred to as "a print ticket".

A print ticket (not shown) is contained in an XPS document, with its form unchanged. An XPS document can contain a plurality of print tickets e.g. in the form of a file having information on print settings to be applied to the entire document, a file having information on print settings to be applied to a certain document, a file having information on print settings to be applied to a certain page, and so forth. Further, a print ticket describes information on print settings, shown in FIG. 28, including an information item 551 as to whether or not to perform reverse-order printing and an information item 552 as to whether or not to perform bookbinding printing.

Although in the present embodiment, print settings are stored in a print ticket and are passed as contained in the XPS document via the filter pipeline manager 410, when print settings are configured by an XPS printer driver comprised of the user interface driver 402, the layout filter 411, and the rendering filter 412, it is possible to directly pass information on print settings via cooperation between the layout filter 411 and the rendering filter 412, without using a print ticket.

Then, the application 201 instructs execution of printing using the XPS document, according to the operation instruction from the user. Upon reception of the instruction for execution of printing from the application 201, the WPF print support 408 takes out the print ticket from the XPS document and sends the print ticket as settings of the print conditions to the user interface driver 402.

The user interface driver 402 receives the settings of the print conditions for printing by the printer 1500, and then refers to the settings of the print conditions to determine whether or not the settings are such that the printer 1500 can perform printout according thereto. If it is determined that the settings are not such that the printer 1500 can perform printout according thereto, the user interface driver 402 partly changes the settings of the print conditions such that the printer 1500 can perform printout according thereto, and then finally determines the print conditions. Then, the user interface driver 402 updates the print ticket based on the finally determined print conditions, and notifies the updated print ticket to the WPF print support 408. The WPF print support 408 sets the print ticket notified from the user interface driver 402 in the XPS document and sends the XPS document to the spooler 403.

Upon reception of the XPS document from the WPF print support 408, the spooler 403 stores the received XPS document in the XPS spool file 409. Then, the spooler 403 notifies a print start event to the filter pipeline manager 410.

Upon being notified of the print start event from the spooler 403, the filter pipeline manager 410 acquires the XPS document from the XPS spool file 409, and sends the XPS document to the layout filter 411.

The layout filter 411 acquires the print data and the print ticket from the received input XPS document. Then, the layout filter 411 edits the print data and the page layout of the XPS document based on the settings of the print conditions described in the print ticket. It should be noted that the contents to be edited of the print data and the page layout include bitmap synthesis (watermark), page synthesis (layout), page order change (reverse order), etc. There can exist a plurality of print tickets, as described hereinbefore, and in this case, the layout filter 411 interprets all print settings described in each of the tickets, and generates an XPS document in which each page within the document has properly configured settings for printing.

Then, the layout filter 411 sends the XPS document having undergone the editing of the print data and the page layout to the filter pipeline manager 410. The filter pipeline manager 410 transfers the XPS document received from the layout filter 411 to the rendering filter 412.

The rendering filter 412 acquires the print data and the print ticket from the received XPS document. Then, the rendering filter 412 generates the PDL data interpretable by the printer 1500 from the print data based on the settings of the print conditions described in the print ticket, and sends the PDL data to the filter pipeline manager 410. It should be noted that there can exist a plurality of print tickets, as mentioned above, and in this case, the rendering filter 412 interprets all print settings described in each of the tickets, and generates PDL data, based on suitable print settings, for each page within the document.

The filter pipeline manager 410 supplies the PDL data sent from the rendering filter 412 to the language monitor 407. The language monitor 407 transfers the PDL data supplied from the filter pipeline manager 410 to the printer 1500 via an interface for use in transfer of PDL data from the computer 3000 to the printer 1500. The printer 1500 interprets the PDL data sent from the language monitor 407, and prints out the print image data on sheets.

It should be noted that the layout filter 411 can be divided into a plurality of functional processing sections insofar as the division is based on a definition concerning the printing system in the XPS print path. In this case, the function-executing sections performs processing, including executing predetermined processing, and then notifying the XPS document edited by the predetermined processing to the filter pipeline manager 410, repeatedly, i.e. on a section-by-section basis.

Further, the layout filter 411 and the rendering filter 412 can be integrated into a single function-executing section insofar as the integration is based on a definition concerning the printing system in the XPS print path. In this case, processing for sending the edited XPS document to the filter pipeline manager 410 is not performed, but both of processing to be executed by the layout filter 411 and processing to be executed by the rendering filter 412 are executed, and then the generated PDL data is sent to the filter pipeline manager 410.

In Windows (registered trademark) Vista, which of the printing systems, i.e. the GDI print path and the XPS print path, is to be used is automatically determined by the OS and the printing system provided by the OS, based on the capabilities of the application 201 and the printer driver. The printer driver mentioned here is intended to mean an application comprised of the user interface driver 402 and the printer graphics driver 406 in the case of the GDI print path, and an application comprised of the user interface driver 402, the layout filter 411, and the rendering filter 412, in the case of the XPS print path.

Now, a description will be given again of essential part data existing in the XPS spool file 409 used in the XPS print path.

The XPS data includes a plurality of kinds of part data items described below by way of example, in addition to image files and font files (corresponding to resource files in the present invention), and the part data items have respective reference tags described below.

a) _rels/.rels: a part data item as a starting point of a document data item (data of one XPS document). This part data item has a reference tag to FixedDocumentSequence (hereinafter abbreviated as "FDS") referred to hereinafter.

b) FDS: a part data item describing layout information on one document data item. This part data item has a reference tag to FixedDocument (hereinafter abbreviated as "FD") described hereinafter. It should be noted that one document data item can include a plurality of documents. In other words, an FDS can have a plurality of reference tags to respective FDs.

c) FD: a part data item (file of page layout data) describing layout information on a document. This part data item has a reference tag to FixedPage (hereinafter abbreviated as "FP") referred to hereinafter. It should be noted that one document can include a plurality of pages. In other words, an FD can have a plurality of reference tags to respective FPs.

d) FP: a part data item (file of data to be printed) describing page information to be printed. This part data item can have reference tags to image files and a font file, as required. For example, when one page includes an image to be formed thereon, the FD has a reference tag to an image file of the image. It should be noted that the FP stores print data to be printed.

Next, processing performed by the layout filter 411 as one of the print control functions in the above-mentioned XPS print path will be described with reference to FIGS. 14 to 24.

Figure 14:
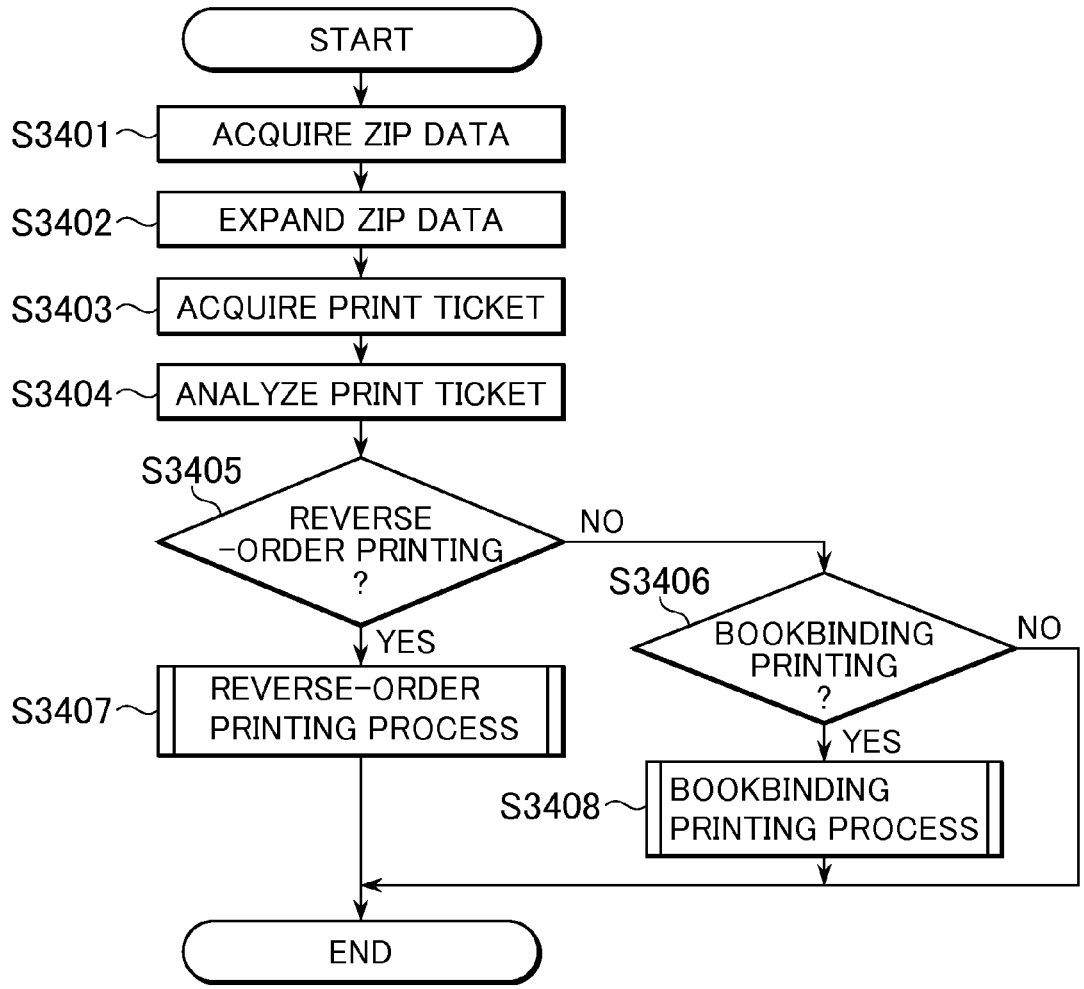
FIG. 14 is a flowchart of a print control process executed by a layout filter appearing in FIG. 13.

FIG. 14 is a flowchart of a print control process executed by the layout filter 411 appearing in FIG. 13.

Upon reception of a notification of the print start event from the spooler 403, the filter pipeline manager 410 acquires an XPS document from the XPS spool file 409 and sends the XPS document to the layout filter 411. As described hereinbefore, the XPS document is ZIP-compressed data (hereinafter referred to as "ZIP data"). The layout filter 411 receives the ZIP data and inputs the same into the RAM 102 (step S3401). Then, the layout filter 411 expands the acquired ZIP data (step S3402). As a method of expanding ZIP data, a general method of expanding ZIP data is employed, and various files in the expanded data are written into the external memory 111 with the directory structure of the data maintained, whereby the expanded data is stored in the external memory 111.

Next, the layout filter 411 acquires a print ticket from the expanded data so as to acquire reverse-order printing setting information indicative of whether or not execution of reverse-order printing is set, and bookbinding printing setting information indicative of whether or not execution of bookbinding printing is set (step S3403), and analyzes the acquired print ticket (step S3404). The print ticket is a file described in the XML format, as described hereinbefore. It is assumed that a general print ticket analysis method is employed as a method of analyzing the print ticket. Similarly, in processes described hereinafter, a general XML file analysis method is employed when analyzing an XML file described in the XML format. An XPS file can contain a plurality of print tickets as described hereinbefore. In the present step, print setting information, such as reverse-order printing setting information and bookbinding printing setting information, set for the entire document is acquired, and hence a print ticket having information on print settings configured for the entire document is analyzed.

The layout filter 411 acquires the reverse-order printing setting information and the bookbinding printing setting information through the print ticket analysis in the step S3404, and stores these acquired pieces of print setting information in a memory area secured in the RAM 102 managed by the layout filter 411 itself. FIG. 25 shows layout filter information stored in the memory area secured in the RAM 102 by the layout filter 411.

As shown in FIG. 25, the reverse-order printing setting information is stored in a reverse order flag 501, while the bookbinding printing setting information is stored in a bookbinding printing flag 502. Each of the flags is set to be on when the execution of the associated printing is set, and off when the same is not set. It should be noted that when the print ticket does not contain the print setting information concerning reverse-order printing or bookbinding printing, it is considered that execution of general normal-order printing is set. Variables M, N, I, J, K, H, and T stored in the layout filter information shown in FIG. 25 are used in processes described hereinafter.

Next, the layout filter 411 determines, based on the result of the print ticket analysis in the step S3404, whether or not the execution of reverse-order printing is set (step S3405). The determination is made based on whether the reverse order flag 501 of the layout filter information shown in FIG. 25 is on or off. If the reverse order flag 501 is on, a reverse-order printing process, described hereinafter, is executed (step S3407).

On the other hand, if the reverse order flag 501 is held off, the layout filter 411 determines whether or not the execution of bookbinding printing is set (step S3406). The determination is made based on whether the bookbinding printing flag 502 of the layout filter information shown in FIG. 25 is on or off. If the bookbinding printing flag 502 is on (YES to the step S3406), a bookbinding printing process, described hereinafter, is executed (step S3408), whereas if the bookbinding printing flag 502 is off (NO to the step S3406), the present process is immediately terminated.

Next, the reverse-order printing process executed in the step S3407 in FIG. 14 will be described in detail with reference to FIG. 15.

Figure 15:
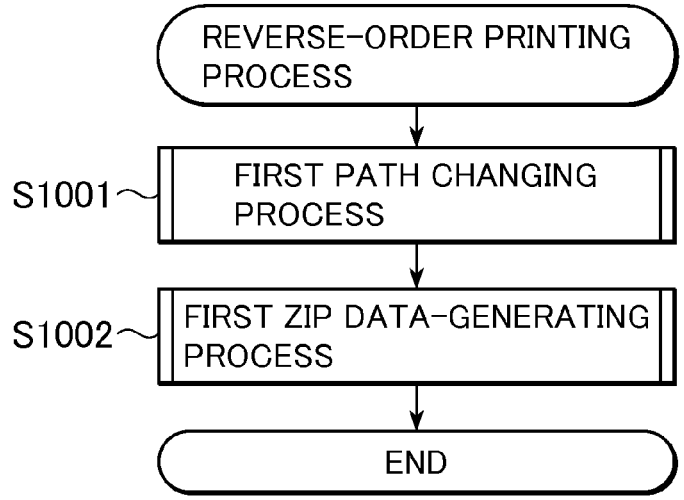
FIG. 15 is a flowchart of a reverse-order printing process in the first embodiment.

FIG. 15 is a flowchart of the reverse-order printing process in the first embodiment.

In the reverse-order printing process in the first embodiment, the layout filter 411 generates an XPS document having a data sequence for reverse-order printing, based on the XPS document received from the filter pipeline manager 410 in the step S3401 in FIG. 14 and expanded in the step S3402. Specifically, a first path changing process (step S1001) and a first ZIP data-generating process (step S1002) are sequentially executed. These processes will be described in detail hereinafter.

Next, the first path changing process executed in the step S1001 in FIG. 15 will be described in detail with reference to FIG. 16.

Figure 16:
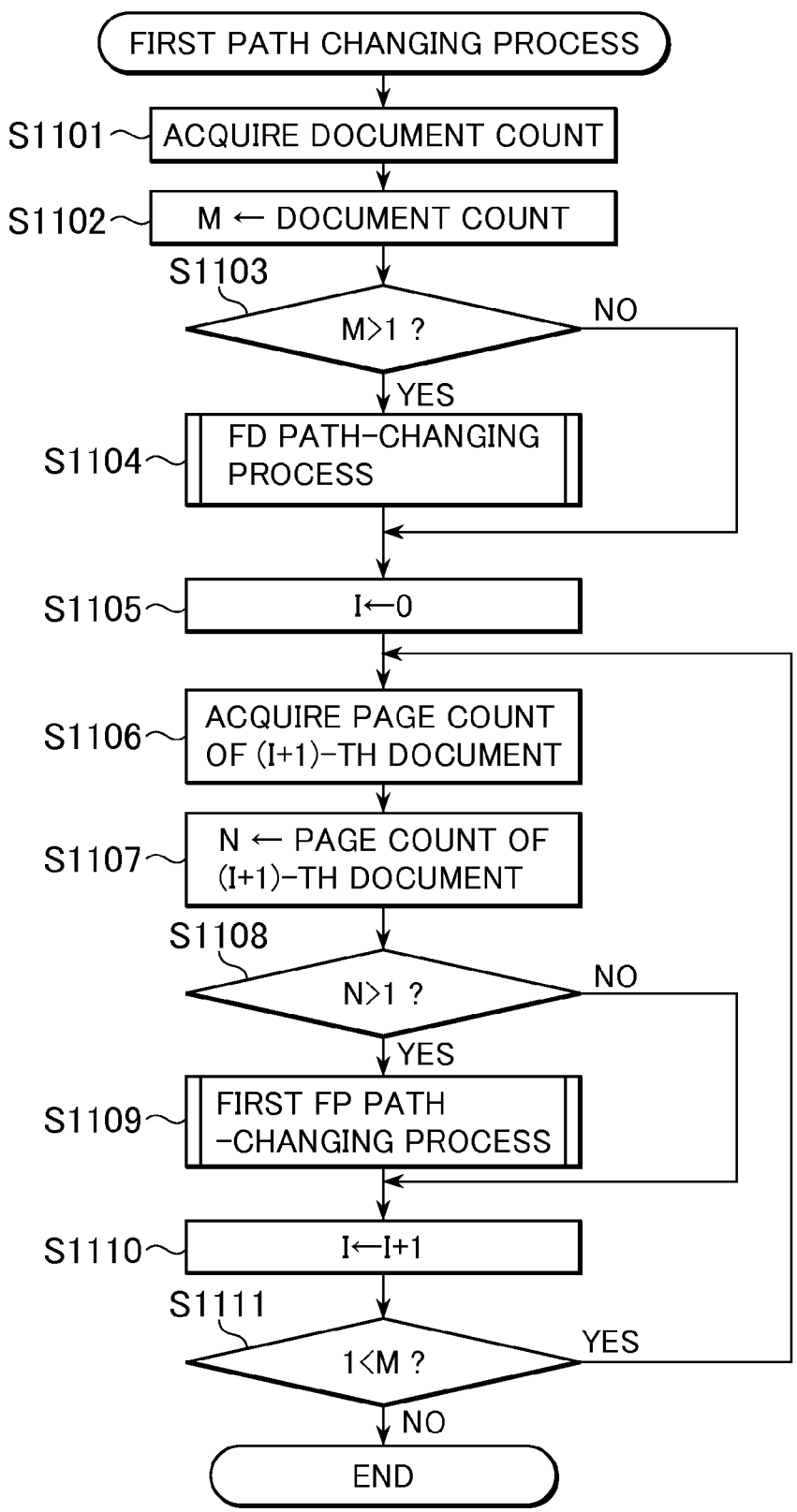
FIG. 16 is a flowchart of a first path changing process executed in a step S1001 in FIG. 15.

FIG. 16 is a flowchart of the first path changing process executed in the step S1001 in FIG. 15.

In the first path changing process, the layout filter 411 changes paths of some FD and FP files in the XPS document received from the filter pipeline manager 410, and generates expanded data as a source of an XPS document having the data sequence for reverse-order printing.

Specifically, first, the layout filter 411 acquires a document count indicative of the number of documents in the XPS document (step S1101). The document count can be acquired by analyzing FDS part data and checking how many FD Dart data items exist. Then, the layout filter 411 stores the document count in the memory area secured in the RAM 102 managed by the layout filter 411 itself (step S1102). In this step, the document count is stored as the variable M in the memory area.

Next, the layout filter 411 determines whether or not it is required to change paths of some FD files so as to generate the expanded data as the source of the XPS document having the data sequence for reverse-order printing. If it is required, file path change is carried out. When there is only one document, it is not required to change the path of the file, whereas when there are more than two documents, it is required to change the paths of the respective files. Specifically, the layout filter 411 determines whether or not the variable M is larger than 1 (step S1103). If the variable M is larger than 1, the layout filter 411 executes an FD path-changing process (step S1104). On the other hand, if the variable M is not larger than 1, the process proceeds to a step S1105 without execution of the FD path-changing process in the step S1104.

Now, the FD path-changing process will be described in detail with reference to FIG. 17.

Figure 17:
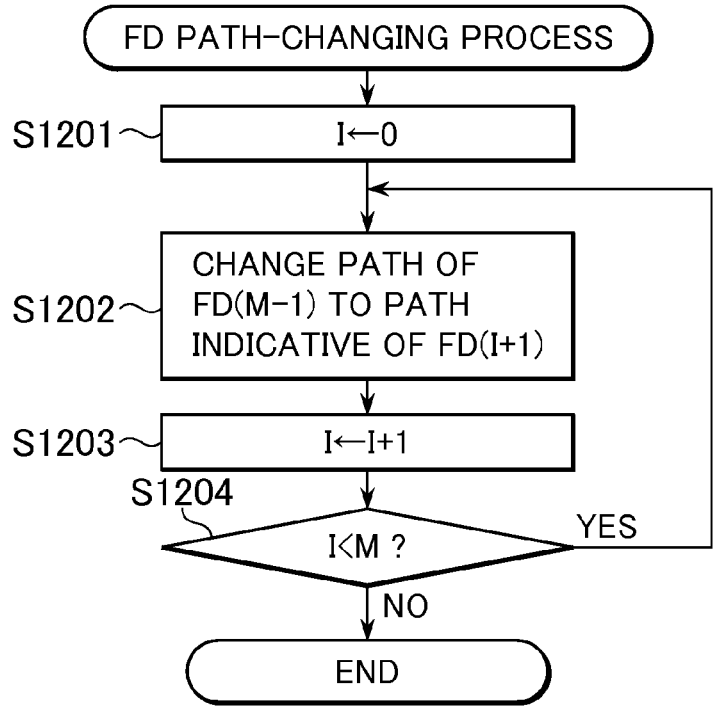
FIG. 17 is a flowchart of a FD path-changing process executed in a step S1104 in FIG. 16.

FIG. 17 is a flowchart of the FD path-changing process executed in the step S1104 in FIG. 16.

In the FD path-changing process, the layout filter 411 reverses the order of the paths of respective FDs such that the FDs are rearranged in the data sequence for reverse-order printing. For example, if four documents exist in the XPS document, the path of an FD indicative of a fourth document is changed to the path of an FD indicative of a first document, the path of an FD indicative of a third document to the path of an FD indicative of a second document, the path of the FD indicative of the second document to the path of the FD indicative of the third document, and the path of the FD indicative of the first document to the path of the FD indicative of the fourth document.

Specifically, first, the layout filter 411 initializes the variable I in the memory area secured in the RAM 102 managed by the layout filter 411 itself to 0 (step S1201). Then, the layout filter 411 changes the path of an FD indicative of an (M−1)-th document to the path of an FD indicative of an (I+1)-th document (step S1202). For example, assuming that the variable M is equal to 5 and the variable I is equal to 0 and that the path of the FD indicative of the fifth document is represented by "/Document/5/FixedDocument.xml" and the path of the FD indicative of the first document is represented by "/Document/1/FixedDocument.xml", the path of the former FD path is changed to "/Document/1/FixedDocument.xml". At this time, in order to prevent a plurality of paths having the same name from existing even temporarily after the path change, change processing is carried out in a temporary directory, for example. Hereafter, an FD indicative of an X-th document will be represented by "FD(X)".

Next, the layout filter 411 adds 1 to the variable I (step S1203). In other words, the layout filter 411 memorizes which of the documents has been subjected to the FD path change. Then, the layout filter 411 performs comparison between the variable I and the variable M (step S1204), and if the variable I is smaller than the variable M, the steps S1202 to S1203 are repeatedly carried out. When the variable I becomes not smaller than the variable M after repeated execution of the steps S1202 to S1203, the present FD path-changing process is terminated. In short, the layout filter 411 performs FD path change on all the documents while determining whether or not the FD path change has been performed on all the documents. Thus, the order of all the paths of the FDs is reversed by the steps S1201 to S1204.

Referring again to FIG. 16, in the steps S1106 to S1111, the layout filter 411 reverses the order of the paths of respective FPs on a document-by-document basis such that the FPs in all the documents are rearranged in the data sequence for reverse-order printing. For example, it is assumed that two documents exist in the XPS document and that a first document has four pages and a second has three. In this case, first, in the first document, the path of an FP indicative of a fourth page is changed to the path of an FP indicative of a first page, the path of an FP indicative of a third page to the path of an FP indicative of a second page, the path of the FP indicative of the second page to the path of the FP indicative of the third page, and the path of the FP indicative of the first page to the path of the FP indicative of the fourth page.

Next, in the second document, the path of an FP indicative of a third page is changed to the path of an FP indicative of a first page, the path of an FP indicative of a second document to the path of the FP indicative of the second page (which means that the path of the FP indicative of the second page is not changed), and the path of the FP indicative of the first page to the path of the FP indicative of the third page. When the document has only one page, it is not required to carry out file path change, whereas when the document has more than two pages, it is required to change the paths of the respective files.

Specifically, first, the layout filter 411 initializes the variable I to 0 (step S1105). Then, the layout filter 411 acquires a page count indicative the number of pages of the (I+1)-th document (step S1106). The page count can be acquired by analyzing the FD part data and checking how many FP part data items exist.

Next, the layout filter 411 stores the acquired page count of the (I+1)-th document in the memory area secured in the RAM 102 managed by the layout filter 411 itself (step S1107). In this step, the page count of the (I+1)-th document is stored as the variable N in the memory area.

Next, the layout filter 411 determines whether or not it is required to change the paths of some FP files in the document so as to generate the expanded data as the source of the XPS document having the data sequence for reverse-order printing. If the path change is required, the paths of the respective files are changed. When the document has only one page, it is not required to carry out file path change, whereas when the document has more than two pages, it is required to change the paths of the respective files. Specifically, the layout filter 411 determines whether or not the variable N is larger than 1 (step S1108). If the variable N is larger than 1, the layout filter 411 executes a first FP path-changing process (step S1109). On the other hand, if the variable N is not larger than 1, the process proceeds to a step S1110 without execution of the process in the step S1109.

Now, the first FP path-changing process will be described in detail with reference to FIG. 18.

Figure 18:
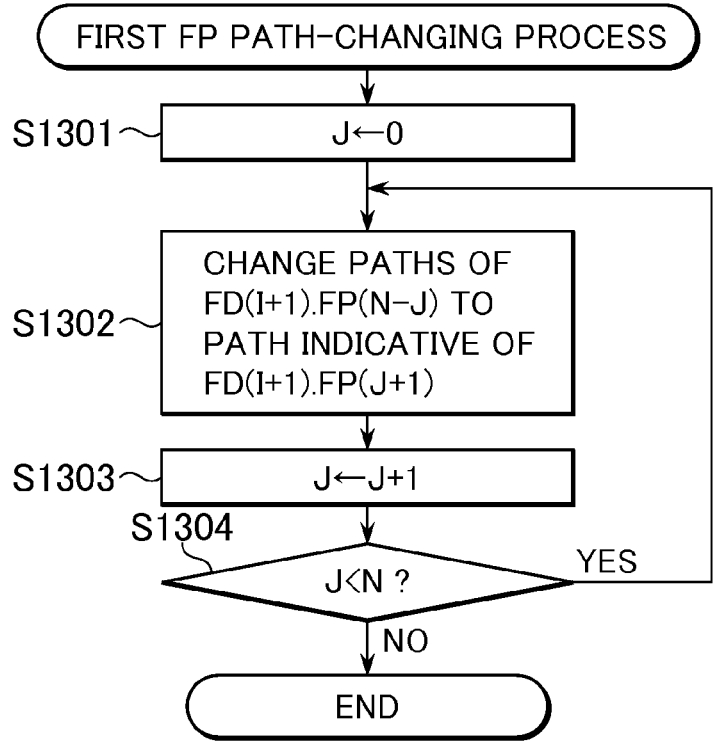
FIG. 18 is a flowchart of a first FP path-changing process executed in a step S1109 in FIG. 17.

FIG. 18 is a flowchart of the first FP path-changing process executed in the step S1109 in FIG. 17.

In the first FP path-changing process, the layout filter 411 reverses the order of the paths of the respective FPs in the document such that the FP part data items are rearranged in the data sequence for reverse-order printing. For example, if a document in the XPS document has four pages, the path of an FP indicative of a fourth page of the document is changed to the path of an FP indicative of a first page of the document, the path of an FP indicative of a third page of the document to the path of an FP indicative of a second page of the document, the path of the FP indicative of the second page of the document to the path of the FP indicative of the third page of the document, and the path of the FP indicative of the first page of the document to the path of the FP indicative of the fourth page of the document.

Specifically, first, the layout filter 411 initializes the variable J in the memory area secured in the RAM 102 managed by the layout filter 411 itself to 0 (step S1301). Then, the layout filter 411 changes the path of an FP indicative of an (N−J)-th page of the (I+1)-th document to the path of an FP indicative of an (J+1)-th page of the (I+1)-th document (step S1302). For example, assuming that the variable I is equal to 0, the variable N to 10, and the variable J to 0, and that the path of an FP indicative of a tenth page of a first document is represented by "/Document/1/Pages/10.xml" and the path of an FD indicative of a first page of the first document is represented by "/Document/1/Pages/1.xml", the path of the former is changed to "/Document/1/Pages/1.xml". At this time, in order to prevent a plurality of paths having the same name from existing even temporarily after the path change, change processing is carried out in the temporary directory, for example. Hereafter, an FP indicative of a Y-th page of an X-th document will be represented by "FD(X).FP(Y)".

Next, the layout filter 411 adds 1 to the variable J (step S1303). In other words, the layout filter 411 memorizes which of the pages has been subjected to the FP path change. Then, the layout filter 411 performs comparison between the variable J and the variable N (step S1304), and if the variable J is smaller than the variable N, the steps S1302 to S1303 are repeatedly carried out. When the variable J becomes not smaller than the variable N after repeated execution of the steps S1302 to S1303, the present first FP path-changing process is terminated. In short, the layout filter 411 performs the FP path change on all the pages while determining whether or not the FP path change has been performed on all the pages. Thus, the order of all the paths of the FPs in the document is reversed by the steps S1301 to S1304.

Referring again to FIG. 16, the layout filter 411 adds 1 to the variable I (step S1110). In other words, the layout filter 411 memorizes which of the documents requiring FP path change has been subjected to the FP path change. Then, the layout filter 411 performs comparison between the variable I and the variable M (step S1111), and if the variable I is smaller than the variable M, the steps S1106 to S1110 are repeatedly carried out until the variable I becomes not smaller than the variable M. In short, the layout filter 411 performs the FP path change on all documents requiring the FP path change while determining whether or not the FP path change has been performed on all the documents. Thus, the order of all the paths of the FPs is reversed on a document-by-document basis by the steps S1105 to S1111.

Next, the first ZIP data-generating process executed in the step S1002 in FIG. 15 will be described in detail with reference to FIG. 19.

Figure 19:
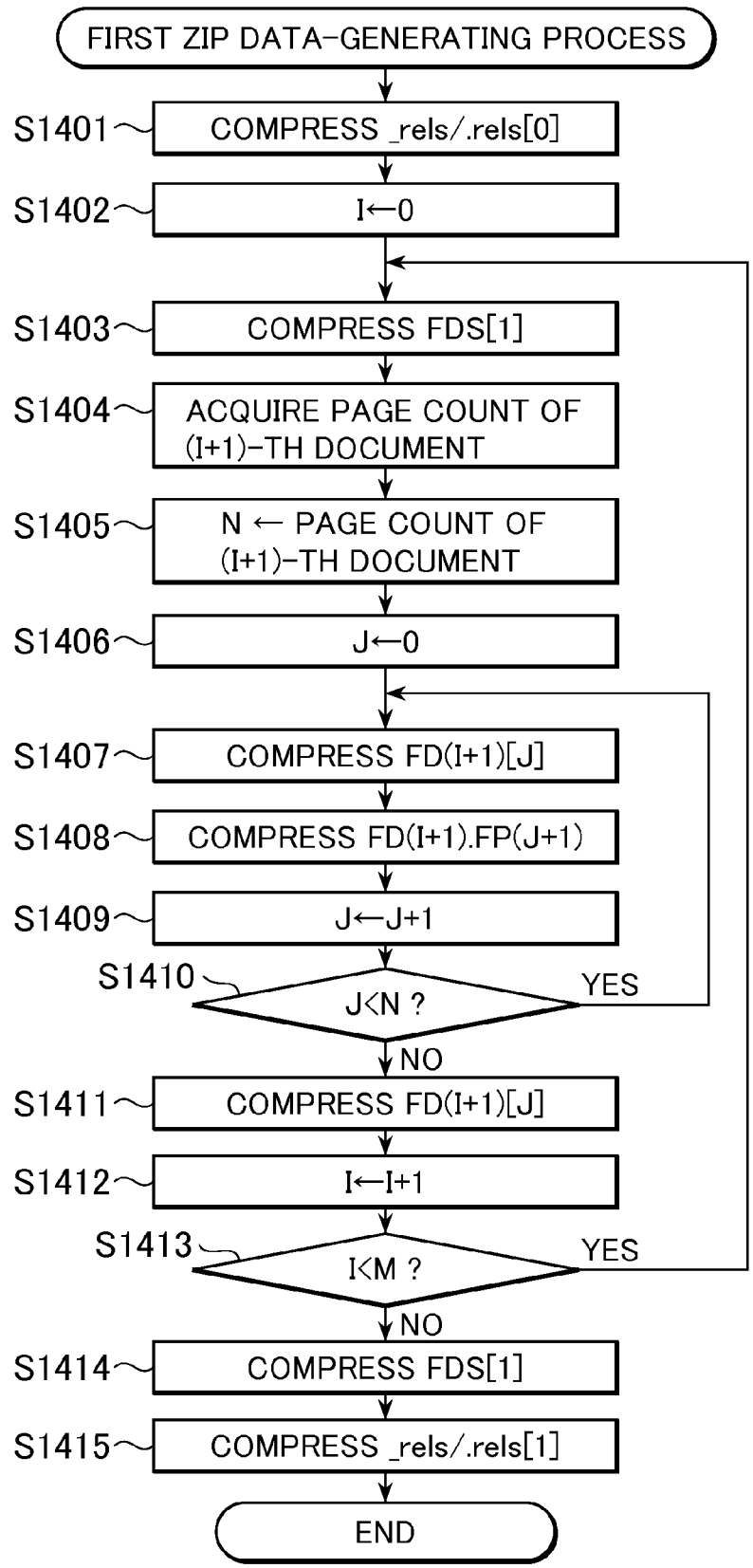
FIG. 19 is a flowchart of a first ZIP data-generating process executed in a step S1002 in FIG. 15.

FIG. 19 is a flowchart of the first ZIP data-generating process executed in the step S1002 in FIG. 15.

When a Z-th part data item of part data interleaved by the printing system (WPF print support 408) provided by the OS is represented as "part name [Z−1]", first, the layout filter 411 ZIP-compresses rels/.rels [0] to generate Local File Header and file data (step S1401). In other words, the layout filter 411 writes a _rels/.rels part data item having a reference tag to an FDS part data item to be referred to next, in a first position.

It should be noted that the interleave processing may be performed by the FIG. 2 application 201 provided with the interleaving function, or alternatively, the application 201 may perform the interleave processing using an OS function (e.g. using an API provided by the OS).

Next, the layout filter 411 initializes the variable I to 0 (step S1402). Then, the layout filter 411 ZIP-compresses interleaved FDS [I] to generate Local File Header and file data (step S1403). In other words, the layout filter 411 writes a FDS part data item having a reference tag to an FD part data item to be referred to next, in a second position.

Next, the layout filter 411 acquires the page count of the (I+1)-th document (step S1404). An acquisition method employed here is the same as mentioned hereinbefore. Then, the layout filter 411 stores the acquired page count of the (I+1)-th document as the variable N (step S1405). Thereafter, the layout filter 411 initializes the variable J to 0 (step S1406).

Next, the layout filter 411 ZIP-compresses interleaved FD(I+1)[J] to generate Local File Header and file data (step S1407). In other words, the layout filter 411 writes an FD part data item having a reference tag to an FP part data item to be referred to next, in a third position.

Then, the layout filter 411 ZIP-compresses FD(I+1).FP[J+1] to generate Local File Header and file data (step S1408). In other words, the layout filter 411 writes an FP part data item to be referred to next, in a fourth position.

Next, the layout filter 411 adds 1 to the variable J (step S1409). In other words, the layout filter 411 memorizes which of the pages has been subjected to the FD and FP part data write processing.

Then, the layout filter 411 performs comparison between the variable J and the variable N (step S1410), and if the variable J is smaller than the variable N, the steps S1407 to S1409 are repeatedly carried out until the variable J becomes not smaller than the variable N. In short, the layout filter 411 sequentially writes the interleaved FD part data items and the FP part data items of all the pages of the present document in the above-described order while determining whether or not all of the interleaved FD part data items and the FP part data items of all the pages of the document have been written.

Next, the layout filter 411 ZIP-compresses FD(I+1)[J], i.e. the last part data item of the interleaved FD part data of the document to generate Local File Header and file data (step S1411). In short, the remaining FD part data of the document is written. Thus, all the interleaved FD and FP part data items of the document are rearranged in the reverse data sequence by the steps S1404 to S1411.

Next, the layout filter 411 adds 1 to the variable I (step S1412). In other words, the layout filter 411 memorizes which of the documents has been subjected to the processing for writing FDS, FD, and FP part data items. Then, the layout filter 411 performs comparison between the variable I and the variable M (step S1413), and if the variable I is smaller than the variable M, the steps S1403 to S1412 are repeatedly carried out until the variable I becomes not smaller than the variable M. In short, the layout filter 411 sequentially writes all the FDS part data items except the last data item of the interleaved FDS part data, and all the FD part data items and FP part data items of all the documents, in the above-described order, while determining whether or not all the FDS part data items except the last data item of the interleaved FDS part data, and all FD part data items and all the FP part data items of all the documents, have been written.

Next, the layout filter 411 ZIP-compresses FDS[I], i.e. the remaining last interleaved FDS part data item to generate Local File Header and file data (step S1414). In short, the remaining FDS part data is written. Then, the layout filter 411 ZIP-compresses _rels/.rels[1], i.e. the last part data item of the interleaved _rels/.rels part data to generate Local File Header and file data (step S1415). In short, the remaining _rels/.rels part data item is written.

Through the above-described processes, all the part data items of the interleaved FDS part data, all the part data items of all the interleaved FD part data of all the documents, and all the part data items of all the FP part data of all the documents are rearranged in the reverse data sequence. However, it is assumed in the present embodiment that Local File Header and file data associated with the other part data, such as image files and font files, are positioned in a proper data sequence as in the case of ZIP data before decompression.

Although in the present embodiment, it is assumed that _rels/.rels part data is interleaved into two parts, _rels/.rels part data can be interleaved into three parts in a case where information on a thumbnail image or the like information is contained in the _rels/.rels part data. In this case, Local File Header and file data associated with the information are positioned in a proper data sequence as in the case of ZIP data before decompression, similarly to the other part data, such as image files and font files. At this time, the last part data item of the interleaved _rels/.rels part data, which is denoted by _rels/.rels[1] in the illustrated example, comes to have a subscript of a different value. In this case, it is to be understood that the processing in the step S1415 is carried out on the last part data item.

Next, the bookbinding printing process executed in the step S3408 in FIG. 14 will be described in detail with reference to FIG. 20.

Figure 20:
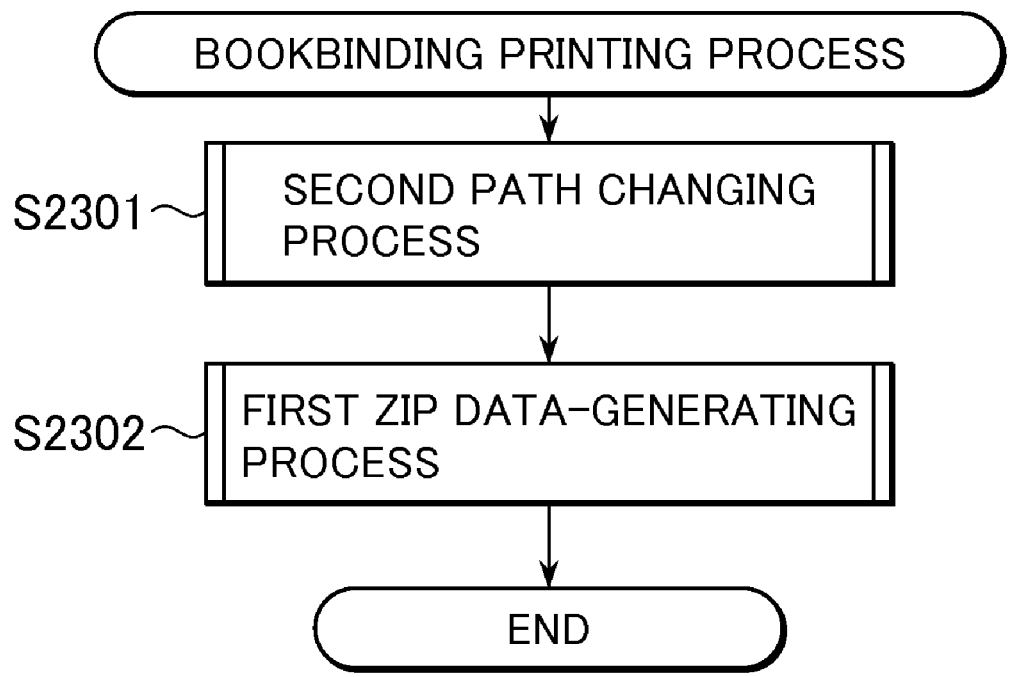
FIG. 20 is a flowchart of a bookbinding printing process in the first embodiment.

FIG. 20 is a flowchart of the bookbinding printing process executed in the first embodiment.

In the bookbinding printing process in the first embodiment, the layout filter 411 generates an XPS document having a data sequence for bookbinding printing, based on the XPS document which is received from the filter pipeline manager 410 in the step S3401 in FIG. 14 and is expanded in the step S3402. Specifically, a second path changing process (step S2301) and the first ZIP data-generating process (step S2302) are sequentially executed. Processing performed in the present first ZIP data-generating process is the same as that in the reverse-order printing process in the step S3407 in FIG. 14.

Next, the second path changing process executed in the step S2301 in FIG. 20 will be described in detail with reference to FIG. 21.

Figure 21:
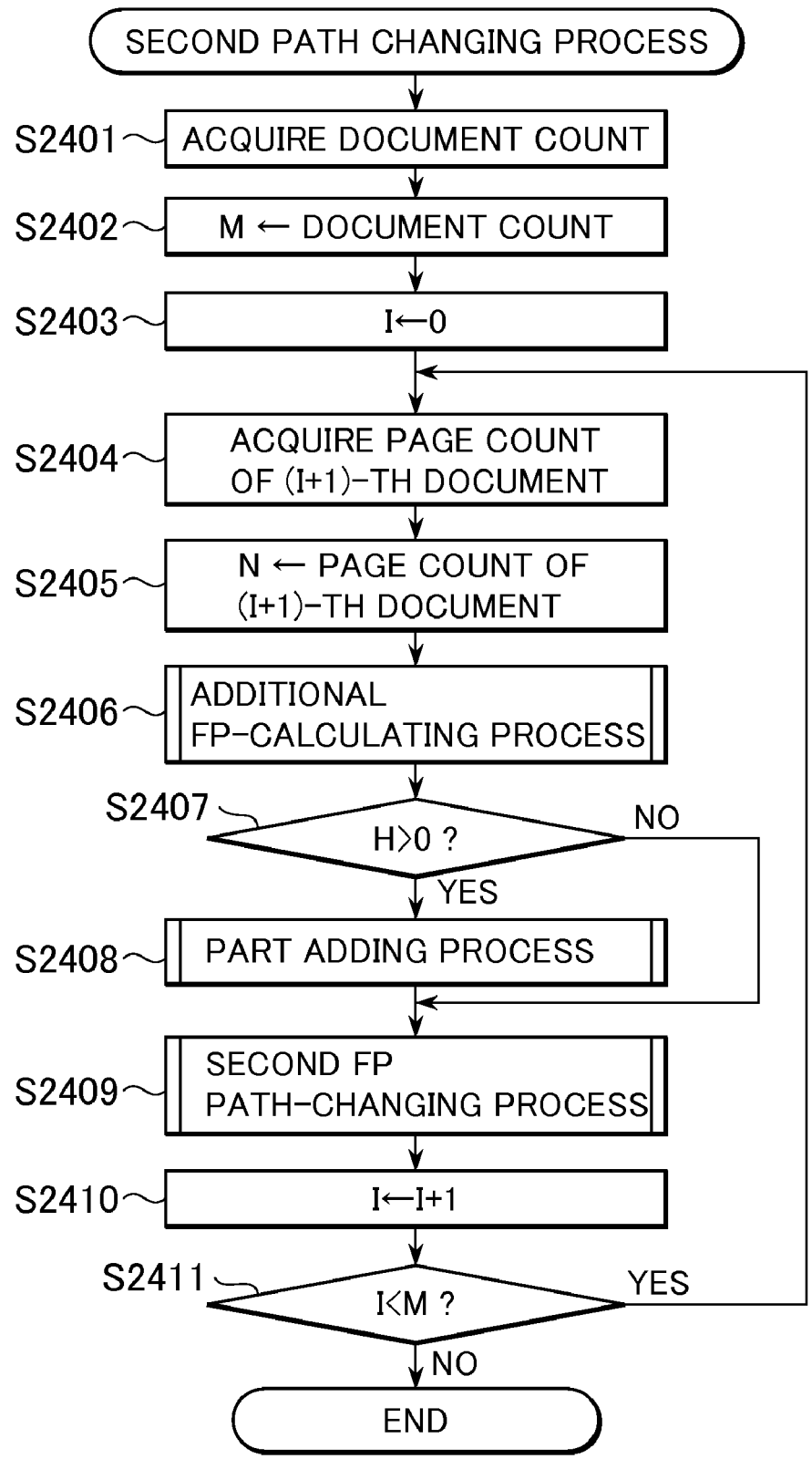
FIG. 21 is a flowchart of a second path changing process executed in a step S2301 in FIG. 20.

FIG. 21 is a flowchart of the second path changing process executed in the step S2301 in FIG. 20.

In the second path changing process, the layout filter 411 changes paths of some FD and FP files in an XPS document received from the filter pipeline manager 410, and generates expanded data as a source of the XPS document having the data sequence for bookbinding printing.

Specifically, first, the layout filter 411 acquires a document count indicative of the number of documents in the XPS document (step S2401). The document count is acquired by the same method as mentioned hereinbefore. Then, the layout filter 411 stores the acquired document count as the variable M (step S2402).

Next, the layout filter 411 initializes the variable I to 0 (step S2403). Then, the layout filter 411 acquires the page count of the (I+1)-th document (step S2404). The page count is acquired by the same method as mentioned hereinbefore. Then, the layout filter 411 stores the acquired page count of the (I+1)-th document as the variable N (step S2405). Thereafter, the layout filter 411 executes an additional FP-calculating process (step S2406).

Now, the additional FP-calculating process will be described in detail with reference to FIG. 22.

Figure 22:
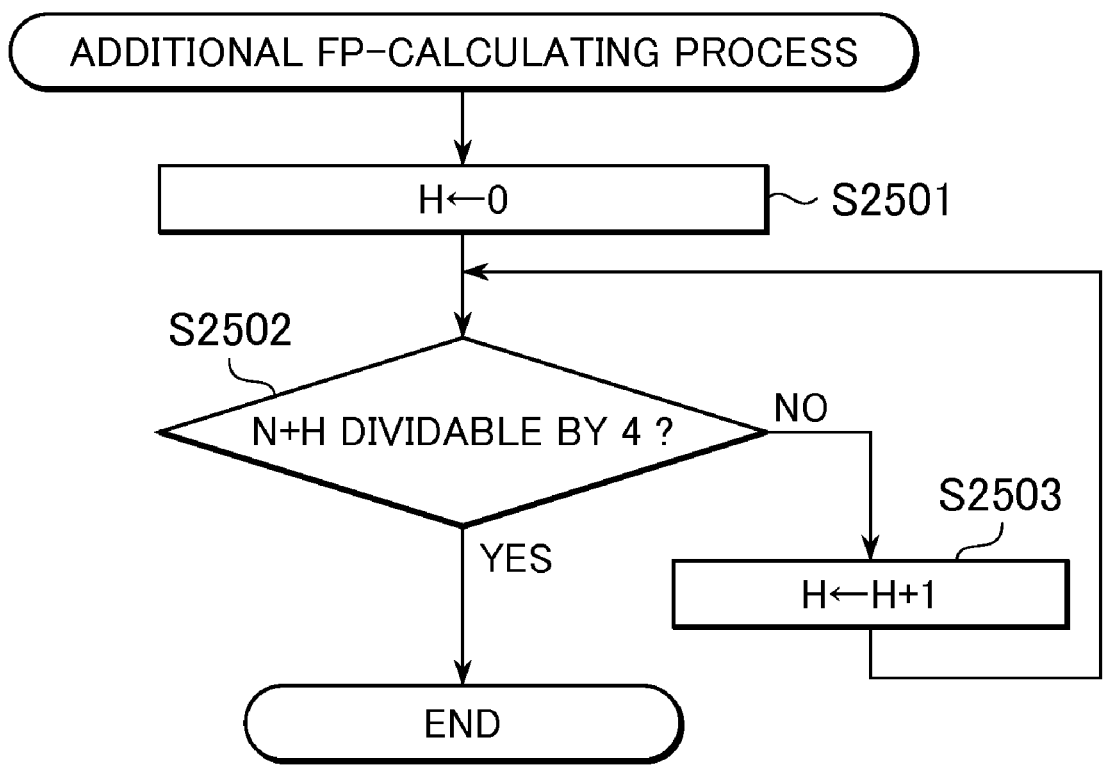
FIG. 22 is a flowchart of an additional FP-calculating process executed in a step S2406 in FIG. 21.

FIG. 22 is a flowchart of the additional FP-calculating process executed in the step S2406 in FIG. 21.

In the additional FP-calculating process, the layout filter 411 calculates the number of blank pages required to be added so as to generate the expanded data as the source of the XPS document having the data sequence for bookbinding printing. In order to add blank pages, it is required to add FP part data items having drawing information on the blank sheets, and the number of FP part data items to be added is equal to the number of blank pages to be added.

Specifically, first, the layout filter 411 initializes a variable H in the memory area secured in the RAM 102 managed by the layout filter 411 itself to 0 (step S2501). Next, the layout filter 411 adds the variable H to the variable N, and determines whether or not the value obtained by adding the variable H to the variable N can be divided by 4 (step S2502). If the value cannot be divided by 4, the layout filter 411 adds 1 to the variable H (step S2503). The steps S2502 to S2503 are repeatedly carried out until the value obtained by adding the variable H to the variable N reaches a value which can be divided by 4. On the other hand, if it is determine in the step S2502 that the value obtained by adding the variable H to the variable N can be divided by 4, the additional FP-calculating process is terminated. The value of the variable H obtained at this time corresponds to the number of FP part data items to be added.

Referring again to FIG. 21, the layout filter 411 determines whether or not it is required to add FP part data so as to generate the expanded data as the source of the XPS document having the data sequence for bookbinding printing (file addition determination). Specifically, the layout filter 411 determines whether or not the variable H is larger than 0 (step S2407). If the variable H is larger than 0, the layout filter 411 executes the part adding process (file addition) (step S2408). On the other hand, if the variable H is not larger than 0, the second path changing process proceeds to a step S2409 without execution of the part adding process in the step S2408.

Now, the part adding process will be described in detail with reference to FIG. 23.

Figure 23:
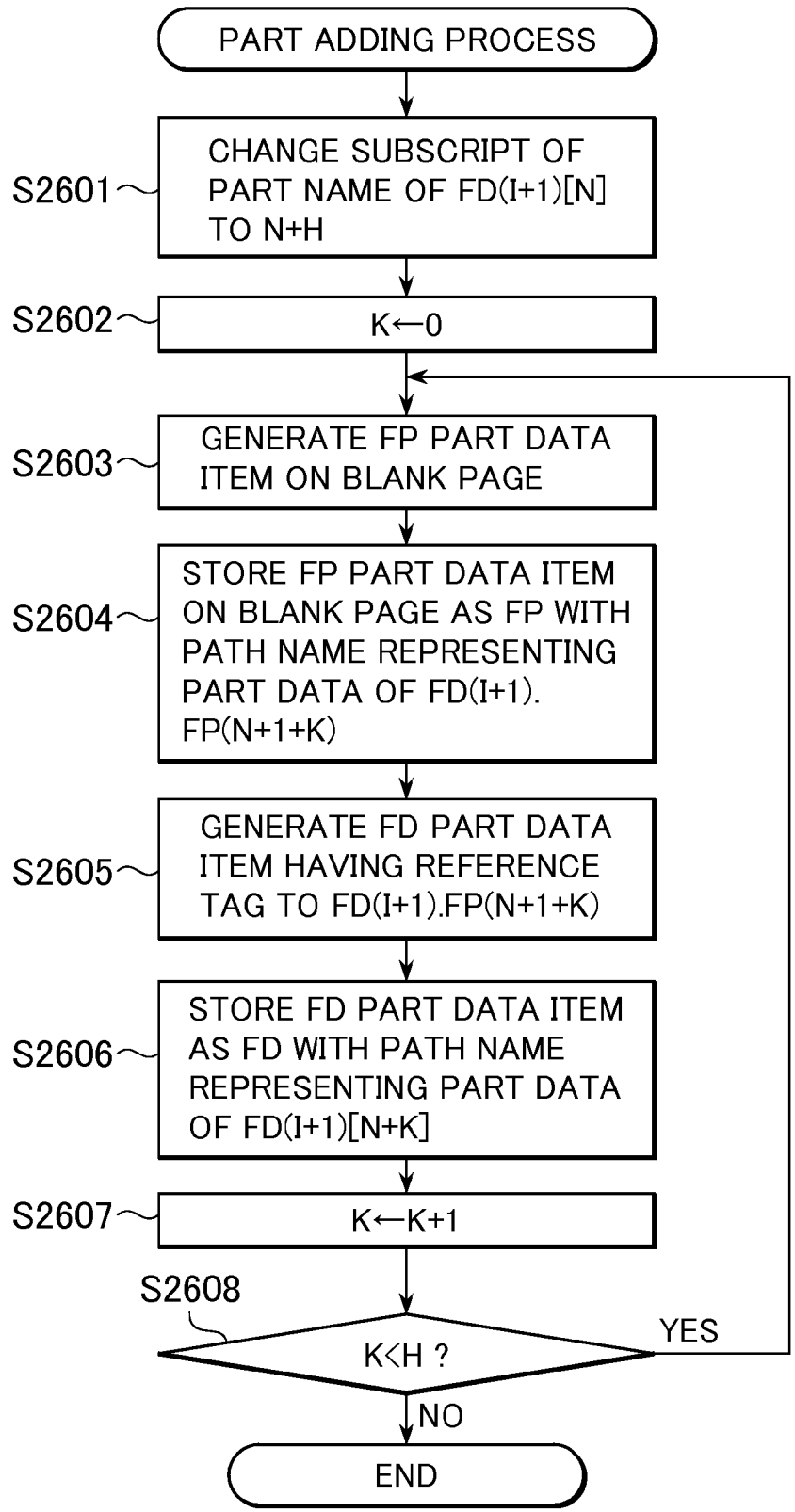
FIG. 23 is a flowchart of a part adding process executed in a step S2408 in FIG. 21.

FIG. 23 is a flowchart of the part adding process executed in the step S2408 in FIG. 21.

In the part adding process, the layout filter 411 adds FP part data needed to generate the expanded data as the source of the XPS document having the data sequence for bookbinding printing. First, before the FP part data is added, the subscript of the last part data item of the interleaved FD part data in the document contained in the original XPS document is changed such that the last part data item of the interleaved FD part data becomes a last part data item after addition of the FP part data.

Specifically, the layout filter 411 changes the subscript N of a part name FD(I+1)[N] to N+H (step S2601). For example, when the first document has five pages, the variable H assumes a value of 3. Therefore, a part name FD(1)[5] is changed to FD(1)[8].

Next, the layout filter 411 initializes the variable K in the memory area secured in the RAM 102 managed by the layout filter 411 itself to 0 (step S2602). Then, the layout filter 411 generates an FP part data item having drawing information on a blank page (step S2603). It is assumed that the FP part data item having drawing information on a blank page is described according to drawing specifications of XPS.

Next, the layout filter 411 adds the generated FP part data item having drawing information on a blank page, as the part data item of the last page of the document. Specifically, the FP part data item having drawing information on a blank page, which has been generated in the step S2603, is stored as an FP part data item having a path name representing a part data item of FD(I+1).FP(N+1+K) (step S2604). For example, assuming that the first document originally has five pages and that the path of an FP indicative of a first page of the first document is represented by "/Document/1/Pages/1.xml" and the variable K is equal to 0, the FP part data item having drawing information on a blank page, which has been generated in the step S2603, is stored as an FP part data item having a path name representing a part data item of FD(1).FP(6), i.e. as "/Document/1/Pages/6.xml" indicative of the path of an FP indicative of a sixth page of the first document.

Next, the layout filter 411 generates an FD part data item having a reference tag to the added FP part data item having drawing information on a blank page. Specifically, the layout filter 411 generates an FD part data item having a reference tag to FD(I+1).FP(N+1+K) (step S2605). For example, the layout filter 411 generates an FD part data item having a reference tag to "/Document/1/Pages/6.xml". It is assumed that the FD part data item having the reference tag to FD(I+1).FP(N+1+K) is described according to the drawing specifications of XPS.

Next, the layout filter 411 adds the FD part data item having the reference tag to the added FP part data item having drawing information on a blank page, as an FD part data item having a reference tag to the FP part data item of the last page of the document. Specifically, the FD part data item having the reference tag to FD(I+1).FP(N+1+K) generated in the step S2605 is stored as an FD part data item having a path name representing a part data item of FD(I+1)[N+K] (step S2606). For example, assuming that the first document originally has five pages and that a part data item of interleaved FD part data having a reference tag to an FP indicative of the first page of the first document is represented by "/Document/1/FixedDocument.xml/[0].piece" and the variable K assumes a value of 0, the FD part data item having a reference tag to the FD(1).FP(6) generated in the step S2605 is stored, as an FD part data item having a path name representing a part data item of FD(1)[5], i.e. as "/Document/1/FixedDocument.xml/[5].piece" indicative of the path of a part data item of the interleaved FD part data having a reference tag to an FP indicative of the sixth page of the first document.

Next, the layout filter 411 adds 1 to the variable K (step S2607). In other words, the layout filter 411 stores the number of the added FP part data items having drawing information on respective blank pages. Then, the layout filter 411 performs comparison between the variable K and the variable H (step S2608). If the variable K is smaller than the variable H, the steps S2603 to S2607 are repeatedly carried out until the variable K becomes not smaller than the variable H. When the variable K becomes not smaller than the variable H, the part adding process is terminated. In other words, processing for adding an FP part data item is repeatedly carried out until all FP part data items have been added the number of which is determined in the additional FP-calculating process as the number of FP part data items required to be added Referring again to FIG. 21, the layout filter 411 executes a second FP path-changing process (step S2409).

Now, the second FP path-changing process will be described in detail with reference to FIG. 24.

Figure 24:
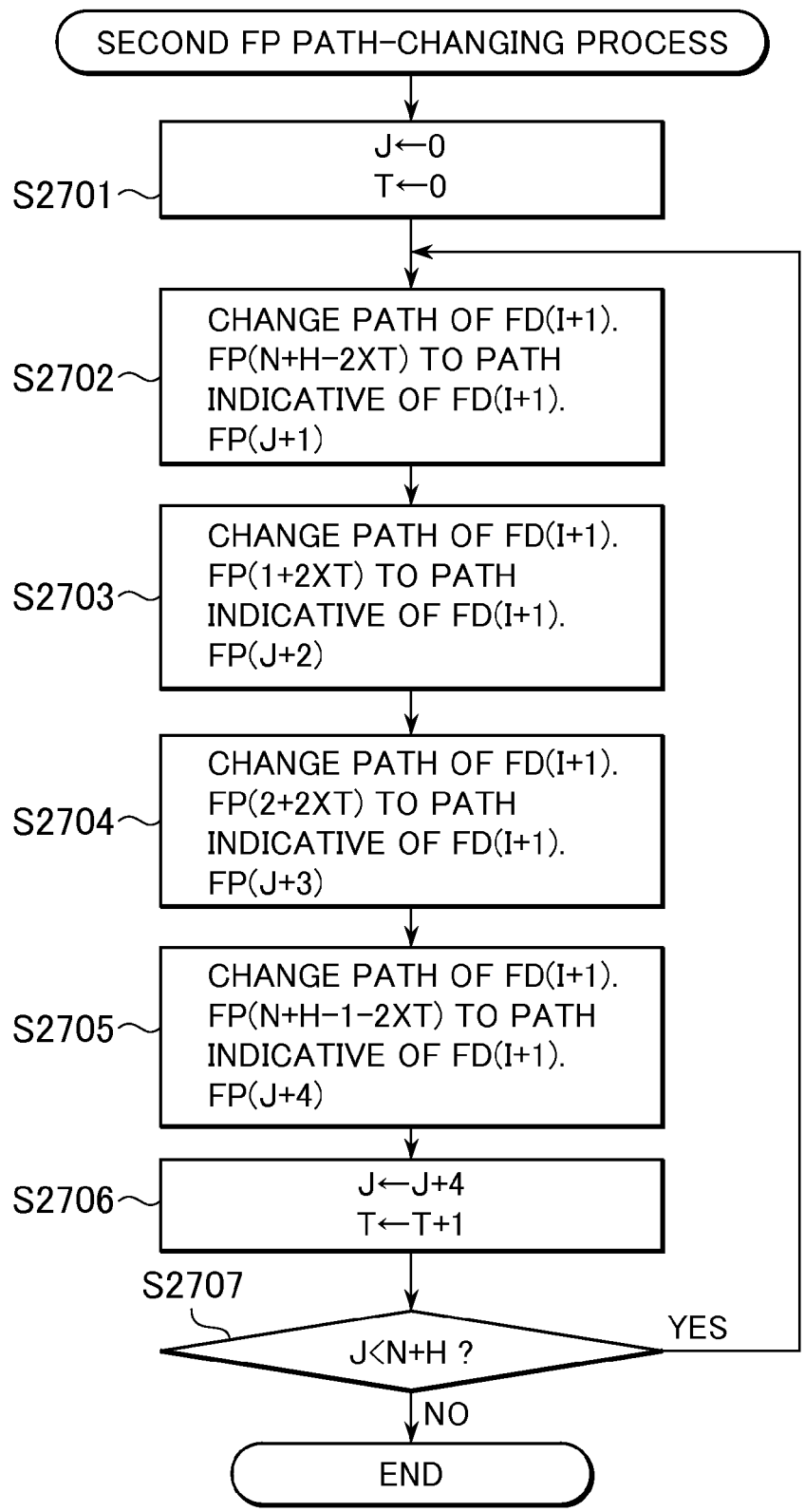
FIG. 24 is a flowchart of a second FP path-changing process executed in a step S2409 in FIG. 21.

FIG. 24 is a flowchart of the second FP path-changing process executed in the step S2409 in FIG. 21.

In the second FP path-changing process, the layout filter 411 changes the order of the paths of the respective FP part data items of the document such that the FP part data items are rearranged in the data sequence for bookbinding printing. For example, if the document has eight pages including added blank pages, the path of an FP indicative of the eighth page is changed to the path of an FP indicative of the first page, the path of the FP indicative of the first page to the path of an FP indicative of the second page, the path of the FP indicative of the second page to the path of an FP indicative of the third page, the path of an FP indicative of the seventh page to the path of an FP indicative of the fourth page, the path of an FP indicative of the sixth page to the path of an FP indicative of the fifth page, the path of the FP indicative of the third page to the path of an FP indicative of the sixth page, the path of the FP indicative of the fourth page to the path of the FP indicative of the seventh page, and the path of the FP indicative of the fifth page to the path of the FP indicative of the eighth page.

Specifically, first, the layout filter 411 initializes each of the variable J and the variable T in the memory area secured in the RAM 102 managed by the layout filter 411 itself to 0 (step S2701). Then, the layout filter 411 changes the path of an FP indicative of an (N+H−2×T)-th page of an (I+1)-th document to the path of an FP indicative of an (J+1)-th page of the (I+1)-th document (step S2702). For example, assuming that the variable I is equal to 0, the variable N to 5, the variable H to 3, the variable J to 0, and the variable T to 0, and that the path of an FP indicative of the eighth page of the first document is represented by "/Document/1/Pages/8.xml", the path is changed to "/Document/1/Pages/1.xml".

Next, the layout filter 411 changes the path of an FP indicative of a (1+2×T)-th page of the (I+1)-th document to the path of an FP indicative of a (J+2)-th page of the (I+1)-th document (step S2703). For example, when the path of the FP indicative of the first page of the first document is represented by "/Document/1/Pages/1.xml", the path is changed to "/Document/1/Pages/2.xml".

Next, the layout filter 411 changes the path of an FP indicative of a (2+2×T)-th page of the (I+1)-th document to the path of an FP indicative of a (J+3)-th page of the (I+1)-th document (step S2704). For example, when the path of the FP indicative of the second page of the first document is represented by "/Document/1/Pages/2.xml", the path is changed to "/Document/1/Pages/3.xml".

Next, the layout filter 411 changes the path of an FP indicative of a (N+H−2×T)-th page of the (I+1)-th document to the path of an FP indicative of a (J+4)-th page of the (I+1)-th document (step S2705). For example, when the path of the FP indicative of the seventh page of the first document is represented by "/Document/1/Pages/7.xml", the path is changed to "/Document/1/Pages/4.xml". At this time, in order to prevent a plurality of paths having the same name from existing even temporarily after the path change, change processing is carried out in the temporary directory, for example.

Next, the layout filter 411 adds 4 to the variable J and 1 to the variable T (step S2706). In other words, the layout filter 411 memorizes which of the pages has been subjected to the FP path change. Then, the layout filter 411 performs comparison between the variable J and a value obtained by adding the variable H to the variable N (step S2707), and if the variable J is smaller than the sum (N+H), the steps S2702 to S2706 are repeatedly carried out. When the variable J becomes not smaller than the sum after repeated execution of the steps S2702 to S2706, the present second FP path-changing process is terminated. In short, the layout filter 411 performs the FP path change on all the pages while determining whether or not the FP path change has been performed on all the pages. Thus, the paths of all the FP part data items of the document are rearranged in the sequence suitable for bookbinding printing by the steps S2701 to S2707.

Referring again to FIG. 21, the layout filter 411 adds 1 to the variable I (step S2410). In other words, the layout filter 411 memorizes which of the documents requiring the FP path change has been subjected to the FP path change. Then, the layout filter 411 performs comparison between the variable I and the variable M (step S2411), and if the variable I is smaller than the variable M, the steps S2404 to S2410 are repeatedly carried out until the variable I becomes not smaller than the variable M. In short, the layout filter 411 performs the FP path change on all the documents while determining whether or not the FP path change has been performed on all the documents. Thus, in each of all the documents, the paths of all the FP part data items in the document are rearranged in the sequence suitable for bookbinding printing by the steps S2403 to S2411.

Figure 29:
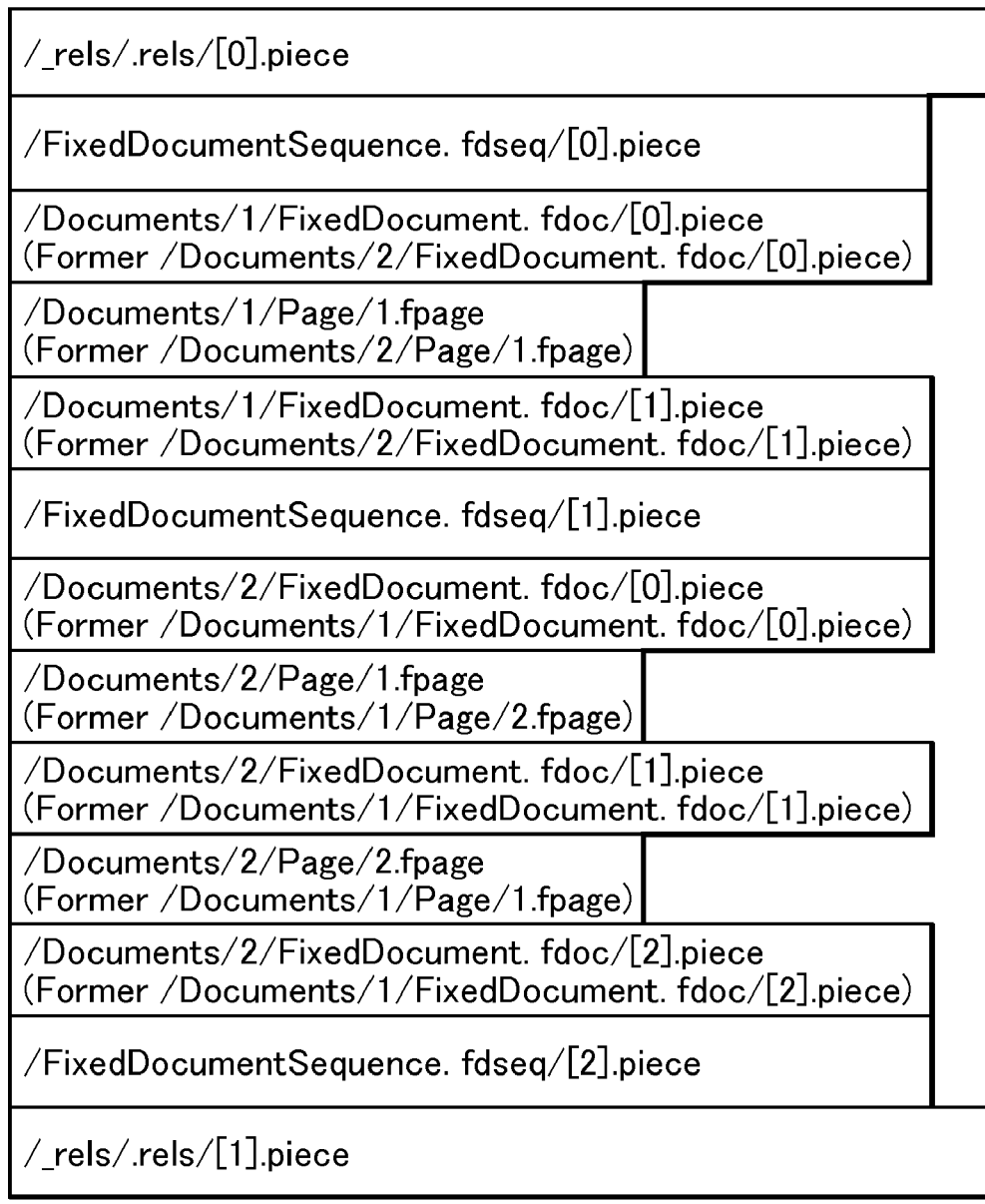
FIG. 29 is a reference diagram of XPS data generated for reverse-order printing.
Figure 30:
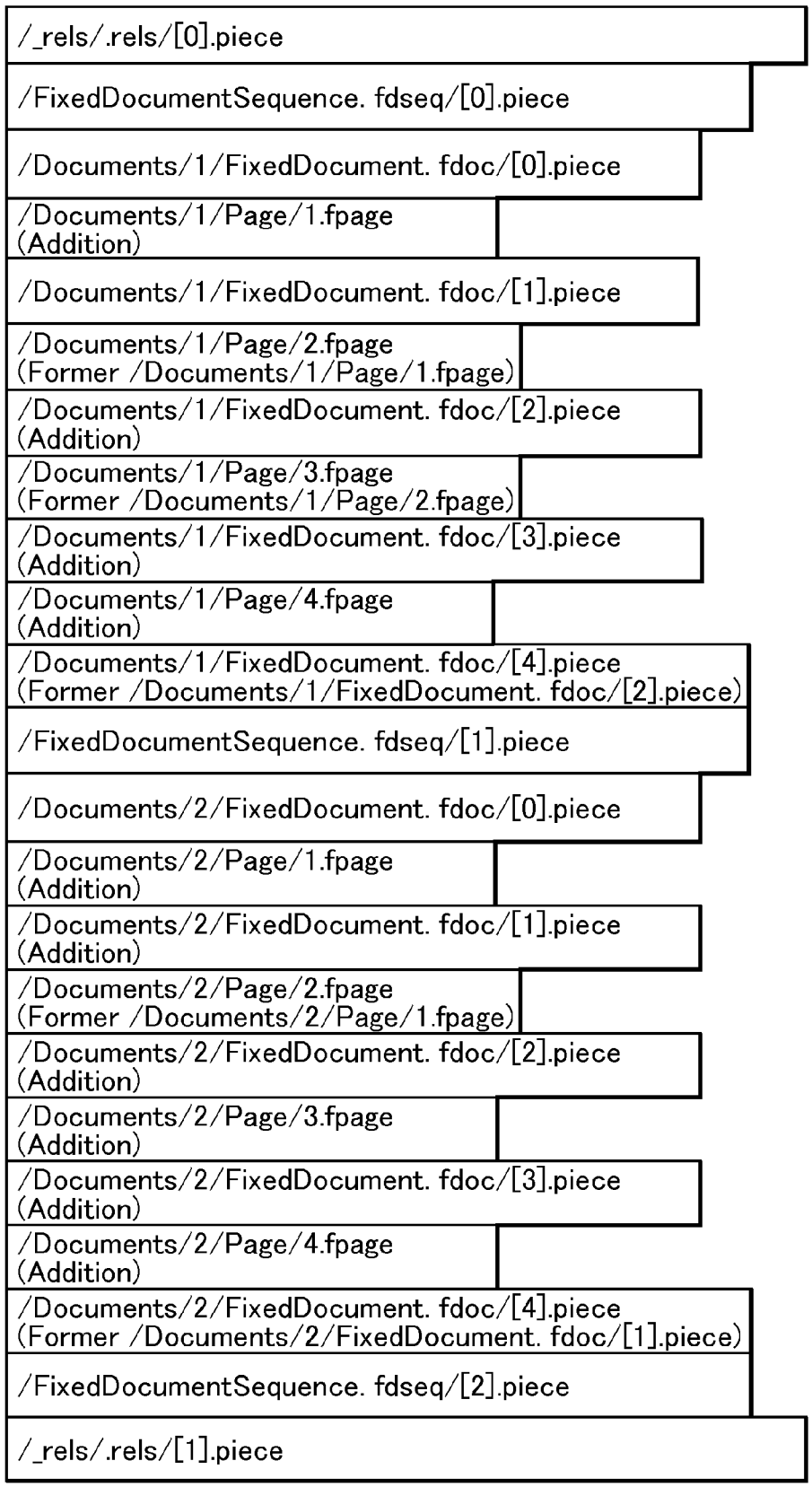
FIG. 30 is a reference diagram of XPS data generated for bookbinding printing.

Finally, referring to FIG. 14, if the step S3407 is executed, the layout filter 411 sends the ZIP data generated in the step S3407, as an XPS document, to the filter pipeline manager 410, followed by terminating the print control process, whereas if the step S3408 is executed, the layout filter 411 sends the ZIP data generated in the step S3408, as an XPS document, to the filter pipeline manager 410, followed by terminating the print control process. If neither the step S3407 nor the step S3408 is executed, the layout filter 411 sends the ZIP data acquired in the step S3401, as an XPS document, to the filter pipeline manager 410, followed by terminating the print control process. Thus, in the case of executing reverse-order printing, the layout filter 411 sends the XPS document having data arranged in a sequence shown in FIG. 29 to the filter pipeline manager 410, while in the case of executing bookbinding printing, the layout filter 411 sends the XPS document having data arranged in a sequence shown in FIG. 30 to the filter pipeline manager 410.

According to the above-described first embodiment, when print settings are for non-normal-order printing, XPS data having a data sequence suited to the print settings can be generated from XPS data generated as a print spool file in a case where the XPS print path is used, which makes it possible to speed up print processing carried out by the printing apparatus to thereby prevent lowering of print throughput.

It should be noted that the memory area secured in the RAM 102 managed by the layout filter 411 becomes available upon completion of an initialization process, not shown, executed for the layout filter 411 prior to execution of the processes described with reference to FIGS. 14 to 24, and becomes unavailable upon completion of a termination process, not shown, executed for the layout filter 411 after execution of the processes described with reference to FIGS. 14 to 24. However, it is assumed that the memory area used for execution of the processes shown in FIGS. 14 to 24 is secured whenever it becomes necessary, and is released whenever it becomes unnecessary.

Further, although in the present embodiment, _rels/.rels, FixedDocumentSequence, FixedDocument, FixedPage, the image file, and the font file are described as target part data by way of example, the part data items of an XPS file include not only these part data items, but also other part data items, such as print tickets and files with an extension "rels". Similarly to the above-described part data items, each of the latter part data items is positioned immediately after the appearance of a reference tag thereto.

An information processing apparatus according to a second embodiment of the present invention is identical to the above-described information processing apparatus according to the first embodiment in respect of the basic components and processes described with reference to FIGS. 1 to 14. Therefore, the basic components are denoted by the same reference numerals, and duplicate description of the basic components and processes is omitted. In the following, only different points from the first embodiment will be described.

The second embodiment is distinguished from the first embodiment in that the layout filter 411 generates XPS data having a data sequence suited to print settings for reverse-order printing or bookbinding printing, by a method using the print control function of the XPS print path in a different manner from the method in the first embodiment. More specifically, the second embodiment is distinguished from the first embodiment by differences in the reverse-order printing process and the bookbinding printing process executed in the respective steps S3407 and S3408 in FIG. 14. These processes will be described below with reference to FIGS. 31 and 39, respectively.

First, the reverse-order printing process executed in the step S3407 in FIG. 14 by the information processing apparatus according to the second embodiment will be described with reference to FIG. 31.

Figure 31:
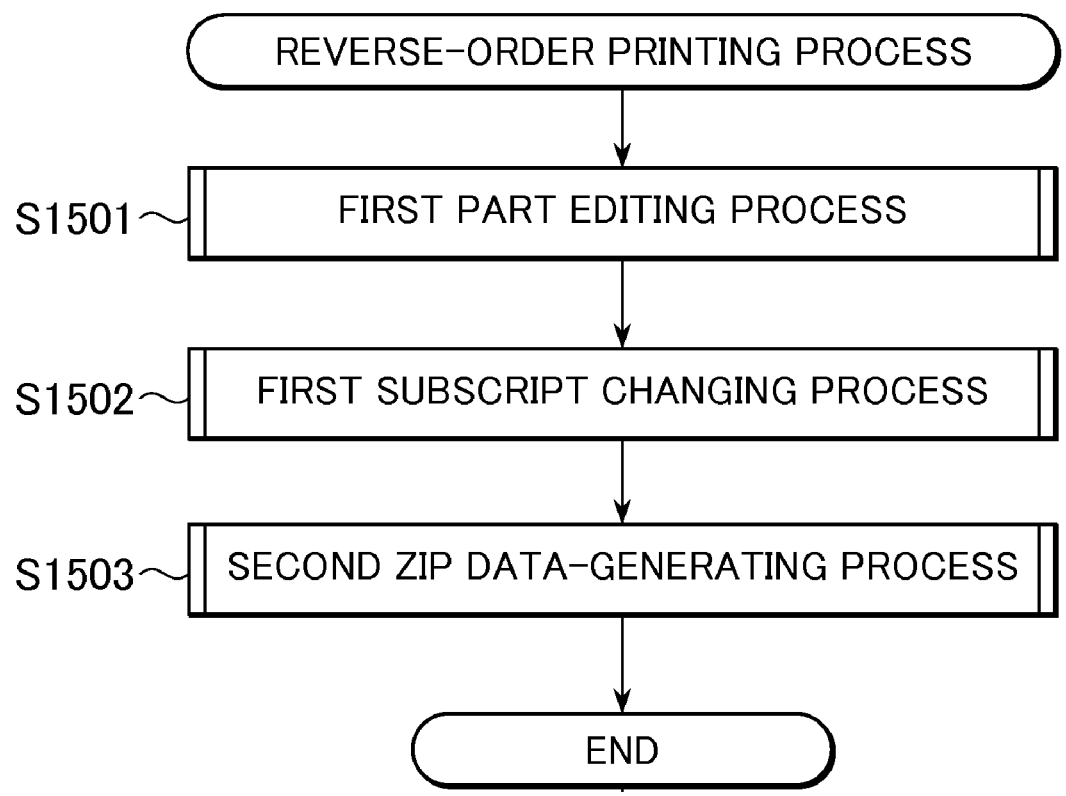
FIG. 31 is a flowchart of a reverse-order printing process executed by a printing system including an information processing apparatus according to a second embodiment of the present invention.

FIG. 31 is a flowchart of the reverse-order printing process executed by the information processing apparatus according to the second embodiment.

In the reverse-order printing process in the second embodiment, as in the first embodiment, the layout filter 411 generates an XPS document having a data sequence for reverse-order printing, based on the XPS document received from the filter pipeline manager 410 in the step S3401 in FIG. 14 and expanded in the step S3402. Specifically, a first part editing process (step S1501), a first subscript changing process (step S1502), and a second ZIP data-generating process (step S1503) subsequent to them are sequentially executed. These processes will be described in detail hereinafter.

Next, the first part editing process executed in the step S1501 in FIG. 31 will be described in detail with reference to FIG. 32.

Figure 32:
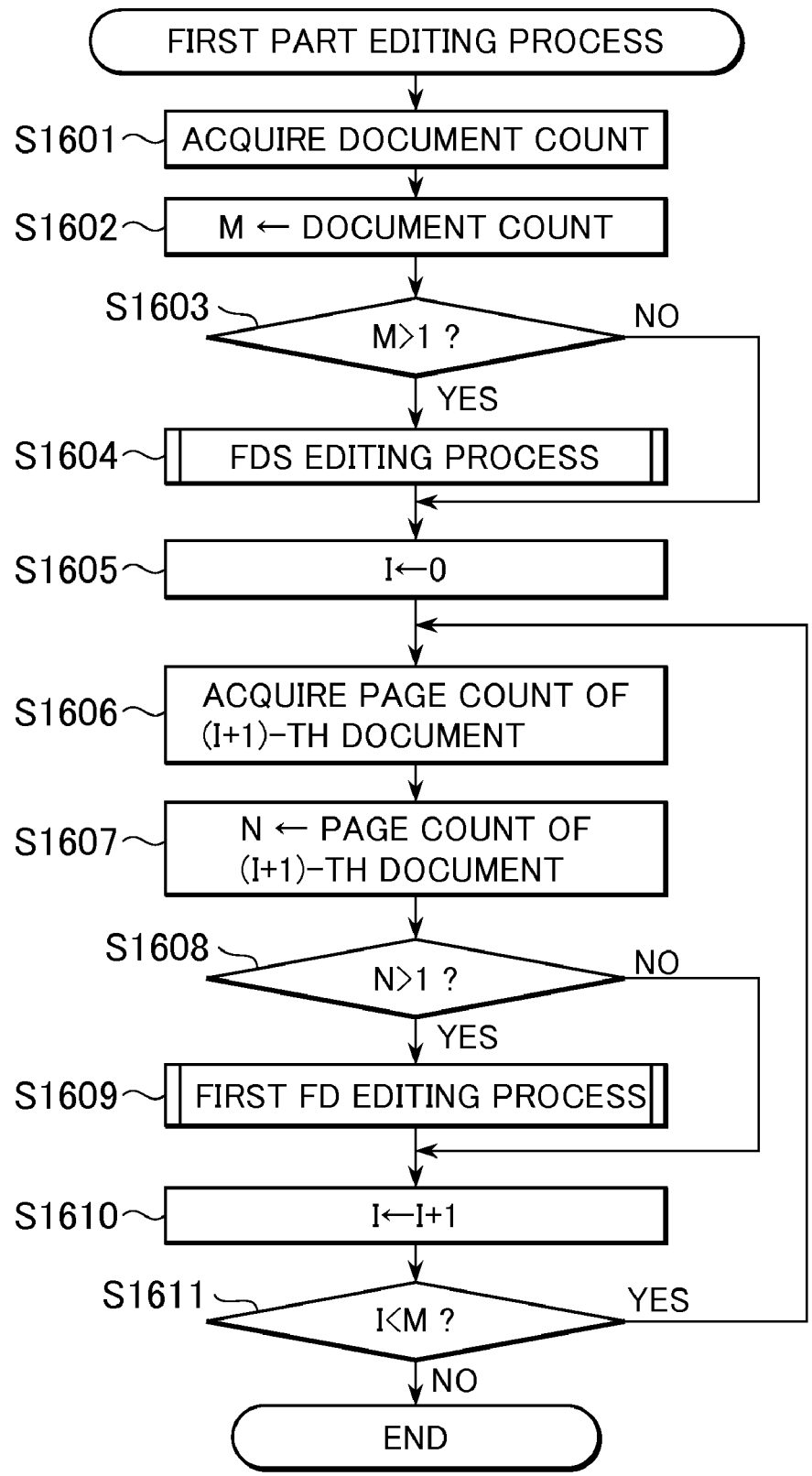
FIG. 32 is a flowchart of a first part editing process executed in a step S1501 in FIG. 31.

FIG. 32 is a flowchart of the first part editing process executed in the step S1501 in FIG. 31.

In the first part editing process, the layout filter 411 changes descriptions in some FDS and FD files of the XPS document received from the filter pipeline manager 410, so as to generate expanded data as a source of the XPS document having a data sequence for reverse-order printing.

Specifically, first, the layout filter 411 acquires a document count indicative of the number of documents in the XPS document (step S1601). The document count can be acquired by analyzing the FDS part data and checking how many FD part data items exist. Then, the layout filter 411 stores the document count in a memory area secured in the RAM 102 managed by the layout filter 411 itself (step S1602). In this step, the document count is stored as the variable M in the memory area.

Next, the layout filter 411 determines whether or not it is required to change descriptions in some FDS files of the XPS document so as to generate the expanded data as the source of the XPS document having the data sequence for reverse-order printing. If it is required, the descriptions in the files are changed. When there is only one document, it is not required to change descriptions in the file, whereas when there are more than two documents, it is required to change the descriptions of the files. Specifically, the layout filter 411 determines whether or not the variable M is larger than 1 (step S1603). If the variable M is larger than 1, the layout filter 411 executes an FDS editing process (step S1604). On the other hand, if the variable M is not larger than 1, the process proceeds to a step S1605 without executing the FDS editing process in the step S1604.

Now, the FDS editing process will be described in detail with reference to FIG. 33.

Figure 33:
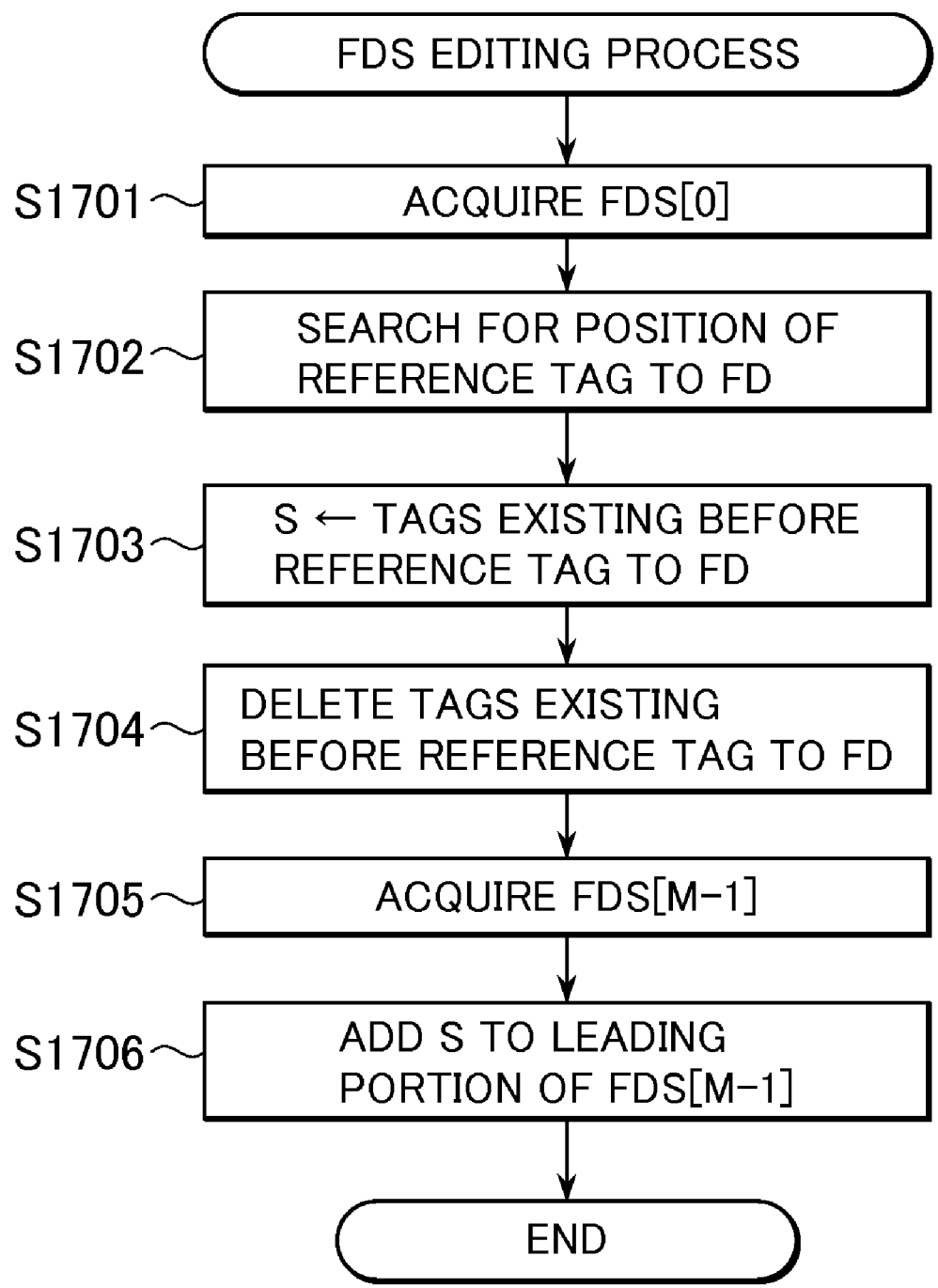
FIG. 33 is a flowchart of an FDS editing process executed in a step S1604 in FIG. 32.

FIG. 33 is a flowchart of the FDS editing process executed in the step S1604 in FIG. 32.

In the FDS editing process, in order to prevent contradiction with the XML specification or the XPS specification from arising when the part data items of the interleaved FDS part data are rearranged in the reverse order, unnecessary descriptions in the leading portion of a part data item having a reference tag to a first document are deleted, and the descriptions deleted in the deletion processing are added to the leading portion of a part data item having a reference tag to a final document. For example, descriptions "<?xml version="1.0" encoding=" utf-8">" and "<FixedDocumentSequence xmlns=" http://schemas.microsoft.com/xps/2005/06"" in the part data 858 in FIG. 9 are deleted from the leading portion thereof and are added to the leading portion of the part data 859.

Specifically, first, the layout filter 411 acquires the first part data item of the interleaved FDS part data (step S1701). Next, the layout filter 411 searches the descriptions in the first part data item, for the position of a reference tag to FD part data, (step S1702). Then, the layout filter 411 stores descriptions of all tags existing before the reference tag found by the search in the step S1702, in a variable buffer S (not shown) in the memory area secured in the RAM 102 managed by the layout filter 411 (step S1703).

Next, the layout filter 411 deletes the descriptions of all the tags existing before the reference tag found by the search in the step S1702 from the first part data item of the interleaved FDS part data (step S1704). Then, the layout filter 411 acquires the second last part data item of the interleaved FDS part data (step S1705). Then, the layout filter 411 adds the descriptions of the reference tags stored in the variable buffer S in the step S1703 to the leading portion of the part data item acquired in the step S1705 (step S1706).

In the present embodiment, the processing in the step S1702 is executed on the first part data item of the interleaved FDS part data and the processing in the step S1706 is executed on the second last part data item of the interleaved FDS part data. However, since the processing in the step S1702 should be executed on a part data item having a reference tag to the first document and the processing in the step S1706 should be executed on a part data item having a reference tag to the last document, part data items to be acquired in the respective steps S1701 and S1705 are changed, as required, according to the configurations of respective FDS part data items of interleaved FDS part data in an XPS document received from the filter pipeline manager 410.

Referring again to FIG. 32, in the steps S1605 to S1611, in order to prevent contradiction with the XML specification or the XPS specification from arising when the part data items of the interleaved FD part data are rearranged in the reverse order, the layout filter 411 carries out the processing for deleting unnecessary descriptions in the leading portion of a part data item having a reference tag to a first page, and adding the deleted descriptions in the deletion processing to the leading portion of a part data item having a reference tag to a final page, on FD part data items of all the documents. For example, descriptions "<?xml version="1.0" encoding="utf-8">" and "<FixedDocument xmlns=" http://schemas.microsoft.com/xps/2005/06"" in the part data 853 in FIG. 9 are deleted from the leading portion thereof and added to the leading portion of the part data 854. Processing like this is carried out on the FD part data items of all the documents. If a document has only one page, it is not required to change descriptions in the file, whereas when a document has more than two pages, it is required to change description in each file.

Specifically, first, the layout filter 411 initializes the variable I to 0 (step S1605). Then, the layout filter 411 acquires a page count indicative the number of pages of an (I+1)-th document (step S1606). The layout filter 411 can acquire the page count by analyzing the FD part data and checking how many FP part data items exist.

Then, the layout filter 411 stores the acquired page count in the memory area secured in the RAM 102 managed by the layout filter 411 itself (step S1607). In the illustrated example, the page count is stored as the variable N in the memory area.

Next, the layout filter 411 determines whether or not it is required to change descriptions in some FD files in the document so as to generate the expanded data as the source of the XPS document having the data sequence for reverse-order printing. If it is required, the descriptions in the files are changed. When the document has only one page, it is not required to change descriptions in the file, whereas when the document has more than two pages, it is required to change descriptions in each files.

Specifically, the layout filter 411 determines whether or not the variable N is larger than 1 (step S1608). If the variable N is larger than 1, the layout filter 411 executes a first FD editing process (step S1609). On the other hand, if the variable N is not larger than 1, the process proceeds to a step S1610 without execution of the first FD editing process in the step S1609.

Now, the first FD editing process executed in the step S1609 in FIG. 32 will be described in detail with reference to FIG. 34.

Figure 34:
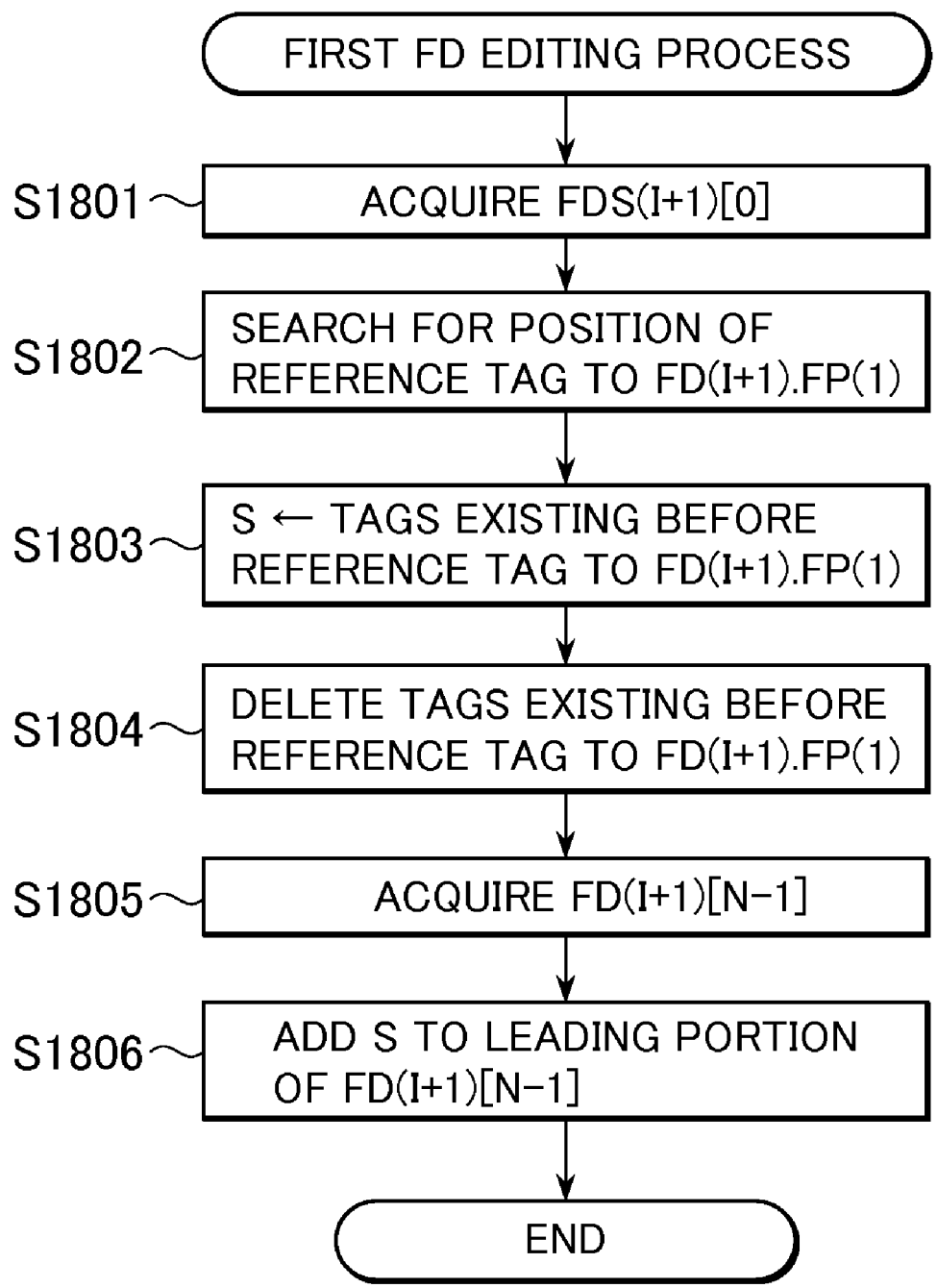
FIG. 34 is a flowchart of a first FD editing process executed in a step S1609 in FIG. 32.

FIG. 34 is a flowchart of the first FD editing process executed in the step S1609 in FIG. 32.

In the first FD editing process, in order to prevent contradiction with the XML specification or the XPS specification from arising when the part data items of interleaved FD part data are rearranged in the reverse order, the layout filter 411 deletes unnecessary descriptions in the leading portion of a part data item having a reference tag to a first page and adds the descriptions deleted in the deletion processing to the leading portion of a part data item having a reference tag to a final page. For example, descriptions "<?xml version="1.0" encoding=" utf-8">" and "<FixedDocument xmlns=" http://schemas.microsoft.com/xps/2005/06"" in the part data 853 in FIG. 9 are deleted from the leading portion thereof and are added to the leading portion of the part data 854.

Specifically, first, the layout filter 411 acquires a first part data item of interleaved FD part data (step S1801). Next, the layout filter 411 searches the descriptions in the first part data item, for the position of a reference tag to an FP part data item (step S1802). Then, the layout filter 411 stores descriptions of all the tags existing before the reference tag found by the search in the step S1802, in the variable buffer S in the memory area secured in the RAM 102 managed by the layout filter 411 (step S1803).

Next, the layout filter 411 deletes the descriptions of all the tags existing before the reference tag found by the search in the step S1802 from the first part data item of the FD part data (step S1804). Then, the layout filter 411 acquires the second last part data item of the interleaved FD part data (step S1805). Then, the layout filter 411 adds the descriptions of the reference tags stored in the variable buffer S in the step S1803 to the leading portion of the part data item acquired in the step S1805 (step S1806).

In the present embodiment, the processing in the step S1802 is executed on the first part data item of the interleaved FD part data and the processing in the step S1806 is executed on the second last part data item of the interleaved FD part data. However, since the processing in the step S1802 should be executed on a part data item having a reference tag to the first document and the processing in the step S1806 should be executed on a part data item having a reference tag to the last document, part data items to be acquired in the respective steps S1801 and S1805 are changed, as required, according to the configurations of respective FD part data items of interleaved FD part data in an XPS document received from the filter pipeline manager 410.

Referring again to FIG. 32, the layout filter 411 adds 1 to the variable I (step S1610). In other words, the layout filter 411 memorizes which of the documents has been subjected to the processing for changing descriptions in FD part data items. Then, the layout filter 411 performs comparison between the variable I and the variable M (step S1611), and if the variable I is smaller than the variable M, the steps S1606 to S1610 are repeatedly carried out until the variable I is not smaller than the variable M. In short, the layout filter 411 performs the processing for changing FD contents on all documents requiring the processing, while determining whether or not the processing has been performed on all the documents requiring the processing. Thus, in each of all the documents, the descriptions in all the FD part data items are changed by the steps S1605 to S1611 so as to prevent contradiction with the XML specification or the XPS specification from arising when the part data items of the XPS document are rearranged in the reverse order for reverse-order printing.

Next, the first subscript changing process executed in the step S1502 in FIG. 31 will be described in detail with reference to FIG. 35.

Figure 35:
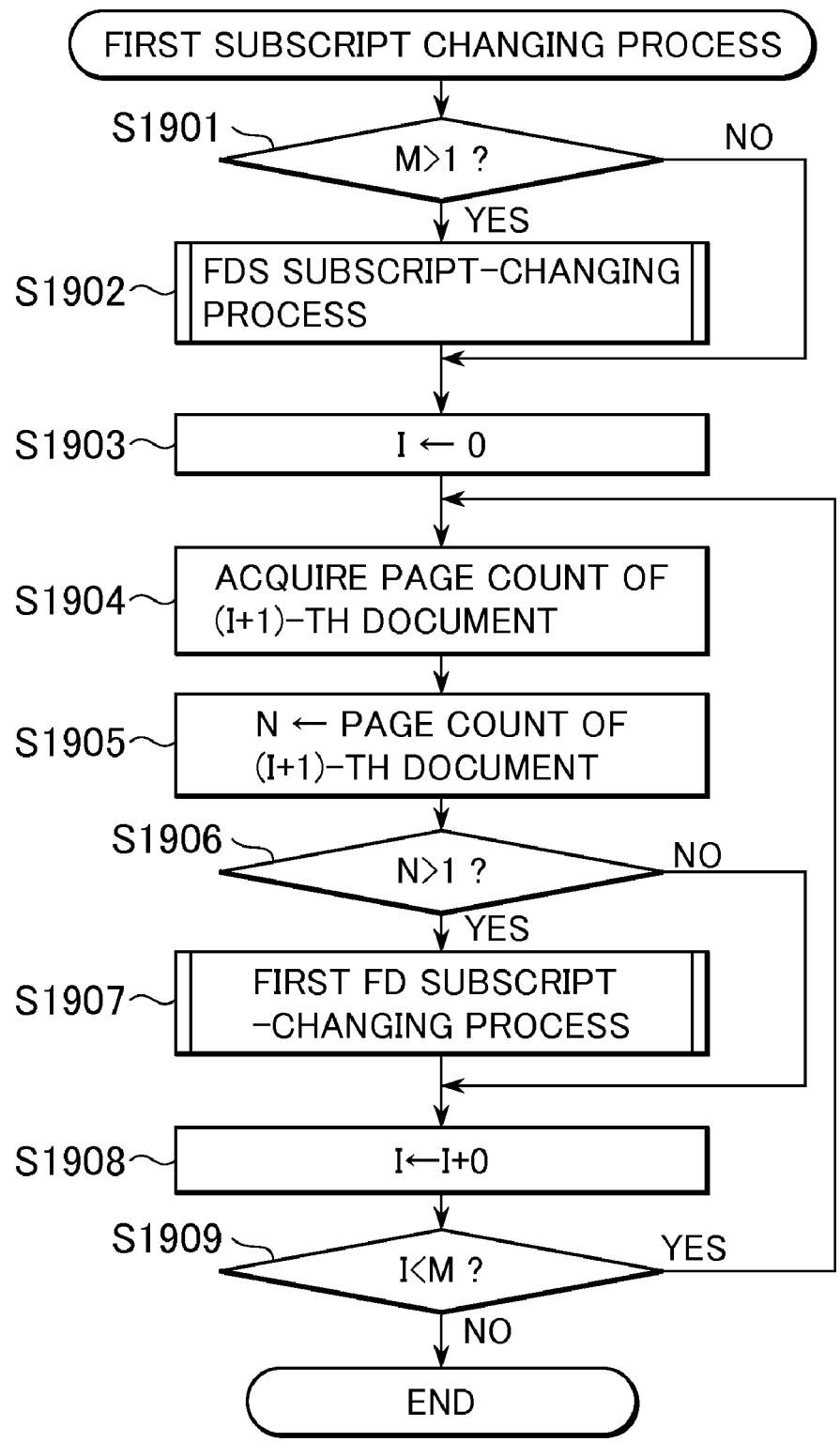
FIG. 35 is a flowchart of a first subscript changing process executed in a step S1502 in FIG. 31.

FIG. 35 is a flowchart of the first subscript changing process executed in the step S1502 in FIG. 31.

In the first subscript changing process, the layout filter 411 changes the value of a subscript added to each part data item of interleaved FDS and FD part data in an XPS document received from the filter pipeline manager 410, so as to make it possible to generate expanded data as a source of the XPS document having the data sequence for reverse-order printing.

First, the layout filter 411 determines whether or not it is required to change the value of a subscript added to each part data item of the interleaved FDS part data, so as to generate the expanded data as the source of the XPS document having the data sequence for reverse-order printing. If it is required, the value of the subscript of each part data item is changed. When there is only one document, it is not required to carry out subscript value changing, whereas when there are more than two documents, it is required to carry out the processing. In the present example, the document count is acquired in the step S1601 and stored as the variable M in the step S1602, and hence the stored document count is used.

Specifically, the layout filter 411 determines whether or not the variable M is larger than 1 (step S1901). If the variable M is larger than 1, the layout filter 411 executes an FDS subscript-changing process (step S1902). On the other hand, if the variable M is not larger than 1, the process proceeds to a step S1903 without execution of the FDS subscript-changing process in the step S1902.

Now, the FDS subscript-changing process in the step S1902 in FIG. 35 will be described in detail with reference to FIG. 36.

Figure 36:
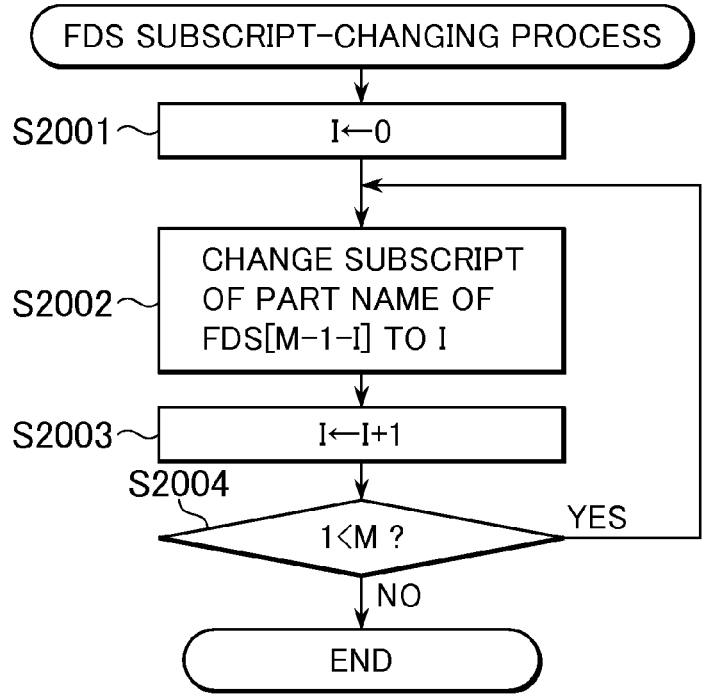
FIG. 36 is a flowchart of an FDS subscript-changing process executed in a step S1902 in FIG. 35.

FIG. 36 is a flowchart of the FDS subscript-changing process executed in the step S1902 in FIG. 35.

In the FDS subscript-changing process, the value of the subscript of each part data item, which has a reference tag to an FD part data item, of interleaved FDS part data is changed such that the data sequence of the documents is reversed. For example, assuming that FDS part data is interleaved into five part data items and that the first part data item (/FixedDocumentSequence.fdseq/[0].piece) has a reference tag to a first document, the second part data item (/FixedDocumentSequence.fdseq/[1].piece) has a reference tag to a second document, the third part data item (/FixedDocumentSequence.fdseq/[2].piece) has a reference tag to a third document, the fourth part data item (/FixedDocumentSequence.fdseq/[3].piece) has a reference tag to a fourth document, and the fifth part data item (/FixedDocumentSequence.fdseq /[4].piece) has the other tag information, the subscript of [0].piece is changed from [0] to [3], the subscript of [1].piece is changed from [1] to [2], the subscript of [2].piece is changed from [2] to [1], and the subscript of [3].piece is changed from [3] to [0].

Specifically, first, the layout filter 411 initializes the variable I to 0 (step S2001). Then, the layout filter 411 changes the subscript of an (M−1)-th part data item of the interleaved FDS part data from "M−1−I" to "I" (step S2002). At this time, in order to prevent a plurality of paths having the same name from even temporarily existing after the subscript change, change processing is carried out in the temporary directory, for example.

Next, the layout filter 411 adds 1 to the variable I (step S2003). In other words, the layout filter 411 memorizes which of the part data items requiring FDS subscript change has been subjected to the processing for changing the value of an FDS subscript. Then, the layout filter 411 performs comparison between the variable I and the variable M (step S2004), and if the variable I is smaller than the variable M, the steps S2002 to S2003 are repeatedly carried out. Then, when the variable I is not smaller than the variable M after repeated execution of the steps S2002 to S2103, the present FDS subscript-changing process is terminated. In short, the layout filter 411 performs the processing for changing the value of an FDS subscript on all the part data items of the interleaved FDS part data except the last one while determining whether or not the processing has been performed on all the part data items except the last one. Thus, all the part data items of the interleaved FDS part data except the last one are rearranged in the reverse order by the steps S2001 to S2004.

Although in the present embodiment, assuming that the leading part data item of the interleaved FDS part data has the reference tag to an FD part data item of the first document, the values of the subscripts of the respective part data items within a range from the leading part data item to the second last one are changed such that the part data items are rearranged in the reverse order, the range of part data items whose subscripts are to be changed is changed, as required, according to the configurations of respective part data items of interleaved FDS part data in an XPS document received from the filter pipeline manager 410.

Referring again to FIG. 35, in the step S1903 and the following steps S1904 to S1909, the layout filter 411 carries out processing for changing the value of the subscript of each part data item, which has a reference tag to an FP part data item, of interleaved FD part data, on the FD part data of all the documents such that the data sequence of all the pages of all the documents is reversed. For example, assuming that FD part data in a document having four pages is interleaved into five part data items and that the first part data item (/Documents/1/FixedDocument.fdoc/[0].piece) has a reference tag to the first page, the second part item (/Documents/1/ FixedDocument.fdoc/ [1].piece) has a reference tag to the second page, the third part data item (/Documents/1/FixedDocument. fdoc/[2].piece) has a reference tag to the third page, the fourth part data item (/Documents/1/ FixedDocument.fdoc/ [3].piece) has a reference tag to the fourth page, and the fifth part data item (/Documents/1/ FixedDocument.fdoc/[4].piece) has the remaining tag information, the subscript of [0].piece is changed from [0] to [3], the subscript of [1].piece is changed from [1] to [2], the subscript of [2].piece is changed from [2] to [1], and the subscript of [3].piece is changed from [3] to [0]. When the document has only one page, it is not required to change the subscript value of the FD part data, whereas when the document has more than two pages, it is required to change the subscript values of the respective FD part data items.

Specifically, first, the layout filter 411 initializes the variable I to 0 (step S1903). Then, the layout filter 411 acquires a page count indicative the number of pages of an (I+1)-th document (step S1904). The layout filter 411 can acquire the page count by analyzing the FD part data and checking how many FP part data items exist. Then, the layout filter 411 stores the acquired page count in the memory area secured in the RAM 102 managed by the layout filter 411 itself (step S1905). In the illustrated example, the page count is stored as the variable N in the memory area.

Next, the layout filter 411 determines whether or not it is required to change the subscript values of the respective part data items of the interleaved FD part data so as to generate the expanded data as the source of the XPS document having the data sequence for reverse-order printing. If it is required, the subscript values of the respective part data items are changed. When the document has only one page, it is not required to carry out the subscript value change processing, whereas when the document has more than two pages, it is required to carry out the processing. Specifically, the layout filter 411 determines whether or not the variable N is larger than 1 (step S1906). If the variable N is larger than 1, the layout filter 411 executes a first FD subscript-changing process (step S1907). On the other hand, if the variable N is not larger than 1, the process proceeds to a step S1908 without execution of the first FD subscript-changing process in the step S1907.

Now, the first FD subscript-changing process will be described in detail with reference to FIG. 37.

Figure 37:
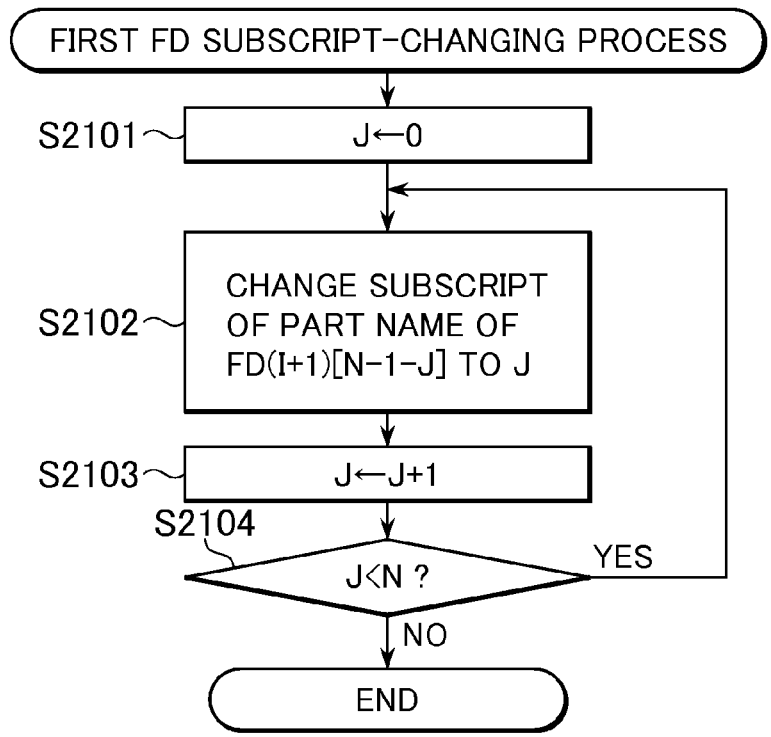
FIG. 37 is a flowchart of a first FD subscript-changing process executed in a step S1907 in FIG. 35.

FIG. 37 is a flowchart of the first FD subscript-changing process executed in the step S1907 in FIG. 35.

In the first FD subscript-changing process, the subscript values of respective part data items, each of which has a reference tag to an FP part data item, of interleaved FD part data are changed such that the data sequence of all the pages of all the documents is reversed. For example, assuming that FD part data in a document having four pages is interleaved into five part data items and that the first part data item (/Documents/1/FixedDocument.fdoc/[0].piece) has a reference tag to the first page, the second part item (/Documents/ 1/FixedDocument.fdoc/[1].piece) has a reference tag to the second page, the third part data item (/Documents/1/Fixed- Document.fdoc/[2].piece) has a reference tag to the third page, the fourth part data item (/Documents/1/FixedDocument.fdoc/ [3].piece) has a reference tag to the fourth page, and the fifth part data item (/Documents/1/FixedDocument.fdoc/[4].piece) has the remaining tag information, the subscript of [0].piece is changed from [0] to [3], the subscript of [1].piece is changed from [1] to [2], the subscript of [2].piece is changed from [2] to [1], and the subscript of [3].piece is changed from [3] to [0].

Specifically, first, the layout filter 411 initializes the variable J to 0 (step S2101). Then, the layout filter 411 changes the subscript of an (N–J)-th part data item of the interleaved FD part data from "N–1–J" to "J" (step S2102). At this time, in order to prevent a plurality of paths having the same name from even temporarily existing after the subscript change, change processing is carried out in the temporary directory, for example.

Next, the layout filter 411 adds 1 to the variable J (step S2103). In other words, the layout filter 411 memorizes which of the part data items has been subjected to the FD subscript value-change processing. Then, the layout filter 411 performs comparison between the variable J and the variable N (step S2104), and if the variable J is smaller than the variable N, the steps S2102 to S2103 are repeatedly carried out. Then, when the variable J is not smaller than the variable N after repeated execution of the steps S2102 to S2103, the present first FD subscript-changing process is terminated. In short, the layout filter 411 performs the FD subscript value-change processing on each of all the part data items of the interleaved FD part data except the last one of the document while determining whether or not the processing has been performed on all the part data items except the last one. Thus, the subscript values of all the part data items of the interleaved FD part data except the last one of the document are placed in the reverse order by the steps S2101 to S2104.

Although in the present embodiment, assuming that the leading part data item of the interleaved FD part data has a reference tag to an FP part data item in the first page, the subscript values of the respective part data items within the range from the leading part data item to the second last one are placed in the reverse order, the range of part data items whose subscripts are to be changed is changed, as required, according to the configurations of respective part data items of interleaved FD part data in an XPS document received from the filter pipeline manager 410.

Next, the second ZIP data-generating process executed in the step S1503 in FIG. 31 will be described in detail with reference to FIG. 38.

Figure 38:
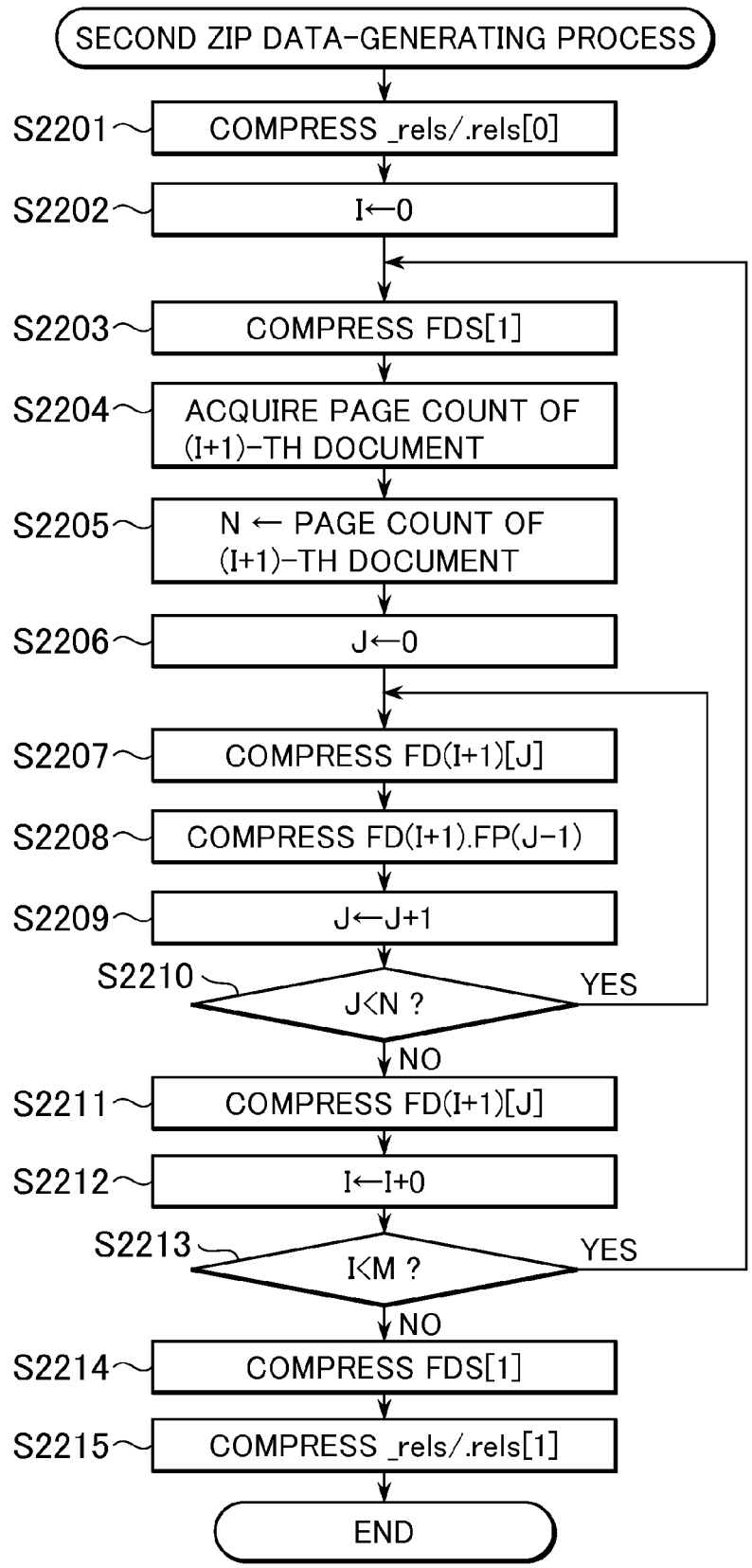
FIG. 38 is a flowchart of a second ZIP data-generating process executed in a step S1503 in FIG. 31.

FIG. 38 is a flowchart of the second ZIP data-generating process executed in the step S1503 in FIG. 31.

First, the layout filter 411 ZIP-compresses interleaved _rels/.rels[0] to generate Local File Header and file data (step S2201). In other words, the layout filter 411 writes a _rels/.rels part data item having a reference tag to an FDS part data item to be referred to next, in a first position.

Next, the layout filter 411 initializes the variable I to 0 (step S2202). Then, the layout filter 411 ZIP-compresses interleaved FDS [I] to generate Local File Header and file data (step S2203). In other words, the layout filter 411 writes an FDS part data item having a reference tag to an FD part data item to be referred to next, in a second position.

Next, the layout filter 411 acquires a page count indicative of the number of pages of the (I+1)-th document (step S2204). An acquisition method employed here is the same as mentioned hereinbefore. Then, the layout filter 411 stores the acquired page count of the (I+1)-th document as the variable N (step S2205). Thereafter, the layout filter 411 initializes the variable J to 0 (step S2206). Next, the layout filter 411 ZIP-compresses interleaved FD(I+1)[J] to generate Local File Header and file data (step S2207). In other words, the layout filter 411 writes an FD part data item having a reference tag to an FP part data item to be referred to next, in a third position. Then, the layout filter 411 ZIP-compresses FD(I+1).FP[N–J] to generate Local File Header and file data (step S2208). In other words, the layout filter 411 writes an FP part data item to be referred to next, in a fourth position.

Next, the layout filter 411 adds 1 to the variable J (step S2209). In other words, the layout filter 411 memorizes which of the pages has been subjected to the processing for writing an interleaved FD part data item and an FP part data item. Then, the layout filter 411 performs comparison between the variable J and the variable N (step S2210), and if the variable J is smaller than the variable N, the steps S2207 to S2209 are repeatedly carried out until the variable J is not smaller than the variable N. In short, the layout filter 411 sequentially writes all the interleaved FD part data items and all the FP part data items of all the pages of the document while determining whether or not the all the interleaved FD part data items and all the FP part data items of all the pages of the document have been written.

Next, the layout filter 411 ZIP-compresses FD(I+1)[J], i.e. the remaining last FD part data item of the interleaved document to generate Local File Header and file data (step S2211). In short, the remaining FD part data of the document is written. As a result, all the interleaved FD and FP part data items of the document are rearranged in the reverse data sequence by the steps S2204 to S2211.

Next, the layout filter 411 adds 1 to the variable I (step S2212). In other words, the layout filter 411 memorizes which of the documents has been subjected to the processing for writing FDS, FD, and FP part data items. Then, the layout filter 411 performs comparison between the variable I and the variable M (step S2213), and if the variable I is smaller than the variable M, the steps S2203 to S2212 are repeatedly carried out until the variable I is not smaller than the variable M. In short, the layout filter 411 sequentially writes all the FDS part data items except the last data item of the interleaved FDS part data, and all the FD part data items and FP part data items of all the interleaved documents, in the above-described order, while determining whether or not all the FDS part data items except the last data item of the interleaved FDS part data, and all the FD part data items and all the FP part data items of all the interleaved documents have been written.

Next, the layout filter 411 ZIP-compresses FDS[I], i.e. the remaining last interleaved FDS part data item to generate Local File Header and file data (step S2214). In short, the remaining FDS part data item is written. Then, the layout filter 411 ZIP-compresses _rels/.rels[1], i.e. the last part data item of the interleaved _rels/.rels part data to generate Local File Header and file data (step S2215). In short, the remaining _rels/.rels part data item is written.

Through the above-described processes, all the part data items of the interleaved FDS part data, all the part data items of the interleaved FD part data of all the documents, and all the FP part data items of all the documents are rearranged in the reverse data sequence. However, it is assumed in the present embodiment that Local File Header and file data associated with the other part data, such as image files and font files, are positioned in a proper data sequence, as in the case of ZIP data before decompression.

Although in the present embodiment, it is assumed that _rels/.rels part data is interleaved into two parts, _rels/.rels part data can be interleaved into three parts in a case where information on a thumbnail image or the like information is contained in the _rels/.rels part data. In this case, Local File Header and file data associated with the information are positioned in a proper data sequence as in the case of ZIP data before decompression, similarly to the other part data, such as image files and font files. At this time, the last part data item of the interleaved _rels/.rels part data, which is denoted by _rels/.rels[1] in the illustrated example, comes to have a subscript with a different value. In this case, it is to be understood that the processing in the step S2215 is carried out on the last part data.

Next, the bookbinding printing process executed in the step S3408 in FIG. 14 will be described in detail with reference to FIG. 39.

Figure 39:
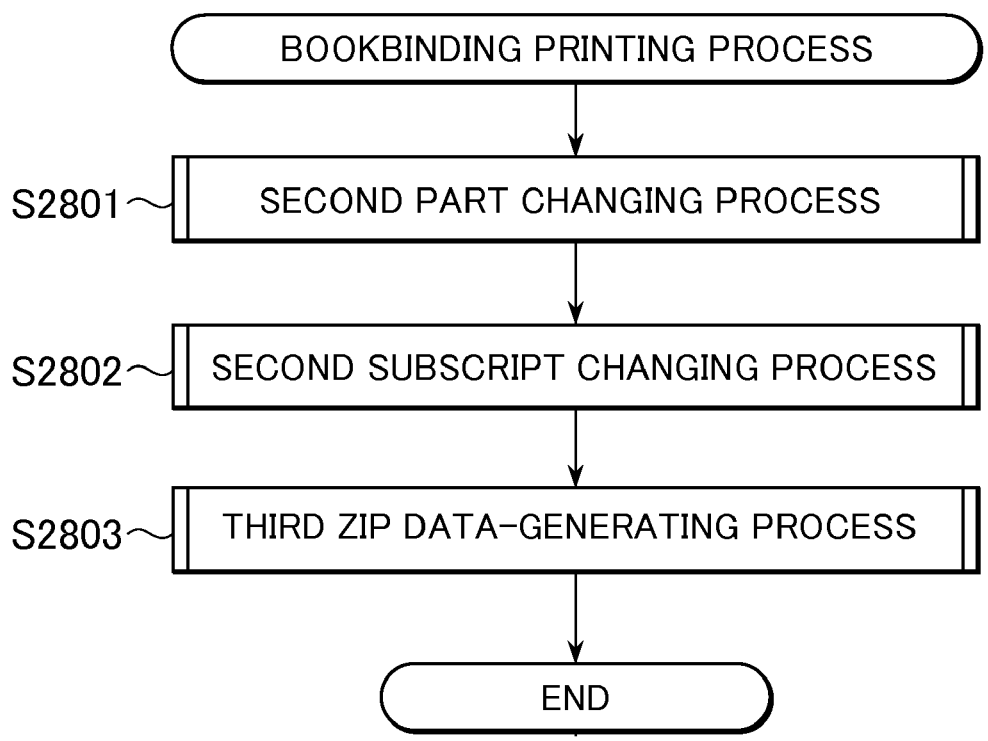
FIG. 39 is a flowchart of a bookbinding printing process in the second embodiment.

FIG. 39 is a flowchart of the bookbinding printing process executed by the information processing apparatus according to the second embodiment.

In the bookbinding printing process in the second embodiment, the layout filter 411 generates an XPS document having a data sequence for bookbinding printing, based on the XPS document received from the filter pipeline manager 410 in the step S3401 in FIG. 14 and expanded in the step S3402. Specifically, a second part editing process (step S2801) and a second subscript changing process (step S2802), and a third ZIP data-generating process (step S2803) are sequentially executed. These processes will be described in detail hereinafter.

Next, the second part editing process executed in the step S2801 in FIG. 39 will be described in detail with reference to FIG. 40.

Figure 40:
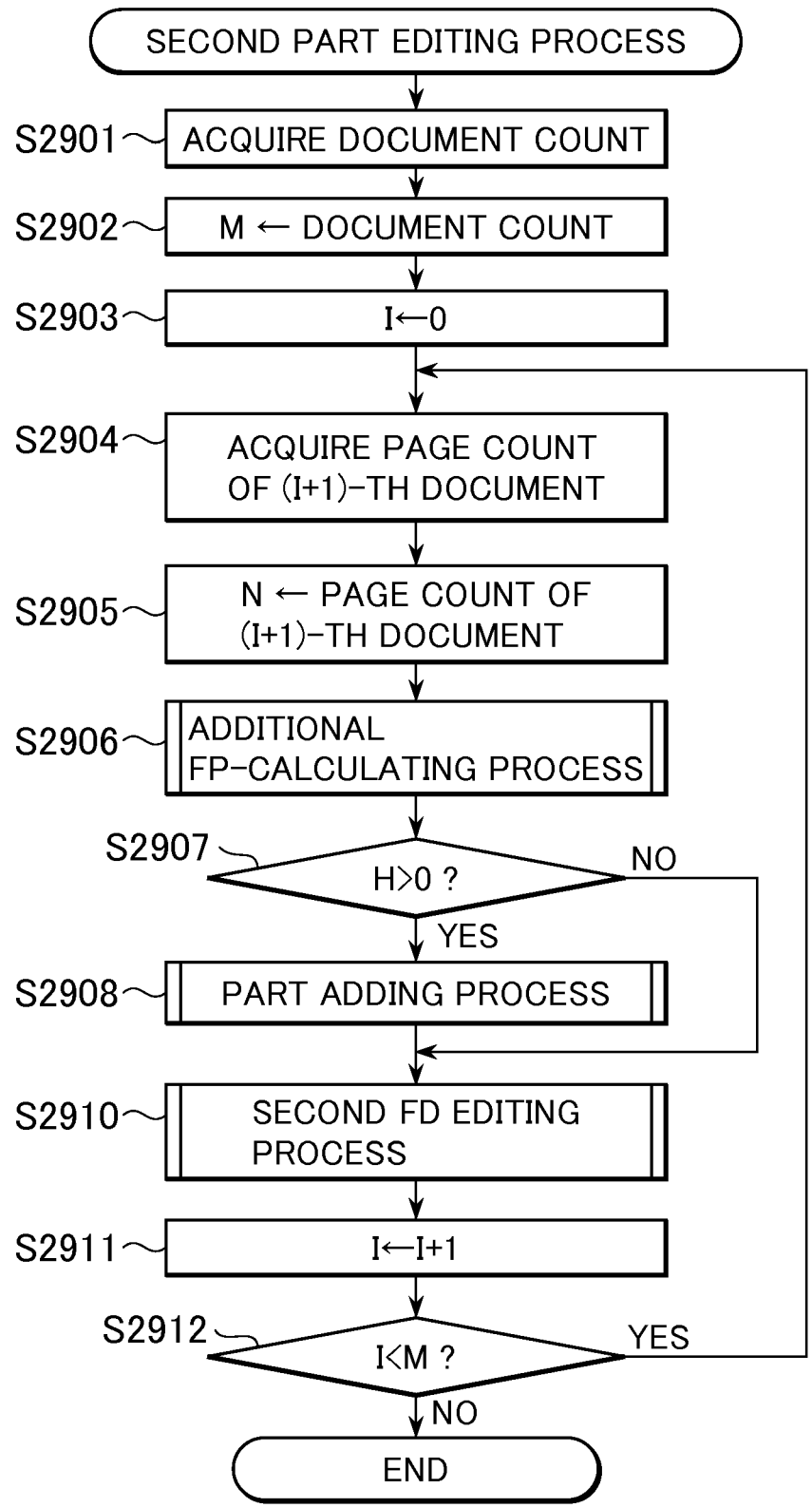
FIG. 40 is a flowchart of a second part editing process executed in a step S2801 in FIG. 39.

FIG. 40 is a flowchart of the second part editing process executed in the step S2801 in FIG. 39.

In the second part editing process, the layout filter 411 changes descriptions in some FDS and FD files of the XPS document received from the filter pipeline manager 410, so as to generate expanded data as a source of the XPS document having the data sequence for bookbinding printing.

Specifically, first, the layout filter 411 acquires a document count indicative of the number of documents in the XPS document (step S2901). The document count can be acquired by analyzing the FDS part data and checking how many FD part data items exist. Then, the layout filter 411 stores the acquired document count in the memory area secured in the RAM 102 managed by the layout filter 411 itself (step S2902). In this step, the document count is stored as the variable M in the memory area.

Next, the layout filter 411 initializes the variable I to 0 (step S2903). Then, the layout filter 411 acquires the page count of the (I+1)-th document (step S2904). The method of acquiring the page count is the same as described hereinbefore. Then, the layout filter 411 stores the acquired page count of the (I+1)-th document as the variable N (step S2905). Next, the layout filter 411 executes the additional FP-calculating process shown in FIG. 22 (step S2906). Then, the layout filter 411 determines whether or not it is required to add FP part data so as to generate the expanded data as the source of the XPS document having the data sequence for bookbinding printing.

Specifically, the layout filter 411 determines whether or not the variable H is larger than 0 (step S2907). If the variable H is larger than 0, the layout filter 411 executes the part adding process described with reference to FIG. 23 (step S2908). On the other hand, if the variable H is not larger than 0, the process directly proceeds to a step S2910, without executing the part adding process in the step S2808, wherein the layout filter 411 executes a second FD editing process (step S2910).

Now, the second FD editing process executed in the step S2910 in FIG. 40 will be described in detail with reference to FIG. 41.

Figure 41:
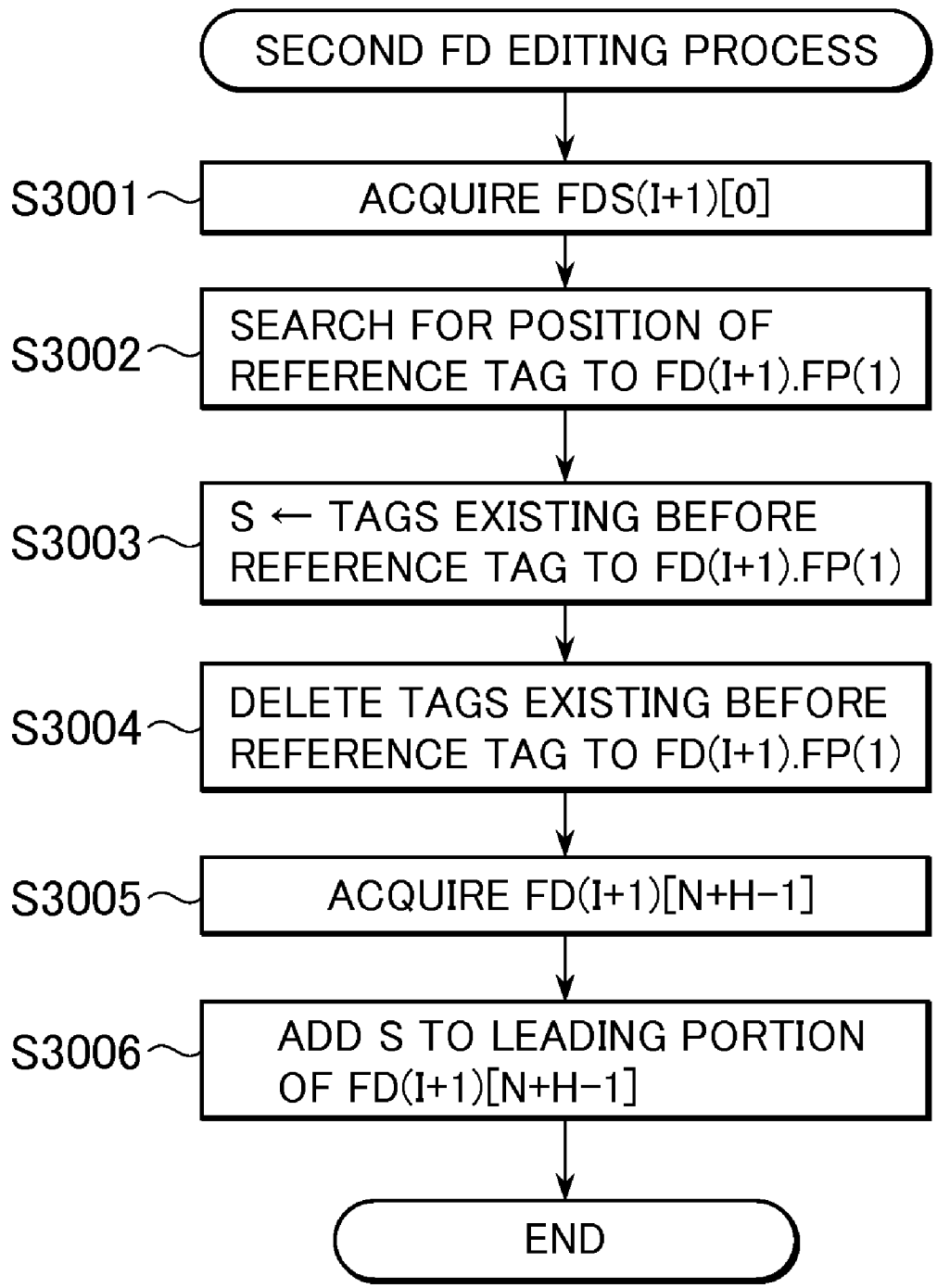
FIG. 41 is a flowchart of a second FD editing process executed in a step S2910 in FIG. 40.

FIG. 41 is a flowchart of the second FD editing process executed in the step S2910 in FIG. 40.

In the second FD editing process, in order to prevent contradiction with the XML specification or the XPS specification from arising when the part data items of the interleaved FD part data are rearranged in a bookbinding order, the layout filter 411 deletes unnecessary descriptions in the leading portion of a part data item having a reference tag to a first page and adds the unnecessary descriptions deleted in the deletion processing to the leading portion of a part data item having a reference tag to a final page. For example, the descriptions "<?xml version="1.0" encoding=" utf-8">" and "<FixedDocument xmlns="http://schemas.microsoft.com/xps/2005/06"" in the part data 853 in FIG. 9 are deleted from the leading portion thereof and added to the leading portion of the part data 854.

Specifically, first, the layout filter 411 acquires the first part data item of the interleaved FD part data (step S3001). Next, the layout filter 411 searches the descriptions in the first part data item, for the position of a reference tag to an FP part data item (step S3002). Then, the layout filter 411 stores descriptions of all the tags existing before the reference tag found by the search in the step S3002, in the variable buffer S in the memory area secured in the RAM 102 managed by the layout filter 411 itself (step S3003).

Next, the layout filter 411 deletes the descriptions of all the tags existing before the reference tag found by the search in the step S3002 from the first part data item of the FD part data (step S3004). Then, the layout filter 411 acquires the second last part data item of the interleaved FD part data (step S3005). Then, the layout filter 411 adds the descriptions of the reference tags stored in the variable buffer S in the step S3003 to the leading portion of the part data item acquired in the step S3005 (step S3006).

In the present embodiment, the processing in the step S3002 is executed on the first part data item of the interleaved FD part data and the processing in the step S3006 is executed on the second last part data item of the interleaved FD part data. However, since the processing in the step S3002 should be executed on a part data item having a reference tag to the first document and the processing in the step S3006 should be executed on a part data item having a reference tag to the last document, part data items to be acquired in the respective steps S3001 and S3005 are changed, as required, according to the configurations of the respective part data items of interleaved FD part data in an XPS document received from the filter pipeline manager 410.

Referring again to FIG. 40, the layout filter 411 adds 1 to the variable I (step S2911). In other words, the layout filter 411 memorizes which of the documents has been subjected to the FD content change processing. Then, the layout filter 411 performs comparison between the variable I and the variable M (step S2912), and if the variable I is smaller than the variable M, the steps S2904 to S2911 are repeatedly carried out until the variable I is not smaller than the variable M. In short, the layout filter 411 performs the FD content change processing on all documents requiring the processing, while determining whether or not the processing has been performed on all the documents requiring the processing. Thus, the descriptions in all the FD part data items of all the documents are changed by the steps S2903 to S2911 on a document-by-document basis so as to prevent contradiction with the XML specification or the XPS specification from arising when the part data items of the documents are rearranged in the data sequence for bookbinding printing.

Next, the second subscript changing process executed in the step S2802 in FIG. 39 will be described in detail with reference to FIG. 42.

Figure 42:
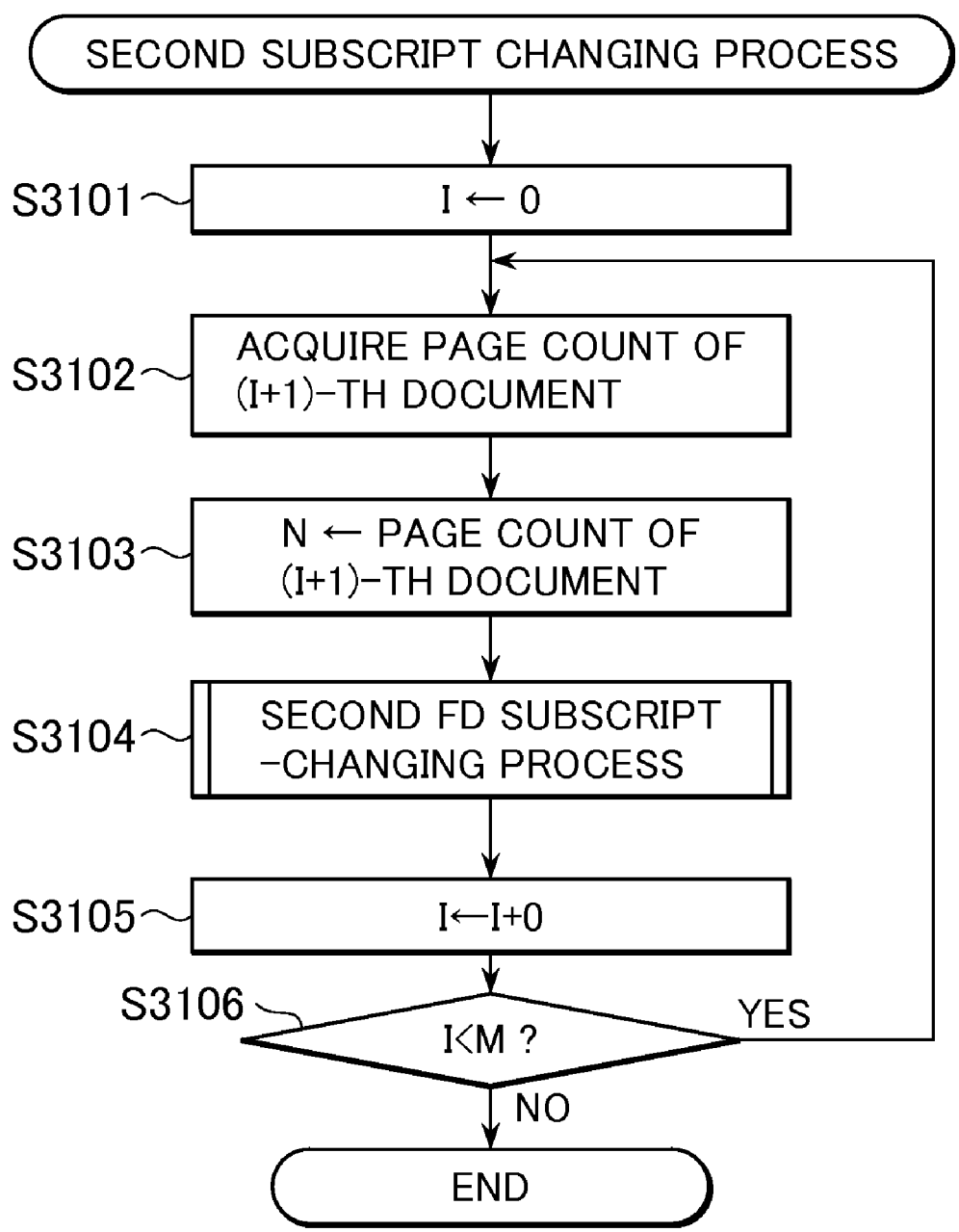
FIG. 42 is a flowchart of a second subscript changing process executed in a step S2802 in FIG. 39.

FIG. 42 is a flowchart of the second subscript changing process executed in the step S2802 in FIG. 39.

In the second subscript changing process, the subscript values of the respective part data items of the interleaved FD part data in the XPS document received from the filter pipeline manager 410 are changed so as to generate the expanded data as the source of the XPS document having the data sequence for bookbinding printing.

First, in the steps S1903 to S1909, the layout filter 411 executes processing for changing the subscript values of the respective part data items, each of which has a reference tag to an FP part data item, of the interleaved FD part data, on the FD part data of all the documents so as to rearrange all the pages of all the documents in the data sequence for bookbinding printing. For example, assuming that FD part data in a document having eight pages is interleaved into nine part data items and that a first part data item (/Documents/1/FixedDocument.fdoc/[0].piece) has a reference tag to a first page, a second part item (/Documents/1/FixedDocument.fdoc/[1].piece) has a reference tag to a second page, a third part data item (/Documents/1/FixedDocument.fdoc/[2].piece) has a reference tag to a third page, a fourth part data item (/Documents/1/FixedDocument.fdoc/[3].piece) has a reference tag to a fourth page, a fifth part data item (/Documents/1/FixedDocument.fdoc/[4].piece) has a reference tag to a fifth page, a sixth part data item (/Documents/1/FixedDocument.fdoc/[5].piece) has a reference tag to a sixth page, a seventh part data item (/Documents/1/FixedDocument.fdoc/[6].piece) has a reference tag to a seventh page, an eighth part data item (/Documents/1/FixedDocument.fdoc/[7].piece) has a reference tag to an eighth page, and a ninth part data item (/Documents/1/FixedDocument.fdoc/ [8].piece) has the remaining tag information, the subscript of [0].piece is changed from [0] to [1], the subscript of [1].piece is changed from [1] to [2], the subscript of [2].piece is changed from [2] to [5], the subscript of [3].piece is changed from [3] to [6], the subscript of [4].piece is changed from [4] to [7], the subscript of [5].piece is changed from [5] to [4], the subscript of [6].piece is changed from [6] to [3], and the subscript of [7].piece is changed from [7] to [0].

Specifically, the layout filter 411 initializes the variable I to 0 (step S3101). Then, the layout filter 411 acquires the page count of the (I+1)-th document (step S3102). The layout filter 411 can acquire the page count by analyzing the FD part data and checking how many FP part data items exist. Then, the layout filter 411 stores the acquired page count in the memory area secured in the RAM 102 managed by the layout filter 411 itself (step S3103). In the illustrated example, the page count is stored as the variable N in the memory area.

Next, the layout filter 411 changes the subscript values of the respective part data items of the interleaved FD part data so as to generate the expanded data as the source of the XPS document having the data sequence for bookbinding printing. Specifically, a second FD subscript-changing process is executed (step S3104).

Now, the second FD subscript-changing process executed in the step S3104 in FIG. 42 will be described in detail with reference to FIG. 43.

Figure 43:
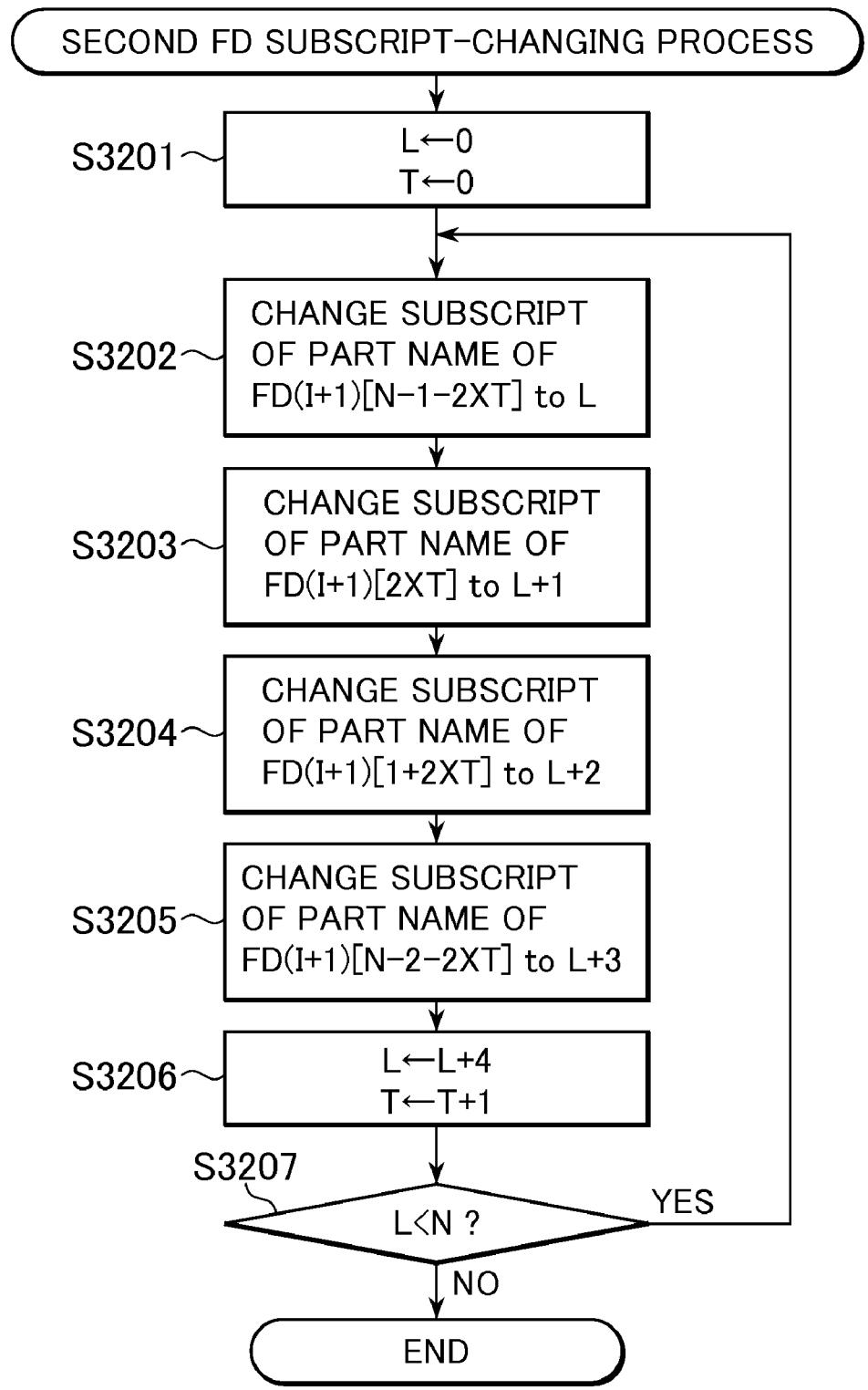
FIG. 43 is a flowchart of a second FD subscript-changing process executed in a step S3104 in FIG. 42.

FIG. 43 is a flowchart of the second FD subscript-changing process executed in the step S3104 in FIG. 42.

In the second FD subscript-changing process, the subscript values of the respective part data items, each of which has a reference tag to an FP part data item, of the interleaved FD part data are changed such that the pages of the document are rearranged in the data sequence for bookbinding printing. For example, assuming that FD part data in a document having eight pages is interleaved into nine part data items and that the first part data item (/Documents/1/FixedDocument.fdoc/[0] .piece) has a reference tag to the first page, the second part item (/Documents/1/FixedDocument.fdoc/[1].piece) has a reference tag to the second page, the third part data item (/Documents/1/FixedDocument.fdoc/ [2].piece) has a reference tag to the third page, the fourth part data item (/Documents/1/ FixedDocument.fdoc/[3].piece) has a reference tag to the fourth page, the fifth part data item (/Documents/1/ FixedDocument.fdoc/[4].piece) has a reference tag to the fifth page, the sixth part data item (/Documents/1/FixedDocument.fdoc/[5].piece) has a reference tag to the sixth page, the seventh part data item (/Documents/1/FixedDocument.fdoc/ [6].piece) has a reference tag to the seventh page, the eighth part data item (/Documents/1/ FixedDocument.fdoc/[7] .piece) has a reference tag to the eighth page, and the ninth part data item (/Documents/1/FixedDocument.fdoc/[8]. piece) has the remaining tag information, the subscript of [0].piece is changed from [0] to [1], the subscript of [1].piece is changed from [1] to [2], the subscript of [2].piece is changed from [2] to [5], the subscript of [3].piece is changed from [3] to [6], the subscript of [4].piece is changed from [4] to [7], the subscript of [5].piece is changed from [5] to [4], the subscript of [6].piece is changed from [6] to [3], and the subscript of [7].piece is changed from [7] to [0].

Specifically, first, the layout filter 411 initializes the variables L and T in the memory area secured in the RAM 102 managed by the layout filter 411 itself to 0 (step S3201). Next, the layout filter 411 changes the subscript of an (N−1−2×T+ 1)-th part data item of the interleaved FD part data from "N−1−2×T" to "L" (step S3202). At this time, in order to prevent a plurality of paths having the same name from even temporarily existing after the subscript change, change processing is carried out in the temporary directory, for example. Then, the layout filter 411 changes the subscript of a (2×T+ 1)-th part data item of the interleaved FD part data from "2×T" to "L+1" (step S3203).

Next, the layout filter 411 changes the subscript of a (1+2× T+1)-th part data item of the interleaved FD part data from "1+2×T" to "L+2" (step S3204). Then, the layout filter 411 changes the subscript of a (N−2−2×T+1)-th part data item of the interleaved FD part data from "N−2−2×T" to "L+3" (step S3205). Then, the layout filter 411 adds 4 to the variable L and 1 to the variable T (step S3206). In other words, the layout filter 411 memorizes which of the part data items has been subjected to the FD subscript value-change processing.

Next, the layout filter 411 performs comparison between the variable L and the variable N (step S3207), and if the variable L is smaller than the variable N, the steps S3202 to S3206 are repeatedly carried out. Then, when the variable L is not smaller than the variable N after repeated execution of the steps S3202 to S3206, the present second FD subscript-changing process is terminated. In short, the layout filter 411 performs the FD subscript value-change processing on each of all the part data items of the interleaved FD part data except the last one of the document while determining whether or not the processing has been performed on all the part data items except the last one of the document. Thus, the subscript values of all the part data items of the interleaved FD part data except the last one are rearranged in the data sequence for bookbinding printing by the steps S3201 to S3207.

Although in the present embodiment, assuming that the leading part data item of the interleaved FD part data has a reference tag to an FP part data item of the first page, the subscript values of the respective part data items within the range from the leading part data item to the second last one are rearranged in the data sequence for bookbinding printing, the range of part data items whose subscript values are to be placed in the data sequence for bookbinding printing is changed, as required, according to the configurations of respective part data items of interleaved FD part data in an XPS document received from the filter pipeline manager 410.

Next, the third ZIP data-generating process executed in the step S2803 in FIG. 39 will be described in detail with reference to FIG. 44.

Figure 44:
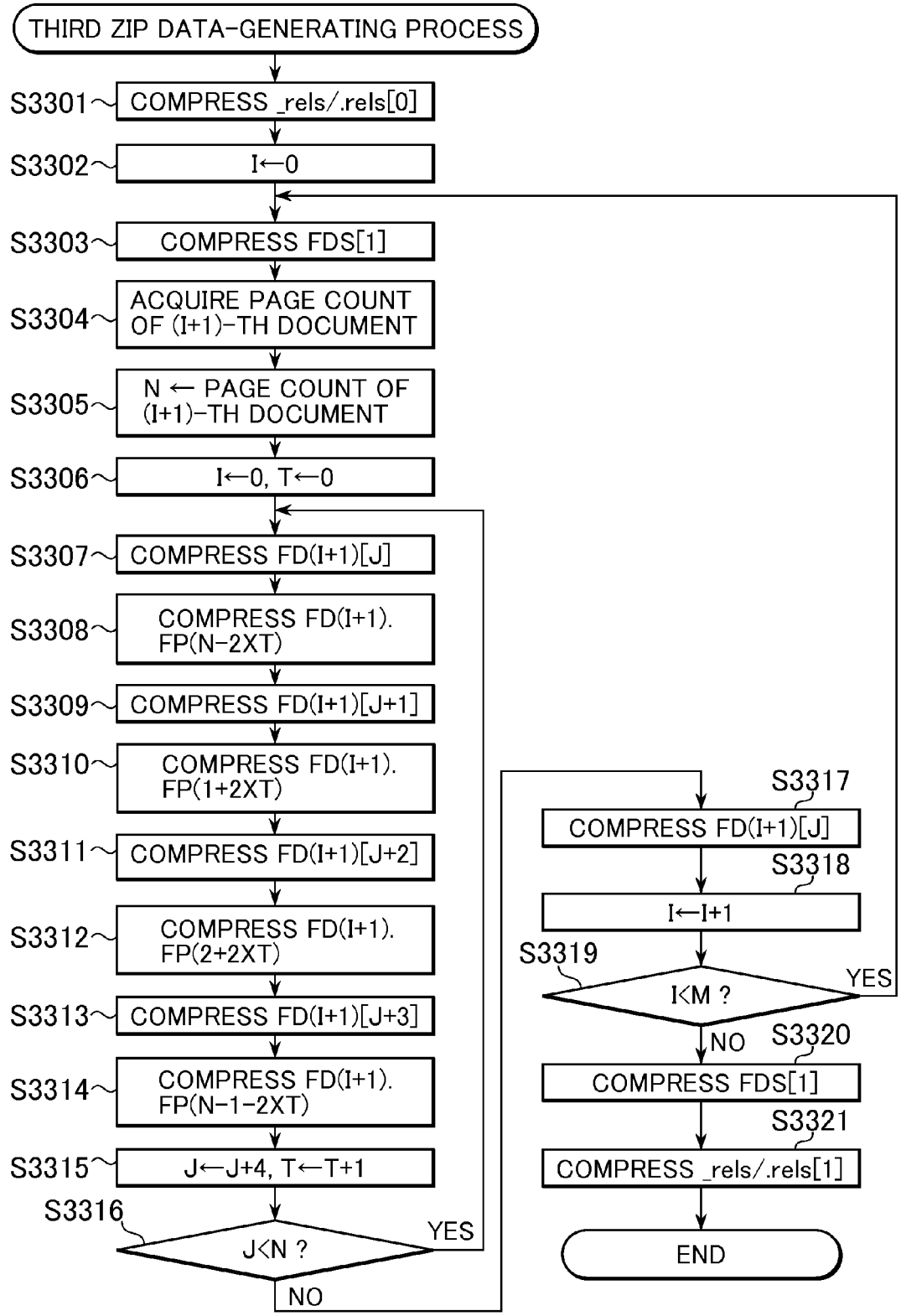
FIG. 44 is a flowchart of a third ZIP data-generating process executed in a step S2803 in FIG. 39.

FIG. 44 is a flowchart of the third ZIP data-generating process executed in the step S2803 in FIG. 39.

First, the layout filter 411 ZIP-compresses _rels/.rels[0] of the interleaved $_{13}$ rels/.rels part data to generate Local File Header and file data (step S3301). In other words, the layout filter 411 writes a _rels/.rels part data item having a reference tag to an FDS part data item to be referred to next, in a first position.

Next, the layout filter 411 initializes the variable I to 0 (step S3302). Then, the layout filter 411 ZIP-compresses FDS[I] of the interleaved FDS part data to generate Local File Header and file data (step S3303). In other words, the layout filter 411 writes an FDS part data item having a reference tag to an FD part data item to be referred to next, in a second position.

Next, the layout filter 411 acquires the page count of the (I+1)-th document (step S3304). An acquisition method employed here is the same as mentioned hereinbefore. Then, the layout filter 411 stores the acquired page count of the (I+1)-th document as the variable N (step S3305). Thereafter, the layout filter 411 initializes each of the variable J and the variable T to 0 (step S3306). Next, the layout filter 411 ZIP-compresses FD(I+1)[J] of the interleaved FD part data to generate Local File Header and file data (step S3307). In other words, the layout filter 411 writes an FD part data item having a reference tag to an FP part data item to be referred to next, in a third position.

Next, the layout filter 411 ZIP-compresses FD(I+1).FP[N−2×T] to generate Local File Header and file data (step S3308). In other words, the layout filter 411 writes the FP part data item to be referred to next, in a fourth position. Then, the layout filter 411 ZIP-compresses FD(I+1)[J+1] to generate Local File Header and file data (step S3309). In other words, the layout filter 411 writes an FD part data item having a reference tag to an FP part data item to be referred to next, in a fifth position. Then, the layout filter 411 ZIP-compresses FD(I+1).FP[1+2×T] to generate Local File Header and file data (step S3310). In other words, the layout filter 411 writes the FP part data item to be referred to next, in a sixth position.

Next, the layout filter 411 ZIP-compresses FD(I+1)[J+2] of the interleaved FD part data to generate Local File Header and file data (step S3311). More specifically, the layout filter 411 writes an FD part data item having a reference tag to an FP part data item to be referred to next, in a seventh position. Then, the layout filter 411 ZIP-compresses FD(I+1).FP[2+2×T] to generate Local File Header and file data (step S3312). In other words, the layout filter 411 writes the FP part data item to be referred to next, in an eighth position. Next, the layout filter 411 ZIP-compresses FD(I+1)[J+3] of the interleaved FD part data to generate Local File Header and file data (step S3313). In other words, the layout filter 411 writes an FD part data item having a reference tag to an FP part data item to be referred to next, in a ninth position. Then, the layout filter 411 ZIP-compresses FD(I+1).FP[N−1−2×T] to generate Local File Header and file data (step S3314). In other words, the layout filter 411 writes the FP part data item to be referred to next, in a tenth position.

Next, the layout filter 411 adds 4 to the variable J and 1 to the variable T (step S3315). In other words, the layout filter 411 memorizes which of the pages has been subjected to the processing for writing FD and FP part data items. Then, the layout filter 411 performs comparison between the variable J and the variable N (step S3316), and if the variable J is smaller than the variable N, the steps S3307 to S3315 are repeatedly carried out until the variable J is not smaller than the variable N. In short, the layout filter 411 sequentially writes the interleaved FD part data items and all the FP part data items of all the pages of the document in the above-described order while determining whether or not all the interleaved FD part data items and all the FP part data items of all the pages of the document have been written.

Next, the layout filter 411 ZIP-compresses FD(I+1)[J], i.e. the last part data item of the interleaved FD part data in the document to generate Local File Header and file data (step S3317). In short, the remaining FD part data in the document is written. As a result, all the FD and FP part data items of the interleaved document are rearranged in the data sequence for bookbinding by the steps S3304 to S3317.

Next, the layout filter 411 adds 1 to the variable I (step S3318). More specifically, the layout filter 411 memorizes which of the documents has been subjected to the processing for writing FDS, FD, and FP part data items. Then, the layout filter 411 performs comparison between the variable I and the variable M (step S3319), and if the variable I is smaller than the variable M, the steps S3303 to S3318 are repeatedly carried out until the variable I is not smaller than the variable M. In short, the layout filter 411 sequentially writes all the FDS part data items except the last data item of the interleaved FDS part data and all the FD and FP part data items of all the pages of all the interleaved documents in the above-described order while determining whether or not all the FDS part data items except the last data item of the interleaved FDS part data and all the FD and FP part data items of all the pages of all the interleaved documents in the above-described order have been written.

Next, the layout filter 411 ZIP-compresses FDS[I], i.e. the last part data item of the interleaved FDS part data to generate Local File Header and file data (step S3320). In short, the remaining FDS part data is written. Then, the layout filter 411 ZIP-compresses _rels/.rels[1], i.e. the last part data item of the interleaved _rels/.rels part data to generate Local File Header and file data (step S3321). In short, the remaining _rels/.rels part data item is written.

Through the above-described processes, all the part data items of the interleaved FDS part data, all the part data items of all the interleaved FD part data items of all the documents, and all the FP part data items of all the documents are rearranged in the data sequence for bookbinding printing. However, it is assumed in the present embodiment that Local File Header and file data associated with the other part data, such as image files and font files, are positioned in a proper data sequence as in the ZIP data before decompression.

Although in the present embodiment, it is assumed that _rels/.rels part data is interleaved into two parts, _rels/.rels part data can be interleaved into three parts in a case where information on a thumbnail image or the like information is contained in the _rels/.rels part data. In this case, Local File Header and file data associated with the information are positioned in a proper data sequence as in the case of ZIP data before decompression, similarly to the other part data, such as image files and font files. At this time, the last part data item of the interleaved _rels/.rels part data, which is denoted by _rels/.rels[1] in the illustrated example, comes to have a subscript with a different value. In this case, it is to be understood that the processing in the step S3321 is carried out on the last part data.

Finally, as in the first embodiment, if the step S3407 is executed, the layout filter 411 sends the ZIP data generated in the step S3407, as an XPS document, to the filter pipeline manager 410, followed by terminating the print control process. On the other hand, if the step S3408 is executed, the layout filter 411 sends the ZIP data generated in the step S3408, as an XPS document, to the filter pipeline manager 410, followed by terminating the print control process. If neither the step S3407 nor the step S3408 is executed, the layout filter 411 sends the ZIP data acquired in the step S3401, as an XPS document, to the filter pipeline manager 410, followed by terminating the print control process. Thus, in the case of executing reverse-order printing, the layout filter 411 sends the XPS document data having the data sequence shown in FIG. 29 to the filter pipeline manager 410, while in the case of executing bookbinding printing, the layout filter 411 sends the XPS document data having the data sequence shown in FIG. 30 to the filter pipeline manager 410.

It should be noted that the memory area secured in the RAM 102 managed by the layout filter 411 becomes available upon completion of an initialization process, not shown, executed for the layout filter 411 prior to execution of the processes described with reference to FIGS. 14 and 31 to 44, and becomes unavailable upon completion of a termination process, not shown, executed for the layout filter 411 after execution of the processes described with reference to FIGS. 14 and 31 to 44. The memory area used for execution of the processes shown in FIGS. 14 and 31 to 44 is secured whenever it is necessitated, and is released whenever it becomes unnecessary.

Further, although in the present embodiment, _rels/.rels, FixedDocumentSequence, FixedDocument, FixedPage, the image file, and the font file are described as target part data by way of example, an XPS file contains not only these part data items, but also other part data items, such as print tickets and files with an extension ".rels". Similarly to the above-described part data items, each of the latter part data items is positioned immediately after appearance of a reference tag thereto.

The second embodiment as well as the first embodiment makes it possible to speed up print processing carried out by a printing apparatus to thereby prevent lowering of print throughput which conventionally occurs.

A third embodiment of the present invention is identical to the above-described first embodiment in the basic components and processing described with reference to FIGS. 1 to 14. Therefore, the basic components are denoted by the same reference numerals, and duplicate description of the basic components and processes is omitted. In the following, only different points from the first embodiment will be described.

As described hereinbefore, there have been proposed a technique in which other XPS data than XPS data generated by a printing system provided by an OS when the XPS print path is used is directly output as a print spool file, and when this technique is employed, data having non-interleaved part data interleaved can be sent to the layout filter 411. Further, it is confirmed that even the XPS data generated by a printing system provided by an OS when the XPS print path is used sometimes has FixedPage part data thereof not interleaved.

To cope with such cases, in the third embodiment, when print settings are for non-normal-order printing of data including non-interleaved part data, the layout filter 411 generates XPS data having a data sequence suited to the print settings, by a print control function provided for the XPS print path. Specifically, a process for interleaving the non-interleaved part data is inserted between the steps S3402 and S3403 in FIG. 14. It should be noted that in the reverse-order printing process in the step S3407 in FIG. 14 and the bookbinding printing process in the step S3408 in FIG. 14, the processing described in the first embodiment may be performed, or alternatively, the processing described in the second embodiment may be performed.

Figure 45:
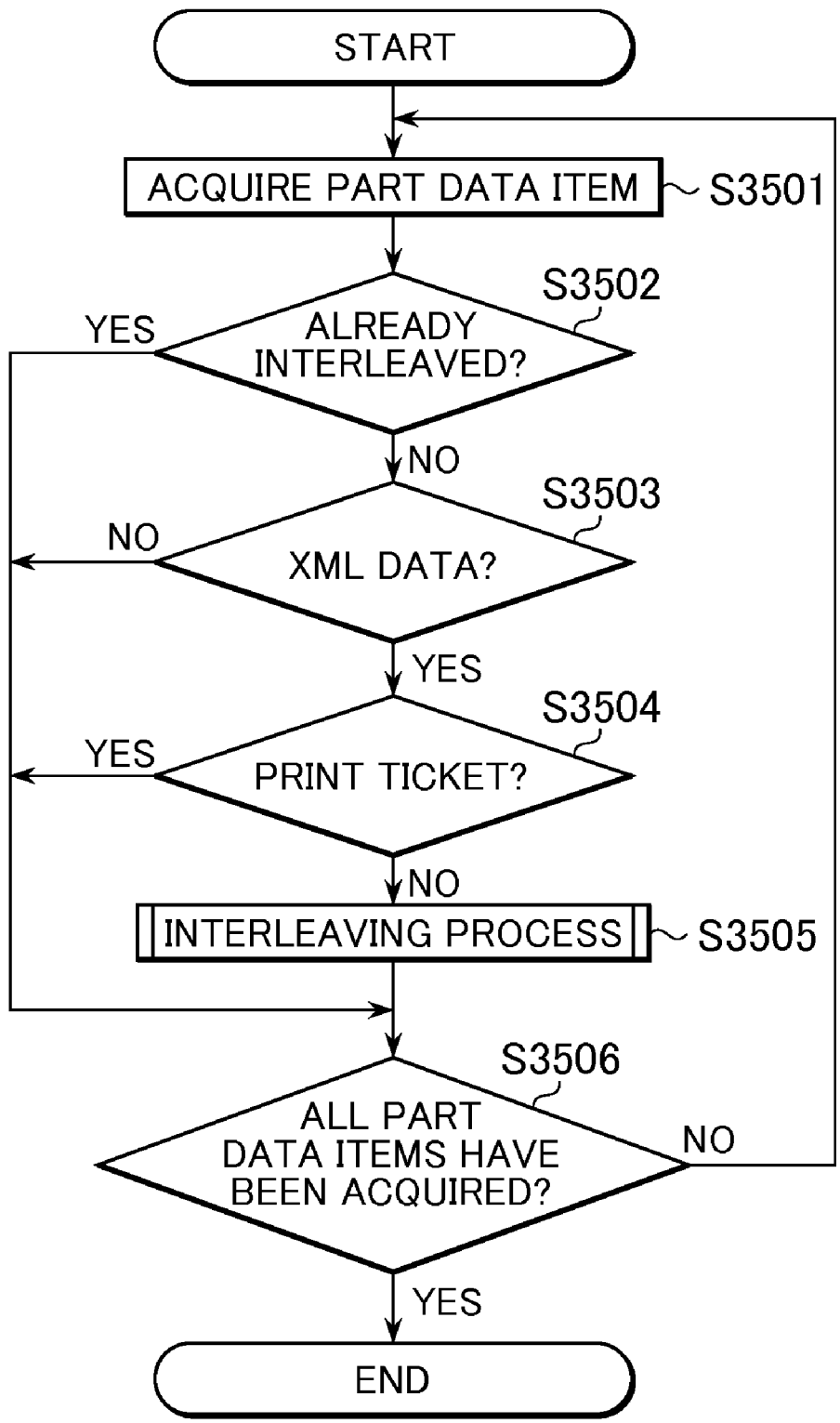
FIG. 45 is a flowchart of a part interleaving process executed by a printing system including an information processing apparatus according to a third embodiment of the present invention.

FIG. 45 is a flowchart of a part interleaving process executed by an information processing apparatus according to the third embodiment.

First, the layout filter 411 acquires part data (step S3501). A first part data item to be acquired in the present process is _rels/.rels. Next, it is determined whether or not the acquired part data item has already been interleaved (step S3502). This determination can be made based on whether the _rels/.rels part data item is formed as one file, or whether the _rels/.rels part data item is formed as a directory which contains a file or files.

If it is determined in the step S3502 that the acquired part data item is not interleaved, the layout filter 411 determines whether or not the acquired part data item is XML data (step S3503). If the part data item is XML data, the layout filter 411 determines whether or not the part data item is a print ticket (step S3504). If the part data item is not a print ticket, the layout filter 411 executes an interleaving (dividing) process described hereinafter (step S3505).

If determining in the step S3502 that the acquired part data item has already been interleaved (divided), or if determining in the step S3503 that the part data item is not XML data, or if it is determined in the step S3504 that the part data item is a print ticket, it means that it is not necessary to perform interleaving, and hence the layout filter 411 does not execute the interleaving (dividing) process in the step S3505.

Then, the layout filter 411 determines whether or not the steps S3501 to S3505 have been carried out on all part data items (step S3506). If the steps S3501 to S3505 have not been carried out on all the part data items, the layout filter 411 newly acquires a next part data item, and carries out the steps S3501 to S3505 on the part data item. On the other hand, if it is determined that the steps S3501 to S3505 have already been carried out on all the part data items, the part interleaving process for interleaving an non-interleaved part data item is terminated.

Next, the interleaving process executed in the step S3505 in FIG. 45 will be described in detail with reference to FIG. 46. In the present process, a part data item having a reference tag to another part data item is interleaved by being divided into tags each having a reference tag to another part data item.

Figure 46:
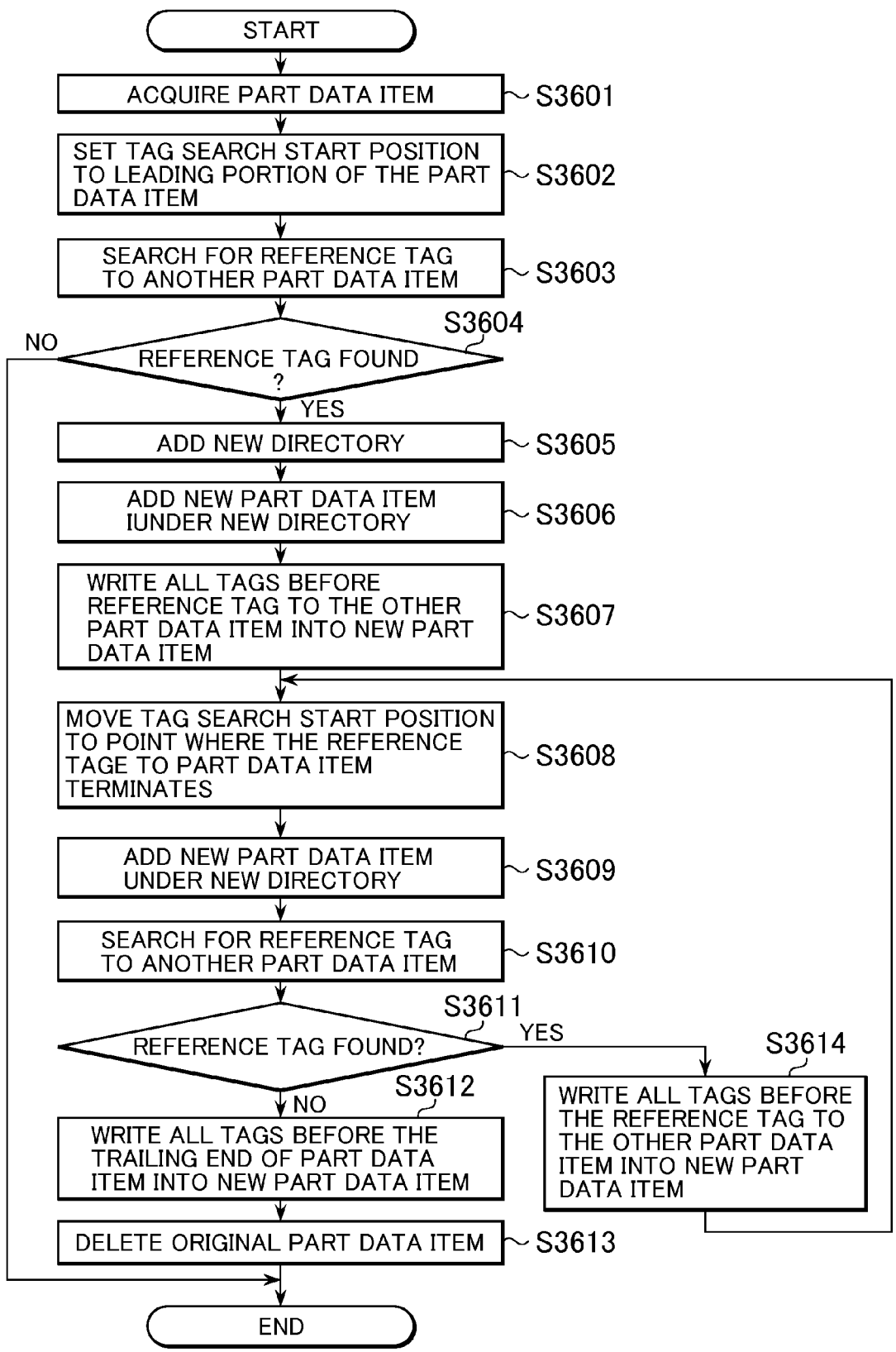
FIG. 46 is a flowchart of an interleaving process executed in a step S3505 in FIG. 45.

FIG. 46 is a flowchart of the interleaving process executed in the step S3505 in FIG. 45.

First, the layout filter 411 acquires a part data item (step S3601). Next, the layout filter 411 sets a tag search start position to the leading portion of the acquired part data item (step S3602). Then, the layout filter 411 searches the descriptions in the part data item, for a reference tag to another part data item (step S3603). Then, the layout filter 411 determines whether or not a reference tag to another part data item has been found in the step S3603 (step S3604).

If it is determined in the step S3604 that a reference tag to another part data item has been found, the layout filter 411 adds a new directory in the same hierarchical level where the present part data item belongs (step S3605). It should be noted that the same name as that of the present part data item is assigned to the directory. On the other hand, if it is determined in the step S3604 that no reference tag to another part data item has been found, which means that the present part data item does not need interleaving, the layout filter 411 terminates the present process without carrying out the step S3605 and the following steps S3606 to S3614.

Next, the layout filter 411 adds a part data item under the new directory added in the step S3605 (step S3606). It should be noted that a file of the added part data item is named "[s].piece". Here, s represents a decimal value, and each file to be added under the directory is assigned one of consecutive integer values starting at 0. The value s is stored in a memory area secured in the RAM 102 managed by the layout filter 411.

Next, the layout filter 411 writes descriptions between the tag search start position set in the step S3602 and the reference tag to another part data item, found in the step S3603, into the part data item added in the step S3606 (step S3607). Then, the layout filter 411 moves the tag search start position to a point at which terminates the reference tag to another part data item, which has been found in the step S3603 (step S3608). Then, similarly to the step S3606, the layout filter 411 adds a part data item under the new directory added in the step S3605 (step S3609). It should be noted that this file of the added part data item is named by the method mentioned in the step S3606.

Next, the layout filter 411 searches descriptions in the present part data item, for a reference tag to another part data item, in the same manner as in the step S3603, (step S3610). Then, as in the step S3604, the layout filter 411 determines whether or not a reference tag to another part data item has been found in the step S3610 (step S3611).

If it is determined in the step S3611 that a reference tag to another part data item has been found, the layout filter 411 writes descriptions between the tag search start position moved in the step S3608 and the reference tag to another part data item, found in the step S3610, into the part data item added in the step S3609, in the same manner as in the step S3607 (step S3614). Then, the steps S3608 to S3611 are repeatedly carried out.

On the other hand, if it is determined in the step S3611 that a reference tag to another part data item has not been found, the layout filter 411 writes descriptions between the tag search start position moved in the step S3608 and the trailing end of the present part data item into the part data item added in the step S3609 (step S3612). Then, the layout filter 411 deletes the original part data item (step S3613).

By executing the above-described process, only part data items requiring interleaving are interleaved. For example, the part data _rels/.rels 801 is interleaved into the part data items 851 and 852, and the part data item FDS 810 is interleaved into the part data items 858 and 859, and a part data item 860. Further, the part data item FD 804 is interleaved into the part data items 853 and 854, and a part data item 855, and the part data item FD 806 is interleaved into part data items 856 and 857. Although not shown, part data items FP 802, 803, and 805 are each interleaved into a plurality of part data items.

By executing the processes described in the first embodiment or the second embodiment in addition to the interleaving process described in the third embodiment, even when the print settings are for non-normal-order printing of data including non-interleaved part data, it is possible to generate XPS data having a data sequence suited to the print settings. Further, it is possible to prevent lowering of print throughput which conventionally occurs, and to speed up the printing process carried out by a printing apparatus.

It should be noted that the memory area secured in the RAM 102 managed by the layout filter 411 becomes available upon completion of an initialization process, not shown, executed for the layout filter 411 prior to execution of the processes described with reference to FIGS. 14 and 45 to 46, and becomes unavailable upon completion of a termination process, not shown, executed for the layout filter 411 after execution of the processes described with reference to FIGS. 14 and 45 to 46. However, it is assumed that the memory area used for execution of the processes shown in FIGS. 14, 45 and 46 is secured whenever it becomes necessary, and is released whenever it becomes unnecessary.

Although in the above-described embodiment, part data items as components of XPS data are subjected to the interleaving process and then rearranged in an optimal data sequence for reverse-order printing or bookbinding printing, the interleaving process may be executed in parallel with the first path changing process in the step S1001 in FIG. 15 or the second path changing process in the step S2301 in FIG. 20 by performing naming of files of part data items executed in the steps S3606 and S3609 in consideration of the first path changing process in the step S1001 in FIG. 15 or the second path changing process in the step S2301 in FIG. 20.

Further, it is to be understood that insofar as the functions of the present invention are realized, the present invention can be applied to any of a single apparatus, a system comprised of a plurality of apparatuses, and a system in which processing is performed through connection via a network, such as a LAN or a WAN.

The present invention can be realized by being applied to an application, such as a printer driver, which cooperates with an OS, such as Windows (registered trademark) Vista, and a printing system provided by the OS. Further, although the present invention is applied to the XPS data, it is to be understood that the present invention can be applied even to a file format different from the XPS, insofar as the file format has similar properties to the XPS.

It is to be understood that the present invention may also be accomplished by supplying a system or an apparatus with a storage medium in which a program code of software, which realizes the functions of any of the above described embodiments, is stored, and causing a computer (or CPU or MPU) of the system or apparatus to read out and execute the program code stored in the storage medium.

In this case, the program code itself read from the storage medium realizes the functions of any of the above described embodiments, and therefore the program code and the storage medium in which the program code is stored constitute the present invention.

Examples of the storage medium for supplying the program code include a floppy (registered trademark) disk, a hard disk, a magnetic-optical disk, an optical disk, such as a CD-ROM, a CD-R, a CD-RW, a DVD-ROM, a DVD-RAM, a DVD-RW, or a DVD+RW, a magnetic tape, a nonvolatile memory card, and a ROM. Alternatively, the program may be downloaded via a network.

Further, it is to be understood that the functions of any of the above described embodiments may be accomplished by writing a program code read out from the storage medium into a memory provided on an expansion board inserted into a computer or a memory provided in an expansion unit connected to the computer and then causing a CPU or the like provided in the expansion board or the expansion unit to perform a part or all of the actual operations based on instructions of the program code.

Further, it is to be understood that the functions of any of the above described embodiments may be accomplished not only by executing the program code read out by a computer, but also by causing an OS (operating system) or the like which operates on the computer to perform a part or all of the actual operations based on instructions of the program code. In this case, the program code is supplied from a storage medium in which the program code is stored, or is supplied by downloading directly from another computer, a database, or the like, not shown, connected to the Internet, a commercial network, a local area network, or the like.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions.

This application claims priority from Japanese Patent Application No. 2007-320071 filed Dec. 11, 2007, which is hereby incorporated by reference herein in its entirety.

What is claimed is:

1. An information processing apparatus comprising:
   an input unit adapted to input archive data formed by archiving a page layout data file describing layout information on a document, print target data files each describing information on pages to be printed, which is to be referenced in accordance with a reference tag for the layout information described in the page layout data file, and a resource file, wherein the layout information includes a plurality of reference information for referring to the print target data files respectively;
   an expanding unit adapted to expand the input archive data;
   a print setting information-acquiring unit adapted to acquire print setting information indicative of print settings for non-normal order printing;
   a changing unit adapted to change, in accordance with the print setting information, the plurality of reference information of the layout information described in the page layout data file of the expanded archive data, so as to enable a printing apparatus to execute a print process while receiving the print target data files of the input archive data in a data sequence in accordance with the acquired print setting information;
   a rearranging unit adapted to rearrange the print target data files in the data sequence in accordance with the plurality of changed reference information;
   a disposing unit adapted to dispose the page layout data file before the rearranged print target data files;
   a print data-generating unit adapted to generate new archive data by compressing the expanded archive data with the print target data files rearranged by said rearranging unit and with the page layout data file disposed by said disposing unit; and
   a non-transitory memory for storing data input by said input unit.

2. The information processing apparatus according to claim 1, further comprising a dividing unit adapted to divide the page layout data file and the print target data files into a plurality of files.

3. The information processing apparatus according to claim 1, wherein said print data-generating unit includes a file path-changing unit adapted to change paths of some files of the print target data files according to the data sequence.

4. The information processing apparatus according to claim 1, wherein said print data-generating unit includes a part editing unit adapted to be operable when the print target data files are rearranged, to delete unnecessary descriptions in a leading portion of a print target data file and additionally write the deleted descriptions in a leading portion of another print target data file having a reference to a final print target data file, and a subscript changing unit adapted to change a numerical value of a subscript added to each part of the print target data files edited by said part editing unit.

5. The information processing apparatus according to claim 1, wherein when the print setting information acquired by said print setting information-acquiring unit is indicative of reverse-order printing, said changing unit changes the plurality of reference information such that the print target data files input by said input unit are printed in a reverse order.

6. The information processing apparatus according to claim 1, further comprising:
   a file addition-determining unit configured to be operable when the print setting information acquired by said print setting information-acquiring unit is indicative of bookbinding printing, to determine whether or not to add files to be printed, and
   a first file generating unit, configured to be operable when said file addition-determining unit determines to add files to be printed, to generate the files to be printed;
   a second file generating unit configured to generate another page layout data file describing another layout information including a plurality of other reference information for referring to the files to be printed respectively;
   wherein said changing unit changes the reference information based on the files to be printed, which is generated by said first file generating unit, and the another page layout data file generated by said second file generating unit, such that bookbinding printing can be performed.

7. The information processing apparatus according to claim 6, further comprising:
   a calculation unit adapted to calculate a number of the files to be printed, which is to be generated by said first file generating unit, and
   wherein said first file generating unit generates other print target data files a number of which corresponds to the number calculated by said calculation unit.

8. A print control method executed by an information processing apparatus that controls a printing apparatus, comprising:
   inputting archive data formed by archiving a page layout data file describing layout information on a document, print target data files each describing information on pages to be printed, which is to be referenced in accordance with a reference tag for the layout information described in the page layout data file, and a resource file, wherein the layout information includes a plurality of reference information for referring to the print target data files respectively;
   expanding the input archive data;
   acquiring print setting information indicative of print settings for non-normal order printing;
   changing, in accordance with the print setting information, the plurality of reference information of the layout information described in the page layout data file of the expanded archive data, so as to enable the printing apparatus to execute a print process while receiving the print target data files of the input archive data in a data sequence in accordance with the acquired print setting information;
   rearranging the print target data files in the data sequence in accordance with the plurality of changed reference information;
   disposing the page layout data file before the rearranged print target data files; and
   generating new archive data by compressing the expanded archive data with the print target data files rearranged in said rearranging step and with the page layout data file disposed in said disposing step.

9. A non-transitory computer-readable storage medium storing a program for causing a computer to execute a print control method for controlling a printing apparatus, wherein the print control method comprises:

inputting archive data formed by archiving a page layout data file describing layout information on a document, print target data files each describing information on pages to be printed, which is to be referenced in accordance with a reference tag for the layout information described in the page layout data file, and a resource file, wherein the layout information includes a plurality of reference information for referring to the print target data files respectively;

expanding the input archive data;

acquiring print setting information indicative of print settings for non-normal order printing;

changing, in accordance with the print setting information, the plurality of reference information of the layout information described in the page layout data file of the expanded archive data, so as to enable the printing apparatus to execute a print process while receiving the print target data files of the input archive data in a data sequence in accordance with the acquired print setting information;

rearranging the print target data files in the data sequence in accordance with the plurality of changed reference information;

disposing the page layout data file before the rearranged print target data files; and generating new archive data by compressing the expanded archive data with the print target data files rearranged in said rearranging step and with the page layout data file disposed in said disposing step.

* * * * *